(12) United States Patent
Sweeney

(10) Patent No.: US 7,849,090 B2
(45) Date of Patent: Dec. 7, 2010

(54) SYSTEM, METHOD AND COMPUTER PROGRAM FOR FACETED CLASSIFICATION SYNTHESIS

(75) Inventor: Peter Sweeney, Kitchener (CA)

(73) Assignee: Primal Fusion Inc., Ontario (CA)

( * ) Notice: Subject to any disclaimer, the term of this patent is extended or adjusted under 35 U.S.C. 154(b) by 473 days.

(21) Appl. No.: 11/625,452

(22) Filed: Jan. 22, 2007

(65) Prior Publication Data

US 2007/0118542 A1    May 24, 2007

Related U.S. Application Data

(63) Continuation-in-part of application No. 11/550,457, filed on Oct. 18, 2006, now Pat. No. 7,606,781, and a continuation-in-part of application No. 11/469,258, filed on Aug. 31, 2006, now Pat. No. 7,596,574, which is a continuation-in-part of application No. 11/392,937, filed on Mar. 30, 2006, now abandoned.

(60) Provisional application No. 60/666,166, filed on Mar. 30, 2005.

(51) Int. Cl.
G06F 7/00 (2006.01)
G06F 17/30 (2006.01)

(52) U.S. Cl. .................. 707/741; 707/796

(58) Field of Classification Search .......... 707/741
See application file for complete search history.

(56) References Cited

U.S. PATENT DOCUMENTS

| | | | |
|---|---|---|---|
| 5,056,021 A | 10/1991 | Ausborn | |
| 5,369,763 A | 11/1994 | Biles | |
| 5,911,145 A | 6/1999 | Arora | |
| 5,937,400 A | 8/1999 | Au | |
| 5,953,726 A | 9/1999 | Carter | |
| 6,006,222 A | 12/1999 | Culliss | |
| 6,098,033 A | 8/2000 | Richardson et al. | |
| 6,138,085 A | 10/2000 | Richardson et al. | |

(Continued)

FOREIGN PATENT DOCUMENTS

WO    WO02054292    7/2002

OTHER PUBLICATIONS

Brewster, Christopher; Ciravegna, Fabio; and Wilks, Yorick. "User-Centered Ontology Learning for Knowledge Management" from the Proceedings of the 7th International Workshop on Applications of National Language to Information Systems, Stockholm, Jun. 27-28, 2002, Lecture Notes in Computer Sciences, Springer Verlag.

(Continued)

*Primary Examiner*—John R. Cottingham
*Assistant Examiner*—Nicholas E Allen
(74) *Attorney, Agent, or Firm*—Wolf, Greenfield & Sacks, P.C.; Steven J. Henry

(57) ABSTRACT

A method (system and computer program product) performs facet classification synthesis to relate concepts represented by concept definitions defined in accordance with a faceted data set comprising facets, facet attributes, and facet attribute hierarchies. Dimensional concept relationships are expressed between the concept definitions. Two concept definitions are determined to be related in a particular dimensional concept relationship by examining whether at least one of explicit relationships and implicit relationships exist in the faceted data set between the respective facet attributes of the two concept definitions.

42 Claims, 33 Drawing Sheets

U.S. PATENT DOCUMENTS

| | | | |
|---|---|---|---|
| 6,167,390 | A | 12/2000 | Brady et al. |
| 6,233,575 | B1 | 5/2001 | Agrawal et al. |
| 6,292,792 | B1 | 9/2001 | Baffes et al. |
| 6,334,131 | B2 | 12/2001 | Chakrabarti |
| 6,349,275 | B1 | 2/2002 | Schumacher et al. |
| 6,356,899 | B1 | 3/2002 | Chakrabarti |
| 6,401,061 | B1 | 6/2002 | Zieman |
| 6,539,376 | B1 | 3/2003 | Sundaresan et al. |
| 6,556,983 | B1 | 4/2003 | Altschuler et al. |
| 6,694,329 | B2 | 2/2004 | Murray |
| 6,751,621 | B1 | 6/2004 | Calistri-Yeh et al. |
| 6,785,683 | B1 | 8/2004 | Zodik et al. |
| 6,868,525 | B1 | 3/2005 | Szabo |
| 6,980,984 | B1 | 12/2005 | Huffman et al. |
| 7,051,023 | B2 | 5/2006 | Kapur et al. |
| 7,089,237 | B2 | 8/2006 | Turnbull |
| 7,181,465 | B2 | 2/2007 | Maze et al. |
| 7,209,922 | B2 | 2/2007 | Maze et al. |
| 7,225,183 | B2 | 5/2007 | Gardner |
| 7,302,418 | B2 | 11/2007 | Ashara |
| 7,319,951 | B2 | 1/2008 | Rising, III et al. |
| 7,406,456 | B2 | 7/2008 | Calistri-Yeh et al. |
| 7,418,452 | B2 | 8/2008 | Maze |
| 2002/0069197 | A1* | 6/2002 | Katayama et al. ............... 707/7 |
| 2002/0078044 | A1* | 6/2002 | Song et al. ...................... 707/6 |
| 2003/0177112 | A1* | 9/2003 | Gardner ......................... 707/3 |
| 2003/0217335 | A1* | 11/2003 | Chung et al. ................. 715/514 |
| 2004/0024739 | A1* | 2/2004 | Copperman et al. ............ 707/1 |
| 2004/0049522 | A1 | 3/2004 | Streepy, Jr. |
| 2005/0065955 | A1* | 3/2005 | Babikov et al. ............. 707/101 |
| 2005/0086188 | A1 | 4/2005 | Hillis et al. |
| 2005/0149518 | A1* | 7/2005 | Duan et al. .................... 707/4 |
| 2005/0223109 | A1* | 10/2005 | Mamou et al. ............... 709/232 |
| 2006/0010117 | A1 | 1/2006 | Bonabeau |
| 2006/0026147 | A1 | 2/2006 | Cone |
| 2006/0074980 | A1* | 4/2006 | Sarkar ...................... 707/104.1 |
| 2006/0085489 | A1* | 4/2006 | Tomic et al. ................. 707/200 |
| 2007/0106658 | A1 | 5/2007 | Ferrari et al. |
| 2007/0136221 | A1 | 6/2007 | Sweeney et al. |
| 2007/0294200 | A1 | 12/2007 | Au |
| 2008/0004864 | A1 | 1/2008 | Gabrilovich et al. |
| 2009/0300326 | A1 | 12/2009 | Sweeney |
| 2009/0327205 | A1 | 12/2009 | Sweeney |
| 2010/0036790 | A1 | 2/2010 | Sweeney et al. |
| 2010/0049766 | A1 | 2/2010 | Sweeney et al. |

OTHER PUBLICATIONS

Rocha, Luis M. (2001). "Adaptive Webs for Heterarchies with Diverse Communities of Users." Paper prepared for the workshop from Intelligent Networks to the Global Brain: Evolutionary Social Organization through Knowledge Technology, Brussels, Jul. 3-5, 2001. LAUR 005173.

Slavic, A.; Cordeiro, M.I. (2004). "Core requirements for automation of analytico-synthetic classifications." Advances in Knowledge Organization 2004. vol. 9, pp. 187-192.

Zhang, G.Q.; Troy, A.D.; Gourgoin, K. (2006a) "Bootstrapping Ontology Learning for Information Retrieval Using Formal Concept Analysis and Information Anchors." 14th International Conference on Conceptual Structures. Aalborg, Denmark.

"Faceted Classification and Adaptive Concept Matching," Gemstone Business Intelligence Ltd., Feb. 2006.

International Search Report dated Dec. 28, 2007 of International Application No. PCT/CA2007/001546.

* cited by examiner

PRIOR ART

Faceted classification

Overview of Operations
(Data structure transformation)

Knowledge representation model

Constructing dimensional concepts

Constructing dimensional concept taxonomy

System overview

Multi-tier data structures

Overview of system methods

Process source structure analytics

Extracting preliminary concept definitions

Morpheme extraction

Potential morpheme relationships
from concept hierarchy

Calculate potential morpheme relationships

Merging morpheme relationships

Morpheme polyhierarchy assembly

Morpheme polyhierarchy before attribution

Morpheme hierarchy after attribution

Morpheme polyhierarchy assembly

Morpheme hierarchy reorganization

Morpheme hierarchy

Keyword hierarchy

Data output process

Constructing implicit concept relationships

Concept taxonomy build process

Concept hierarchy construction

Presentation of concept taxonomy views

Outliner editing interface

Container edits

Personalization

Architecture Components

Simplified Database Schema

SYSTEM, METHOD AND COMPUTER PROGRAM FOR FACETED CLASSIFICATION SYNTHESIS

CROSS REFERENCE TO RELATED APPLICATIONS

This application is a continuation in part of 1) U.S. patent application Ser. No. 11/550,457, filed Oct. 18, 2006 and entitled "Method and System for Facet Analysis", herein incorporated by reference in its entirety; and 2) U.S. patent application Ser. No. 11/469,258, filed Aug. 31, 2006 and entitled "Complex-Adaptive System For Providing A Faceted Classification", herein incorporated by reference in its entirety, which application 2) is a continuation in part of U.S. patent application Ser. No. 11/392,937, filed Mar. 30, 2006, now abandoned, that claimed the benefit of U.S. Provisional Patent Application 60/666,166, filed Mar. 30, 2005.

FIELD OF THE INVENTION

This invention relates to classification systems, specifically to automated systems of faceted classification.

BACKGROUND OF THE INVENTION

Faceted classification is based on the principle that information has a multi-dimensional quality, and can be classified in many different ways. Subjects of an informational domain are subdivided into facets (or more simply, categories) to represent this dimensionality. The attributes of the domain are related in facet hierarchies. The materials within the domain are then described and classified based on these attributes.

FIG. 1 illustrates the general approach of faceted classification in the prior art, as it applies (for example) to the classification of wine.

Faceted classification is known as an analytico-synthetic method, as it involves processes of both analysis and synthesis. To devise a scheme for faceted classification, information domains are analyzed to determine their basic facets. The classification must then be synthesized (or built) by applying the attributes of these facets to the domain based on constructive rules.

Overwhelming, faceted classification is a manual activity, practiced by professional classificationists such as librarians and information architects. It is very labor-intensive and intellectually challenging. To ease this complexity, scholars have devised rules and guidelines for faceted classification. This body of scholarship dates back many decades, long before the advent of modern computing and data analysis.

More recently, technology has been enlisted in the service of faceted classification. For example, rule-based categorization tools (or classifiers) are often employed to automate the assignment of attributes to objects within an existing faceted classification scheme. Critically, however, technologies such as these have been applied within the traditional methods of faceted classification.

Modeled within these traditional methods, existing technologies bear some inherent limitations. Chief among these is in the very faceted nature of the resultant structures (illustrated in FIG. 1 as the three facet hierarchies of type, price, and region). Descriptions based on facet hierarchies are inherently fragmented.

Faceted classification schemes enable multiple perspectives, an oft-cited benefit. Unfortunately, when these perspectives are fragmented across multiple hierarchies, they are not intuitive. As the number of facets (or dimensions) in the structure increases, visualization becomes increasingly difficult. Consequently, visualizations of faceted classification schemes are often reduced to "flat", one-dimensional result sets; structures are navigated across only one facet at a time. This type of reduction obscures the rich complexity of the underlying structure.

Beyond these visualization problems, there are fundamental structural limitations. Again, in a fragmented state, there is no obvious connection between the facets of an information domain. For example, in FIG. 1, it is not clear how the facets of type, price, and region interact to describe wine. The facets provide descriptive value, but they must be connected to serve an explanatory framework.

Once selected, the facets themselves are static and difficult to revise. This represents a considerable risk in the development of a faceted scheme. Classificationists often lack complete knowledge of the information domain, and thus the selection of these organizing bases is prone to error. Under a dynamic system of classification, these risks would be mitigated by the ability to easily add or alter the underlying facets. Traditional methods of faceted classification and derivative technologies lack flexibility at this fundamental level.

Contrasting faceted hierarchies with simple (unitary) hierarchies illuminates these problems. Simple hierarchies are intuitive and easy to visualize. They often integrate many organizing bases (or facets) simultaneously, providing a more holistic perspective of all the relevant attributes. Attributes are coupled across facet boundaries and may be navigated concurrently. By integrating attributes, rather than fragmenting them, they offer a much more economical and robust explanatory framework.

Thus, there are many disadvantages with the current state of the art in automated faceted classification, specifically as they relate to faceted classification synthesis. Technologies are applied within or based on traditional methods. The resultant structures are inherently fragmented, posing problems of visualization, integration, and holistic perspective.

Methods and technologies are needed that combine the expressiveness and flexibility of faceted schemes within integrated and richly descriptive hierarchies. Moreover, this flexibility must extend down to the fundamental level of the classification scheme itself, in a dynamic construction of facets as organizing bases.

SUMMARY

A method (system and computer program product) performs facet classification synthesis to relate concepts represented by concept definitions defined in accordance with a faceted data set comprising facets, facet attributes, and facet attribute hierarchies. Dimensional concept relationships are expressed between the concept definitions. Two concept definitions are determined to be related in a particular dimensional concept relationship by examining whether at least one of explicit relationships and implicit relationships exist in the faceted data set between the respective facet attributes of the two concept definitions.

In a first aspect there is provided a method for performing faceted classification synthesis to relate concepts represented by concept definitions defined in accordance with a faceted data set comprising facets, facet attributes, and facet attribute hierarchies. The method comprises expressing dimensional concept relationships between the concept definitions, wherein two concept definitions are determined to be related in a particular dimensional concept relationship by examining whether at least one of explicit relationships and implicit relationships exist in the faceted data set between the respective facet attributes of the two concept definitions.

In a second aspect, there is provided a computer system for performing faceted classification synthesis to relate concepts represented by concept definitions defined in accordance with a faceted data set comprising facets, facet attributes, and facet attribute hierarchies. The computer system is configured for expressing dimensional concept relationships between the concept definitions, wherein two concept definitions are determined to be related in a particular dimensional concept relationship by examining whether at least one of explicit relationships and implicit relationships exist in the faceted data set between the respective facet attributes of the two concept definitions In a further aspect, there is provided a computer program product storing instructions and data to configure a computer system for performing faceted classification synthesis to relate concepts represented by concept definitions defined in accordance with a faceted data set comprising facets, facet attributes, and facet attribute hierarchies. The instructions and data configuring the computer system for expressing dimensional concept relationships between the concept definitions, wherein two concept definitions are determined to be related in a particular dimensional concept relationship by examining whether at least one of explicit relationships and implicit relationships exist in the faceted data set between the respective facet attributes of the two concept definitions.

These and other aspects will be apparent to those of ordinary skill in the art.

BRIEF DESCRIPTION OF THE DRAWINGS

The invention will be better understood with reference to the drawings, in which.

DETAILED DESCRIPTION 1.1 System Operation 1.1.1 Overview

FIGS. 2-8 provide an overview of operations and a system for constructing and managing dimensional information structures such as to create a dimensional concept taxonomy for a domain. In particular, FIGS. 2-8 show a knowledge representation model useful for such operations as well as certain dimensional data structures and constructs. Also shown are methods of data structure transformation including a complex-adaptive system and an enhanced method of faceted classification.

1.1.1.1 Overview of Operations

Analysis and Compression

Figure 2:
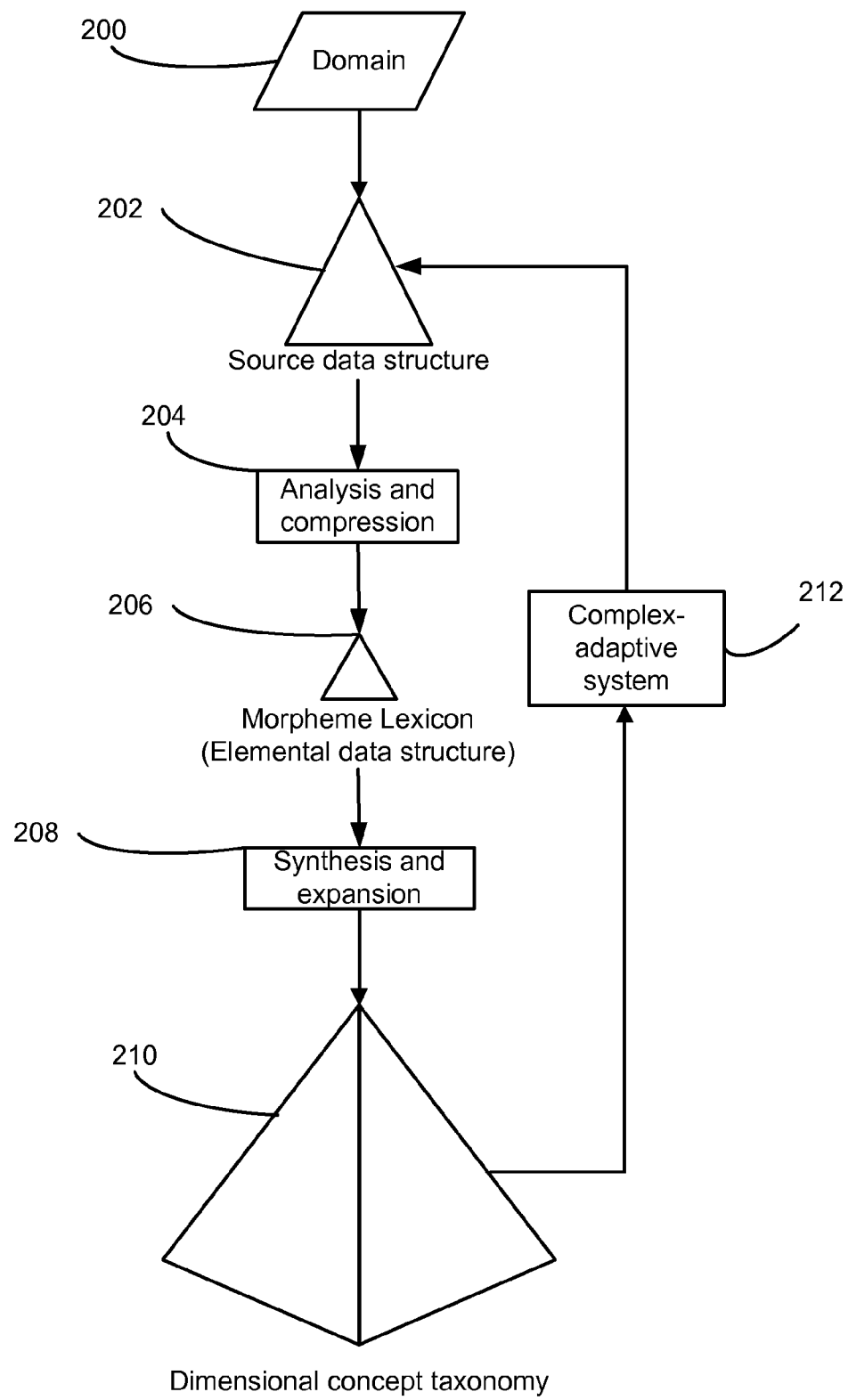
FIG. 2 illustrates an overview of operations showing data structure transformations to create a dimensional concept taxonomy for a domain.

FIG. 2 illustrates operations to construct a dimensional concept taxonomy 210 for a domain 200 comprising a corpus of information that is the subject matter of a classification. Domain 200 may be represented by a source data structure 202 comprised of a source structure schema and a set of source data entities derived from the domain 200 for inputting to a process of analysis and compression 204. The process of analysis and compression 204 derives a morpheme lexicon 206 that is an elemental data structure comprised of a set of elemental constructs to provide a basis for the new faceted classification scheme.

The information in domain 200 may relate to virtual or physical objects, processes, and relationships between such information. Preferably, the operations described herein are directed to the classification of content residing within Web pages. Alternate embodiments of domain 200 may include document repositories, recommendation systems for music, software code repositories, models of workflow and business processes, etc.

The elemental constructs within the morpheme lexicon 206 are a minimum set of fundamental building blocks of information and information relationships which in the aggregate provide the information-carrying capacity with which to classify the source data structure 202.

Synthesis and Expansion

Morpheme lexicon 206 is the input to a method of synthesis and expansion 208. The synthesis and expansion operations transform the source data structure 202 into a third data structure, referred to herein as the dimensional concept taxonomy 210. The term "taxonomy" refers to a structure that organizes categories into a hierarchical tree and associates categories with relevant objects such as documents or other digital content. The dimensional concept taxonomy 210 categorizes source data entities from domain 200 in a complex dimensional structure derived from the source data structure 202. As a result, source data entities (objects) may be related across many different organizing bases, allowing them to be found from many different perspectives.

In the illustration of FIG. 2, and in all illustrations contained herein, triangle shapes are used to represent relatively simple data structures and pyramid shapes are used to represent relatively complex data structures embodying higher dimensionality. Varying sizes of the triangles and pyramids represent transformations of compression and expansion, but in no way indicate or limit the precise scale of the compression or transformation.

Complex-Adaptive System

Preferably, classification systems and operations should adapt to change in dynamic environments. In the preferred embodiment, this requirement is met through a complex-adaptive system 212. Feedback loops are established through user interactions with the dimensional concept taxonomy 210 back to the source data structure 202. The processes of transformation (204 and 208) repeat and the resultant structures 206 and 210 are refined over time.

In the preferred embodiment, the complex-adaptive system 212 manages the interactions of end-users that use the output structures (i.e. dimensional concept taxonomies 210) to harness the power of human cognition in the classification process.

The operations described herein seek to transform relatively simply source data structures to more complex dimensional structures in order that the source data objects may be organized and accessed in a variety of ways. Many types of information systems may be enhanced by extending the dimensionality and complexity of their underlying data structures. Just as higher resolution increases the quality of an image, higher dimensionality increases the resolution and specificity of the data structures. This increased dimensionality in turn enhances the utility of the data structures. The enhanced utility is realized through improved and more flexible content discovery (e.g. through searching), improvements in information retrieval, and content aggregation.

Since the transformation is accomplished through a complex system, the increase in dimensionality is not necessarily linear or predictable. The transformation is also dependent in part on the amount of information contained in the source data structure.

1.1.1.2 Dimensional Knowledge Representation Model

Figure 3:
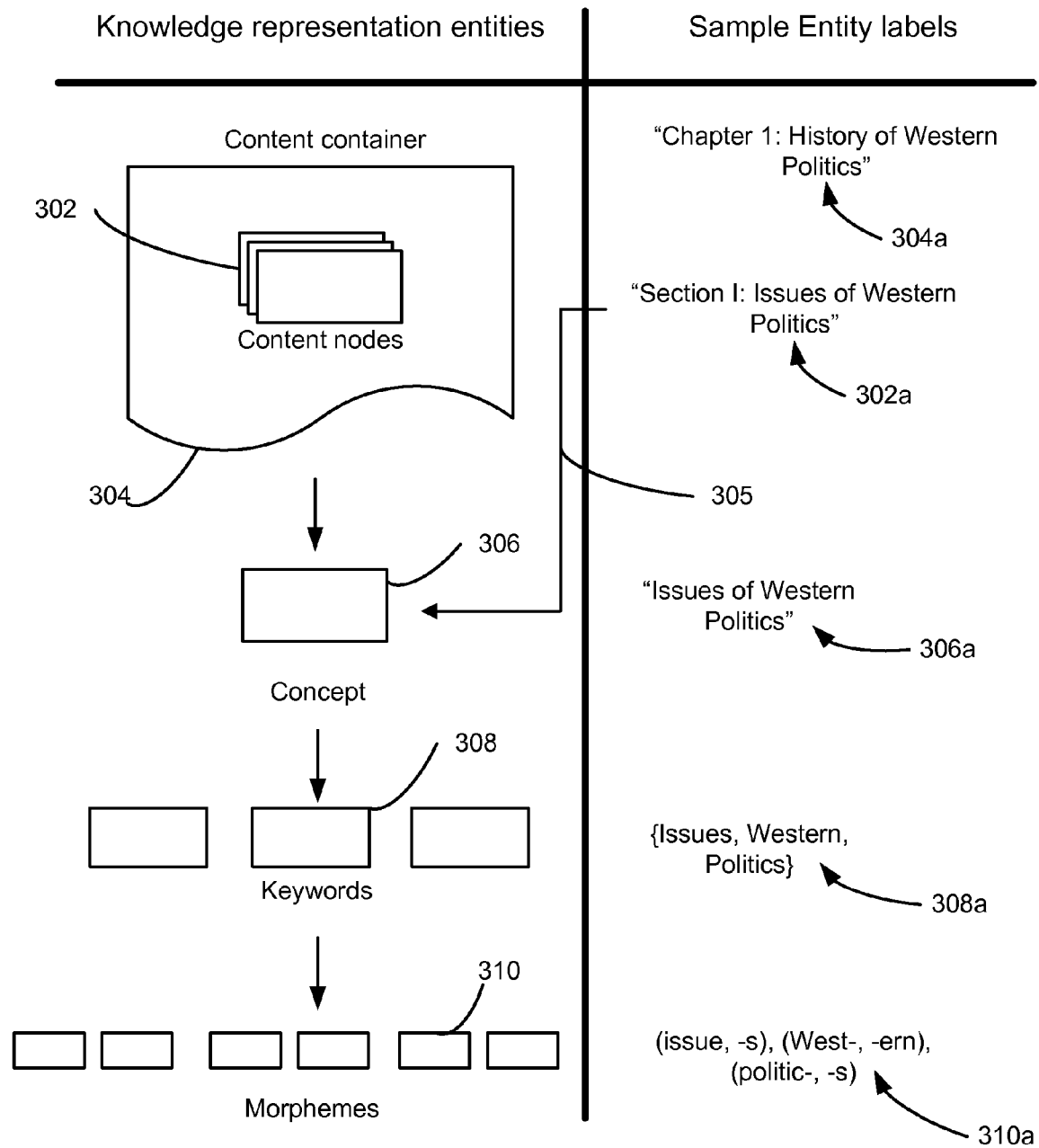
FIG. 3 illustrates a knowledge representation model useful for the operations of FIG. 2.

FIG. 3 illustrates an embodiment of a knowledge representation model including knowledge representation entities, relationships, and method of transformation that may be used in the operations of FIG. 2. Further specifics of the knowledge representation model and its methods of transformation are described in the descriptions that follow with reference to FIGS. 3-8.

The knowledge representation entities in the preferred embodiment of the invention are a set of content nodes 302, a set of content containers 304, a set of concepts 306 (to simplify the illustration, only one concept is presented in FIG. 3), a set of keywords 308, and a set of morphemes 310.

The objects of the domain to be classified are known as content nodes 302. Content nodes are comprised of any objects that are amenable to classification. For example, content nodes 302 may be a file, a document, a chunk of document (like an annotation), an image, or a stored string of characters. Content nodes 302 may reference physical objects or virtual objects.

Content nodes 302 are contained in a set of content containers 304. Preferably, the content containers 304 provide addressable (or locatable) information through which content nodes 302 can be retrieved. For example, the content container 304 of a Web page, addressable through a URL, may contain many content nodes 302 in the form of text and images. Content containers 304 contain one or more content nodes 302.

Concepts 306 are associated with content nodes 302 to abstract some meaning (such as the description, purpose, usage, or intent of the content node 302). Individual content nodes 302 may be assigned many concepts 306; individual concepts 306 may be shared across many content nodes 302.

Concepts 306 are defined in terms of compound levels of abstraction through their relationships to other entities and structurally in terms of other, more fundamental knowledge representation entities (e.g. keywords 308 and morphemes 310). Such a structure is known herein as a concept definition.

Morphemes 310 represent the minimal meaningful knowledge representation entities that present across all domains known by the system (i.e. that have been analyzed to construct the morpheme lexicon 206). A single morpheme 310 may be associated with many keywords 308; a single keyword 308 may be comprised of one or more morphemes 310.

Further there is a distinction between the meaning of the term "morphemes" in the context of this specification and its traditional definition in the field of linguistics. In linguistics, morphemes are the "minimal meaningful units of a language". In the context of this specification, morphemes refer to the "minimal meaningful knowledge representation entities that present in any domain known by the system."

Keywords 308 comprise sets (or groups) of morphemes 310. A single keyword 308 may be associated with many concepts 306; a single concept 306 may be comprised of one or more keywords 308. Keywords 308 thus represent an additional tier of data structure between concepts 306 and morphemes 310. They facilitate "atomic concepts" as the lowest level of knowledge representation that would be recognizable to users.

Since concepts 306 are abstracted from the content nodes 302, a concept signature 305 is used to identify concepts 306 within concept nodes 302. Concept signatures 305 are those features of a content node 302 that are representative of organizing themes that exist in the content.

In the preferred embodiment, as with the elemental constructs, content nodes 302 tend towards their most irreducible form. Preferably, content containers 304 are reduced to as many content nodes 302 as is practical. When combined with the extremely fine mode of classification in the present invention, these elemental content nodes 302 extend the options for content aggregation and filtering. Content nodes 302 may thus be reorganized and recombined along any dimension in the dimensional concept taxonomy.

A special category of content nodes 302, namely labels (often called "terms" in the art of classification) are joined to each knowledge representation entity. As with content nodes 302, labels are abstracted from the respective entities they describe in the knowledge representation model. Thus in FIG. 3, the following types of labels are identified: a content container label 304a to describe the content container 304; a content node label 302a to describe the content node 302; a concept label 306a to describe the concept 306; a set of keyword labels 308a to describe the set of keywords 308; a set of morpheme labels 310a to describe the set of morphemes 310.

Labels provide knowledge representation entities that are discernable to humans. In the preferred embodiment, each label is derived from the unique vocabulary of the source domain. In other words, the labels assigned to each data element are drawn from the language and terms presented in the domain.

Figure 9:
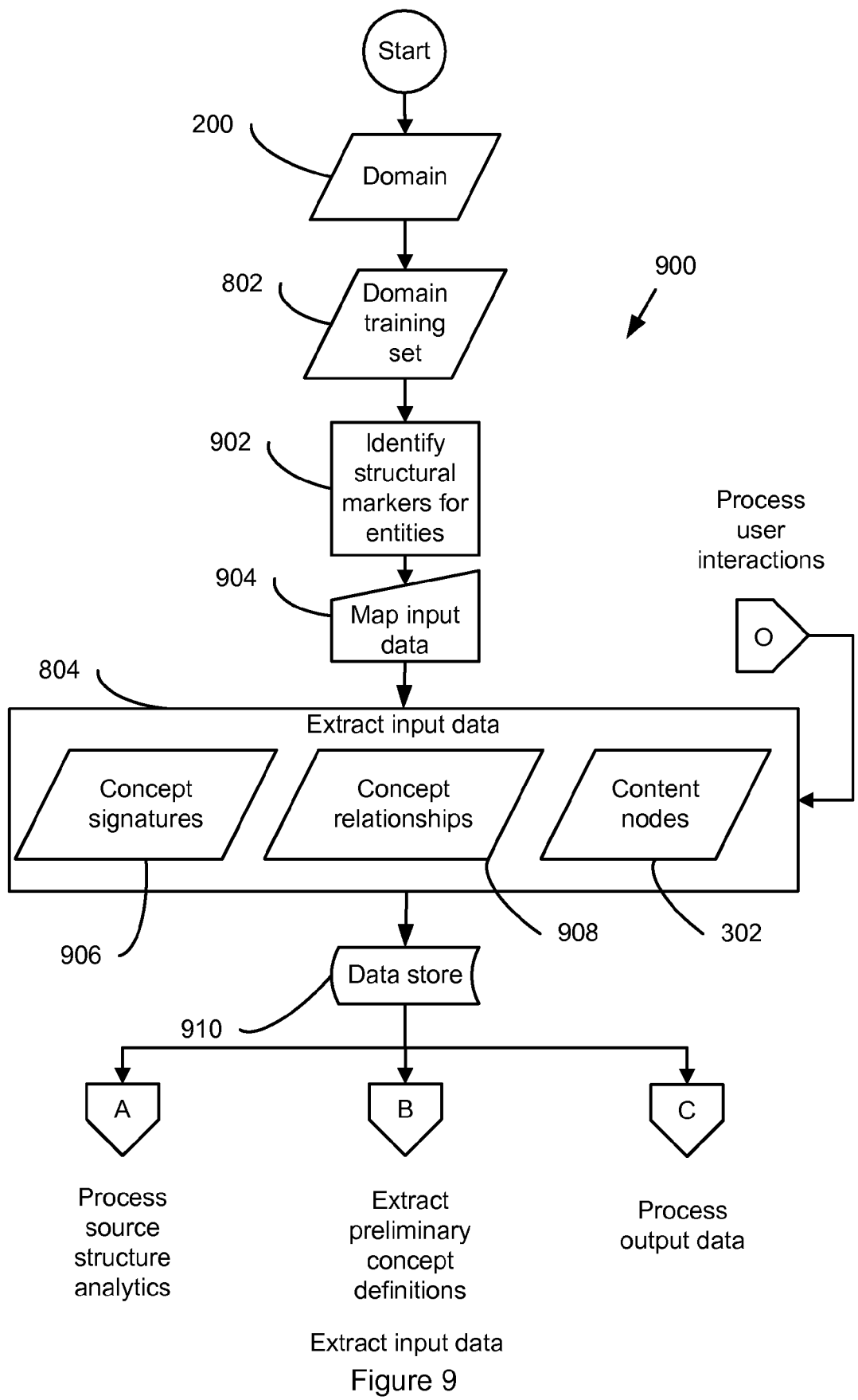
FIG. 9 illustrates a method of extracting input data.

Concept, keyword, and morpheme extraction are described below and illustrated in FIGS. 11-12. Concept signatures and content node and label extraction are discussed in greater detail below with reference to input data extraction (FIG. 9).

Figure 1:
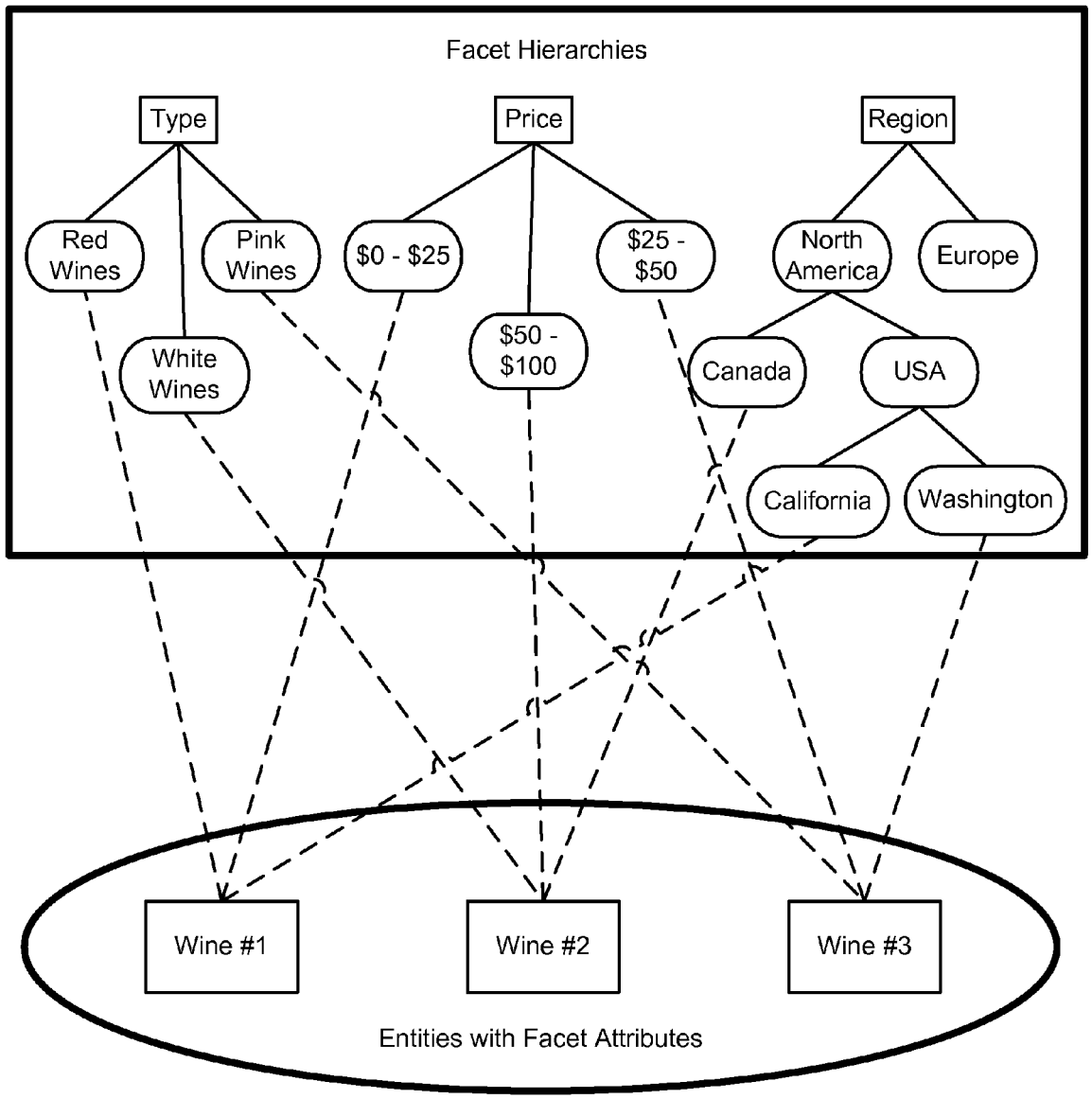
FIG. 1 is a schematic diagram illustrating a method of faceted classification of the prior art.

The preferred embodiment uses a multi-tier knowledge representation model across both the entities and their relationships. This differentiates it from the two-tier model of concepts-atomic concepts and their flat (single-tier) relational structures in traditional faceted classification, as illustrated in FIG. 1 (Prior Art).

Though certain aspects of the operations and system are described with reference to the preferred knowledge representation model, those of ordinary skill in the art will appreciate that other models may used, adapting the operations and system accordingly. For example, concepts may be combined together to create higher-order knowledge representation entities (such as "meme", as a collection of concepts to comprise an idea). The structure of the representation model may also be contracted. For example, the keyword abstraction layer may be removed such that concepts are defined only in relation to morphemes 310.

1.1.1.3 Dimensional Classification Synthesis

Figure 4:
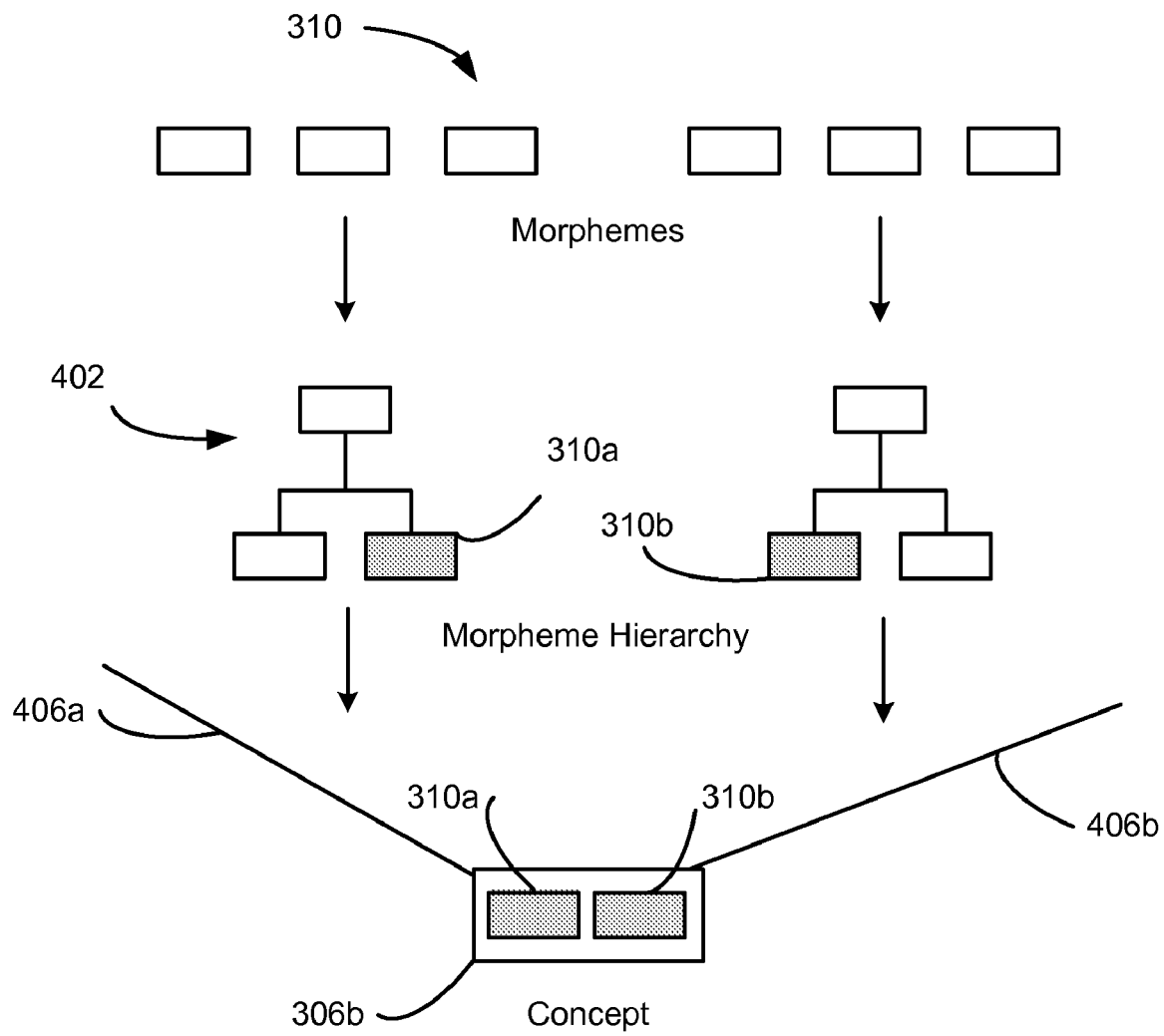
FIG. 4 illustrates the manner in which the operations generate dimensional concepts from elemental constructs.
Figure 5:
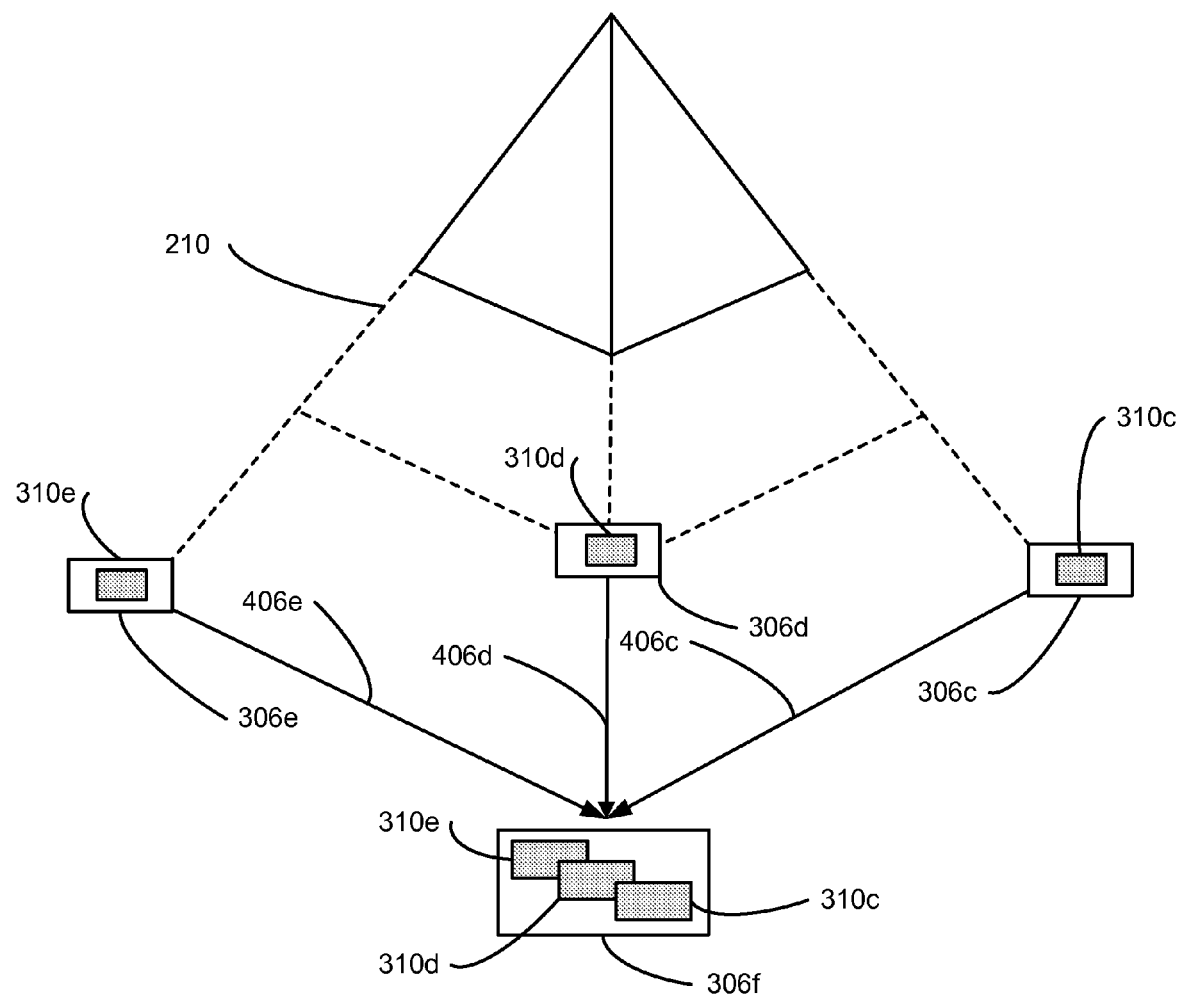
FIG. 5 illustrates how the operations combine dimensional concept relationships to generate dimensional concept taxonomies.

FIGS. 4-5 illustrate the methods through which the elemental constructs are derived and synthesized to create complex dimensional structures.

Dimensional Concept Synthesis

In FIG. 4, a sample of morphemes 310 are presented. Morphemes 310 are among the elemental constructs derived from the source data. The other set of elemental constructs are comprised of a set of morpheme relationships. Just as morphemes represent the elemental building blocks of concept definitions and are derived from concepts, morpheme relationships represent the elemental building blocks of the relationships between concepts and are derived from such concept relationships. Morpheme relationships are discussed in greater detail below, illustrated in FIGS. 13-14.

Morphemes 310 that comprise the concept definitions are related in a morpheme hierarchy 402. The morpheme hierarchy 402 is an aggregate set of all the morpheme relationships known in the morpheme lexicon 206, pruned of redundant morpheme relationships. Morpheme relationships are considered redundant if they can be logically constructed using sets of other morpheme relationships (i.e. through indirect relationships).

With reference to FIG. 4, individual morphemes 310a and 310b may be grouped in keywords to define a specific concept 306b. Note that these morphemes 310a and 310b are thus associated with a concept 306b (via keyword groupings) and with other morphemes 310 in the morpheme hierarchy 402.

Through these interconnections, the morpheme hierarchy 402 can be used to create a new and expansive set of concept relationships. Specifically, any two concepts 306 that contain morphemes 310 that are related through morpheme relationships may themselves be related concepts.

Co-occurrences of morphemes within concept definitions may be used as the basis for creating hierarchies of concept relationships. Each intersecting line 406a and 406b at concept 306b (FIG. 4) represents a dimensional axis connecting concept 306b to other related concepts (not shown). The set of dimensional axes, each representing a separate hierarchy of concept relationships filtered by a set of morphemes (or facet attributes) that define the axis, is the structural foundation of a complex dimensional structure. A simplified overview of the construction method continues in FIG. 5.

Dimensional Concept Taxonomy

FIG. 5 illustrates the construction of the complex dimensional structure for defining dimensional concept taxonomy 210 based on the intersection of dimensional axes.

A set of four concepts 306c, 306d, 306e, and 306f are illustrated with concepts 306c, 306d, and 306e defined by morphemes 310c, 310d, and 310e, respectively and concept 306f defined by the set of morphemes 310c, 310d, and 310e. By virtue of the intersections of the morphemes 310c, 310d, and 310e, the concepts 306c, 306d, 306e, and 306f share concept relationships. Synthesis operations (described below) create dimensional axes 406c, 406d, and 406e as distinct hierarchies of concept relationships based on the morphemes 310c, 310d, and 310e in the concept definitions.

This operation of synthesizing dimensional concept relationships may be processed to all or a portion of content nodes 302 in the domain 200 (scope-limited processing operations are described below, illustrated in FIGS. 24-25). Content nodes 302 may thus be categorized into a completely reengineered complex dimensional structure, as the dimensional concept taxonomy 210.

1.1.1.4 Dimensional Transformation Processes

Figure 6:
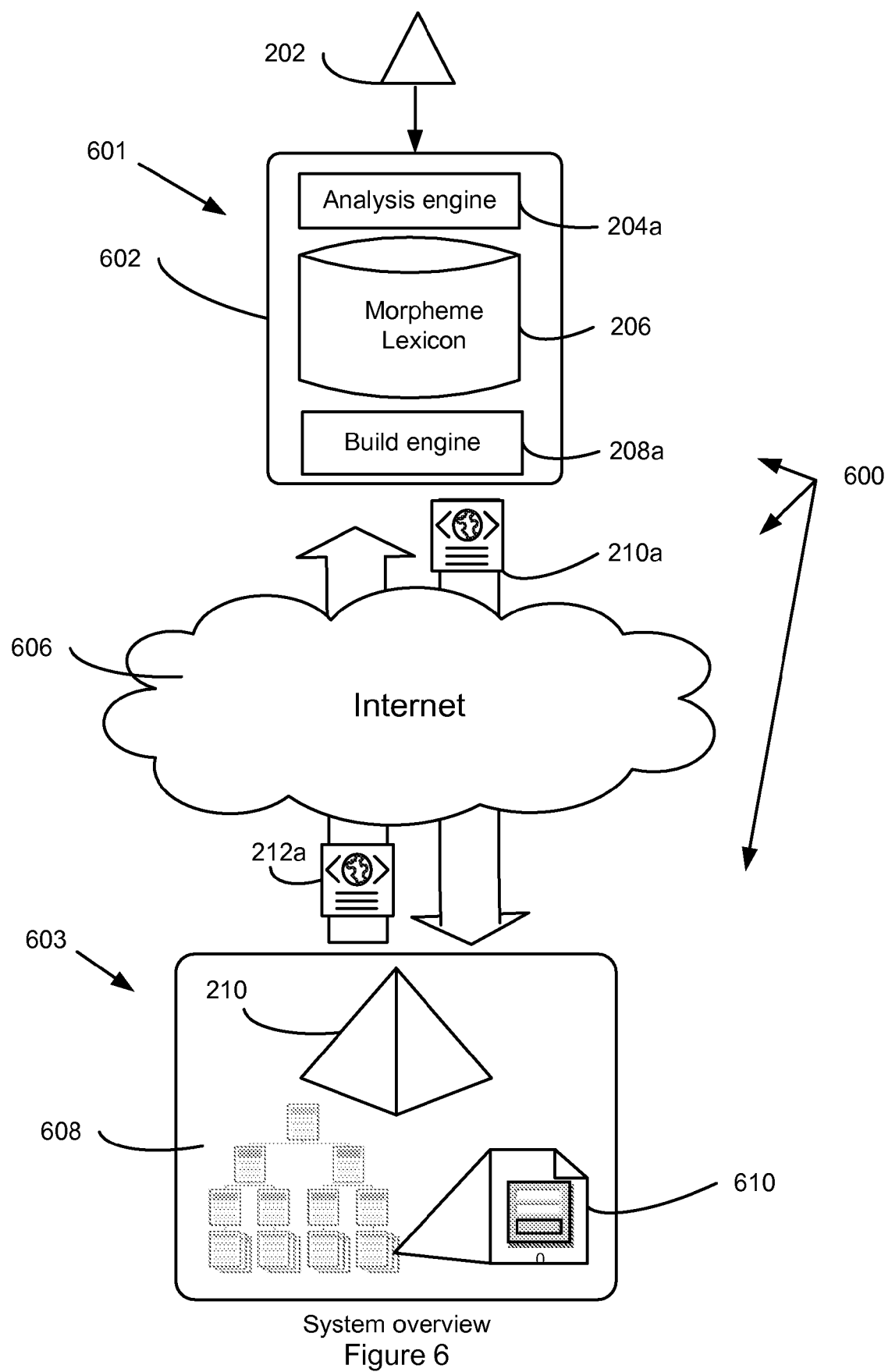
FIG. 6 illustrates a system overview in accordance with a preferred embodiment to execute the operations of data structure transformation.

FIG. 6 illustrates a system overview in accordance with a preferred embodiment to execute the operations of data structure transformation described above and further herein below.

The three broad processes of transformation introduced above may be restated in more detailed terms, as they present in the preferred embodiment: 1) the analysis and compression of domain 200 to discover facets of its structure, as defined in terms of the elemental constructs in the complex dimensional structure; 2) the synthesis and expansion of the complex dimensional structure of the domain into the dimensional concept taxonomy 210, provided through an enhanced method of faceted classification; and 3) the management of user interactions within the dimensional concept taxonomy 210, through a faceted navigation and editing environment, to enable the complex-adaptive system that refines the structures (e.g. 206 and 210) over time.

Analysis of Elemental Constructs

In the preferred embodiment, a distributed computing environment 600 is shown schematically. One computing system 601 operates as a transformation engine 602 for data structures. The transformation engine takes as its inputs the source data structures 202 from one or more domains 200. The transformation engine 602 is comprised of an analysis engine 204a, a morpheme lexicon 206, and a build engine 208a. These system components provide the functionality of analysis and synthesis introduced above and illustrated in FIG. 2.

In the preferred embodiment, the complex dimensional structure is encoded into XML files 604 that may be distributed via web services (or API or other distribution channels) over the Internet 606 to one or more second computing systems (e.g. 603). Through this and/or other modes of distribution and decentralization, a wide range of developers and publishers can use the transformation engine 602 to create complex dimensional structures. Applications include web sites, knowledge bases, e-commerce stores, search services, client software, management information systems, analytics, etc.

Synthesis Through Enhanced Faceted Classification

The complex dimensional structures embodied in the XML files 604 are available as the bases for reorganizing the content of domains. In the preferred embodiment, an enhanced method of faceted classification is used to reorganize the materials in the domain, deriving the dimensional concept taxonomy 210 at a second computing system 603 using the complex dimensional structures embodied in the XML files 604. Typically, second computing systems like system 603 are maintained by domain owners that are also responsible for the domain to be reorganized by the dimensional concept taxonomy 210. Detailed information on the multi-tier data structures used by the system is provided below, illustrated in FIG. 7.

In the preferred embodiment of the system 603, there is provided a presentation layer 608 or graphical user interface (GUI) for the dimensional concept taxonomy 210. Client-side tools 610 such as browsers, web-based forms, and software components allow domain end-users and domain owners/administrators to interact with the dimensional concept taxonomy 210.

Complex-Adaptive Processing Via User Interactions

The dimensional concept taxonomies 210 may be tailored and demarcated by each individual end-user and domain owner. These user interactions may be harnessed by second computing systems (e.g. 603) to provide human cognition and additional processing resources to the classification system.

Dimensional taxonomy information that embody the user interactions for example, encoded in XML 212*a*, are returned to the transformation engine 602 such as by distributing via web services or other means. This allows the data structures (e.g. 206 and 210) to evolve and improve over time.

The feedback loops from second systems 603 to the transformation engine 602 establish the complex-adaptive system of processing. While end-users and domain owners interact at a high level of abstraction through the dimensional concept taxonomy 210, the user interactions are translated to the elemental constructs (e.g. morphemes and morpheme relationships) that underlie the dimensional concept taxonomy information. By coupling the end-user and domain owner interactions to the elemental constructs and feeding them back to the transformation engine 602, the system is able to evaluate the interactions in the aggregate.

Using this mechanism, ambiguity and conflict that historically arise in collaborative classification may be removed. Thus, this approach to collaborative classification seeks to avoid the personal and collaborative negotiations on the concept level that may arise with other such systems.

User interactions also extend the source data 202 available by allowing users to contribute content nodes 302 and classification data (dimensional concept taxonomy information) through their interactions, enhancing the overall quality of the classifications and increasing the processing resources available.

1.1.1.5 Overview of Data Structure Transformations

Figure 7:
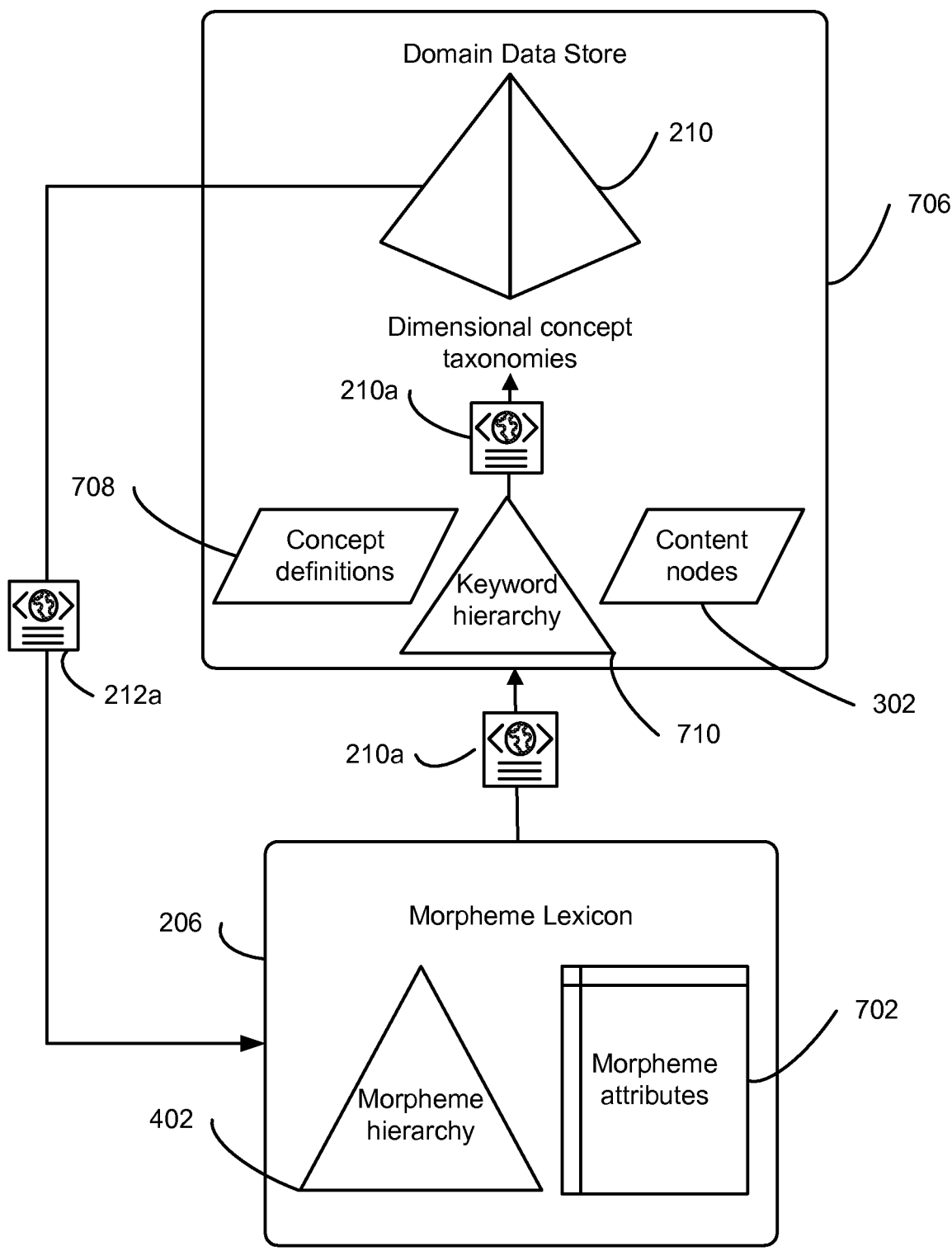
FIG. 7 illustrates faceted data structures used in the preferred embodiment, and the multi-tier architecture that supports these structures.

FIG. 7 highlights the means by which the elemental constructs harvested from each source data structure 202 are compounded through successive levels of abstraction and dimensionality to create the dimensional concept taxonomies 210 for each domain 200. It also illustrates the delineations between the private data (708, 710 and 302) embodied in each domain 200 and the shared elemental constructs (morpheme lexicon) 206 that the system uses to inform the classification schemes generated for each domain.

Elemental Constructs

The elemental constructs of morphemes 310 and morpheme relationships are stored in the morpheme lexicon 206 as centralized data. The centralized data is centralized across the distributed computing environment 600 (e.g. via transformation engine system 601) and made available to all domain owners and end-users to aid in the classification of domains. Since the centralized data is elemental (morphemic) and disassociated from the context of any specific and private knowledge represented by concepts 306 and concept relationships, it can be shared among second computing systems 603. System 601 need not permanently store the unique expression and combination of these elemental constructs that comprises the unique information contained in each domain.

The morpheme lexicon 206 stores the attributes of each morpheme 310 in a set of tables of morpheme attributes 702. The morpheme attributes 702 reference structural parameters and statistical data that are used by analytical processes of the transformation engine 602 (as described further below). The morpheme relationships are ordered in the aggregate into the morpheme hierarchy 402.

Dimensional Faceted Output Data

A domain data store 706 stores the domain-specific data (complex dimensional structures 210*a*), preferably in XML form, derived by the transformation engine system 601 from the source data structure 202 and using the morpheme lexicon 206.

The XML-based complex dimensional structures 210*a* in each domain data store 706 are comprised of a domain-specific keyword hierarchy 710, a set of content nodes 302, and a set of concept definitions 708. The keyword hierarchy 710 is comprised of a hierarchical set of keyword relationships. Preferably, the XML output is itself encoded as faceted data. The faceted data represents the dimensionality of the source data structure 202 as facets of its structure, and the content nodes 302 of the source data structure 202 in terms of attributes of the facets. This approach allows domain-specific resources (e.g. system 603) to process the complex dimensional structures 210*a* into higher levels of abstraction such as dimensional concept taxonomy 210.

The complex dimensional structure 210*a* is used as an organizing basis to manage the relationships between content nodes 302. A new set of organizing principles is then applied to the elemental constructs for classification. The organizing principles comprise an enhanced method of faceted classification as detailed below, illustrated in FIGS. 22-24.

Preferably, the enhanced method of faceted classification is applied to the complex dimensional structures 210*a*. Other simpler classification methods may also be applied and other data structures (whether simple or complex) may be created from the complex dimensional structures 210*a* as desired. In the preferred embodiment, an output schema that explicitly represents faceted classifications is used. Other output schema may be used. The faceted classifications produced for each domain may be represented using a variety of data models. The methods of classification available are closely associated with the types of data structures being classified. Therefore, these alternate embodiments for classification are directly linked to the alternate embodiments of dimensionality, discussed above.

Shared Versus Private Data

An advantage of the dimensional knowledge representation model is the clear separation of private domain data and shared data used by the system to process domains into complex dimensional structures 210*a*. Data separation facilitates hosted processing models, such as an ASP model, whereby a third-party offers transformation engine services to domain owners. A domain owner's domain-specific data may be hosted by the ASP securely as it is separable from the shared data (i.e. morpheme lexicon 206) and the private data of other domain owners. Alternately, the domain-specific data may be hosted by the domain owners, physically removed from the shared data. Domain owners can build on the shared knowledge (e.g. the morpheme lexicon) of the entire community of users, without having to compromise their unique knowledge.

Data entities (e.g. 708, 710) contained in the domain data store 706 include references to the elemental constructs that are stored in the morpheme lexicon 206. In this way, the dimensional concept taxonomy 210 for each domain 200 can be re-analyzed subsequent to its creation, to accommodate changes. Preferably, when domain owners want to update their classifications, domain-specific data is reloaded into the analysis engine 204*a* for processing. A domain 200 may be analyzed in real-time (for example, through end-user interactions via XML 212*a*) or through (queued) periodic updates.

1.1.1.6 Overview of System Transformation Methods

Figure 8:
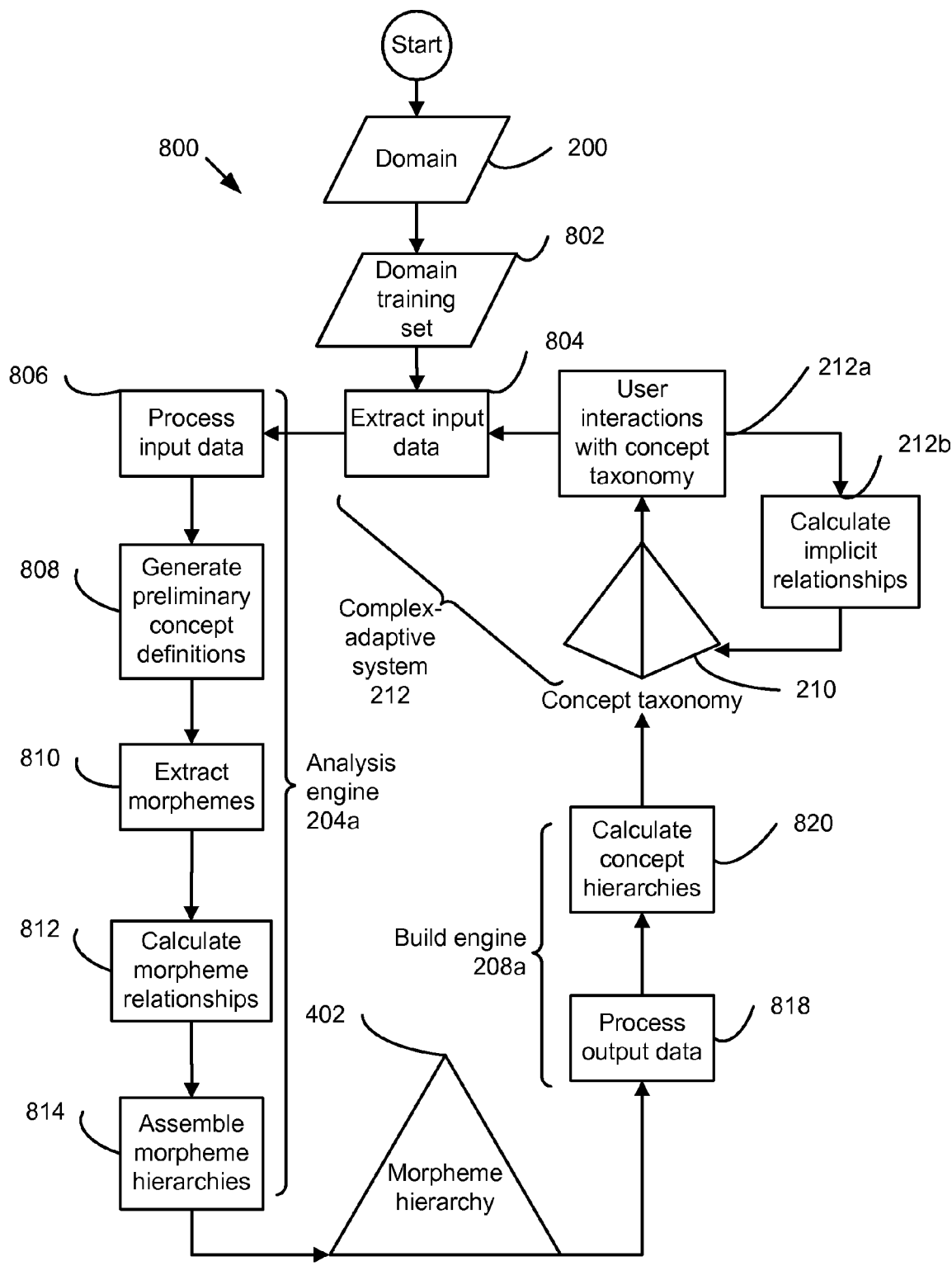
FIG. 8 illustrates in further detail an overview of the operations of FIG. 2.

FIG. 8 illustrates a broad overview of a preferred embodiment of the transformation operations 800 introduced in FIG. 2.

Input Data Extraction

Operations 800 begin with the manual identification by domain owners of the domain 200 to be classified. Preferably, source data structure 202 is defined from a domain training set 802. The training set 802 may be a representative subset of the larger domain 200 and may be used as a surrogate. That is, the training set may comprise a source data structure 202 for the whole domain 200 or a representative part thereof. Training sets are well known in the art.

A set of input data is extracted 804 from the domain training set 802. The input data is analyzed to discover and extract the elemental constructs. (This process is discussed in greater detail below, illustrated in FIG. 9.)

Domain Facet Analysis and Data Compression

In the present embodiment, the analysis engine 204*a* introduced above and described in FIG. 6 is bounded by the methods 806 to 814, as indicated by the bracket in FIG. 8. The input data is analyzed and processed 806 to provide a set of source structure analytics. The source structure analytics provide information about the structural characteristics of the source data structure 202. (This process is discussed in greater detail below, illustrated in FIG. 10.)

A set of preliminary concept definitions are generated 808. (This process is discussed in greater detail below, illustrated in FIG. 11.) The preliminary concept definitions are represented structurally as sets of keywords 308.

Morphemes 310 are extracted 810 from the keywords 308 in the preliminary concept definitions, thus extending the structure of the concept definitions to another level of abstraction. (This process is discussed in greater detail below, illustrated in FIG. 12.)

To begin the process of constructing the morpheme hierarchy 402, a set of potential morpheme relationships is calculated 812. The potential morpheme relationships are derived from an analysis of the concept relationships in the input data. Morpheme structure analytics are applied to the potential morpheme relationships to identify those that will be used to create the morpheme hierarchy.

The morpheme relationships selected for inclusion in the morpheme hierarchy are assembled 814 to form the morpheme hierarchy 402. (This process is discussed in greater detail below, illustrated in FIGS. 13-19.)

Dimensional Structure Synthesis and Data Expansion

In the present embodiment, build engine 208*a* introduced above and described in FIG. 6 is bounded by the methods 818 to 820, as indicated by the bracket in FIG. 8. The enhanced method of faceted classification is used to synthesize the complex dimensional structure 210*a* and the dimensional concept taxonomy 210. (This process is discussed in greater detail below, illustrated in FIGS. 22-24.)

Output data 210*a* for the new dimensional structure is prepared 818. The output data is the structural representation of the classification scheme for the domain. It is used as faceted data to create the dimensional concept taxonomy 210. As described above, the output data comprises the concept definitions 708 that are associated with the content nodes 302 and the keyword hierarchy 710. Specifically, the faceted data is comprised of the keywords 308 in the concept definitions and the structure of the keyword hierarchy 710 where the keywords 308 are defined in terms of the morphemes 310 of the morpheme lexicon 206. (This process is discussed in greater detail below, illustrated in FIG. 21.)

A set of dimensional concept relationships (that in the aggregate form polyhierarchies) are constructed 820. The dimensional concept relationships represent the concept relationships in the dimensional concept taxonomy 210. The dimensional concept relationships are calculated based on the organizing principles of the enhanced method of faceted classification. The dimensional concept relationships are merged and, within the categorization of concepts 306 (as encoded in concept definitions), form the dimensional concept taxonomy 210. (This process is discussed in greater detail below, illustrated in FIGS. 22-24.)

Complex-Adaptive System and User Interactions

In the present embodiment, the operations of the complex-adaptive system 212 introduced above and described in FIG. 2 are bounded by the methods 212*a*, 212*b*, and 804, in association with the concept taxonomy 210, as indicated by the bracket in FIG. 8.

As discussed, the dimensional concept taxonomy 210 may be expressed to users through the presentation layer 608. In the preferred embodiment, the presentation layer 608 is a web site. (The presentation layer is discussed in greater detail below, illustrated in FIGS. 25-28.) Via the presentation layer 608, the content nodes 302 in the domain 200 are presented as categorized within the concept definitions that are associated with each content node 302.

This presentation layer 608 provides the environment for collecting a set of user interactions 212*a* as dimensional concept taxonomy information. The user interactions 212*a* are comprised of various ways in which end-users and domain owners may interact with the dimensional concept taxonomy 210. The user interactions 212*a* are coupled to the analysis engine via a feedback loop through step 804 to extract input data to enable the complex-adaptive system. (This process is discussed in greater detail below, illustrated in FIG. 29.)

In one embodiment, the user interactions 212a returned in the explicit feedback loop may be queued for processing as resources become available. Accordingly, an implicit feedback loop is preferably provided. The implicit feedback loop is based on a subset of the organizing principles of the enhanced method of faceted classification to calculate implicit concept relationships 212b. Through the implicit feedback loop, the user interactions 212a with the dimensional concept taxonomy 210 are processed in near real-time.

Through the complex-adaptive system 212, the classification scheme that derives the dimensional concept taxonomy 210 is continually honed and expanded.

1.1.2 Domain Facet Analysis and Data Extraction 1.1.2.1 Extract Input Data

FIG. 9 illustrates operations 900 comprising operations to extract the input data 804 and certain preliminary steps thereto as discussed briefly with reference to FIG. 8.

Identify Structural Markers

Structural markers are identified 902 within the training set 802 to indicate where input data may be extracted from the training set. The structural markers comprise a source structure schema. The structural markers present in content containers 304 and may include, but are not limited to, the title of the document, descriptive meta tags associated with content, hyperlinks, relationships between tables in a database, or the prevalence of keywords 308 that exist in content containers. The markers may be identified by domain owners or others.

Operations 900 may be configured with default structural markers that apply across domains. For example, the URLs of Web pages are a common structural marker for content nodes 302. As such, the operations 902 can be configured with a multitude of default structural patterns that would apply in the absence of any explicit references in those areas in the source structure schema.

The structural markers may be located in the input data explicitly, or may be located as surrogates for the input data. For example, relationships between content nodes 302 may be used as the surrogate structural marker for concept relationships.

In the preferred embodiment, the structural markers may be combined to generate logical inferences about the source structure schema. If concept relationships are not explicit in the source structure schema, they may be inferred from structural markers such as concept signatures associated with content nodes 302, and a set of content node relationships. For example, a concept signature may be a title in a document mapped as a surrogate for a concept to be defined as described further. Content node relationships may be derived from the structural linkages between content nodes 302, such as the hyperlinks that connect Web pages.

The connection of concept signatures to content nodes 302, and the connection of content nodes 302 to other content nodes 302, infers concept relationships among the intersecting concepts. These relationships form additional (explicit) input data.

There are many different ways to identify structural markers as known to those of ordinary skill in the art.

Map Source Structure Schema to System Input Schema

The source structure schema is mapped to an input schema 904. In the preferred embodiment, the input schema is comprised of a set of concept signatures 906, a set of concept relationships 908, and a set of concept nodes 302.

This schema design is representative of the transformation processes and is not intended to be limiting. The input operations do not require source input data across every data element in the system input schema, so as to accommodate very simple structures.

The system input schema may also be extended to map to every element in a system data transformation schema. The system data transformation schema corresponds to every data entity that presents in the transformation processes. That is, the system input schema may be extended to map to every data entity in the system. In other words, the source structure schema may be comprised of a subset of the system input schema.

In addition, domain owners may map source data schema from very complex structures. As an example, the tables and attributes of a relational database may be modeled as facet hierarchies at various levels of abstraction and mapped to the multi-tier structure of the system data transformation schema.

Again, operations of the analysis engine 204a and build engine 208a provide a data structure transformation engine, and significant new utility is achieved in transforming one type of complex data structure (such as those modeled in relational databases) to another type of complex data structure (the complex dimensional structures produced through the methods and systems described herein). Product catalogs provide an example of complex data structures that benefit from this type of complex-to-complex data structure transformation. More information on an example data transformation schema is provided below, illustrated in FIG. 32.

Extract Input Data

An input data map may be applied against the training set to map its source structure schema to the input schema, extracting the input data 804. The preferred embodiment uses XSLT to encode the data map, which is used to extract the data from source XML files, as is known in the art The extraction methodology varies with many factors, including the parameters of the source structure schema and the location of the structural markers. For example, if the concept signature is precise—as with a document title, a keyword-based meta-tag, or a database key field-then the signature may be used directly to represent the concept label. For more complex signatures—such as the prevalence of keywords in the document itself—common text mining methodologies may be used. A simple methodology bases keyword extraction on a simple count of the most prevalent keywords in the documents.

Once extracted, the input data may be stored in one or more storage means coupled to the analysis engine 204a. For convenience, the figures and descriptions contained herein reference a data store 910 as the storage means but other stores may be used. For example, a domain data store 706 may be used particularly if the computing environment is a hosted environment.

The system input data are split into their constituent sets and passed to subsequent processes in the transformation engine:

Concept relationships are the inputs for the source structure analytics A, described below and illustrated in FIG. 10.

Concept signatures are processed to extract preliminary concept definitions B, described below and illustrated in FIG. 11.

Content nodes are processed as system output data C, described below and illustrated in FIG. 21.

The extraction of input data from source data structures, as described above, is one of many embodiments that may be employed for extracting input data. The other primary input channel to the analysis engine 204a is the feedback loops that comprise the complex-adaptive system in the preferred embodiment. As such, user interactions 212a are returned O to provide further input data. The details of this channel of input data and the feedback loops that comprise the complex-adaptive system are described below, illustrated in FIG. 29.

1.1.2.2 Processing of the Source Data Structure

Figure 10:
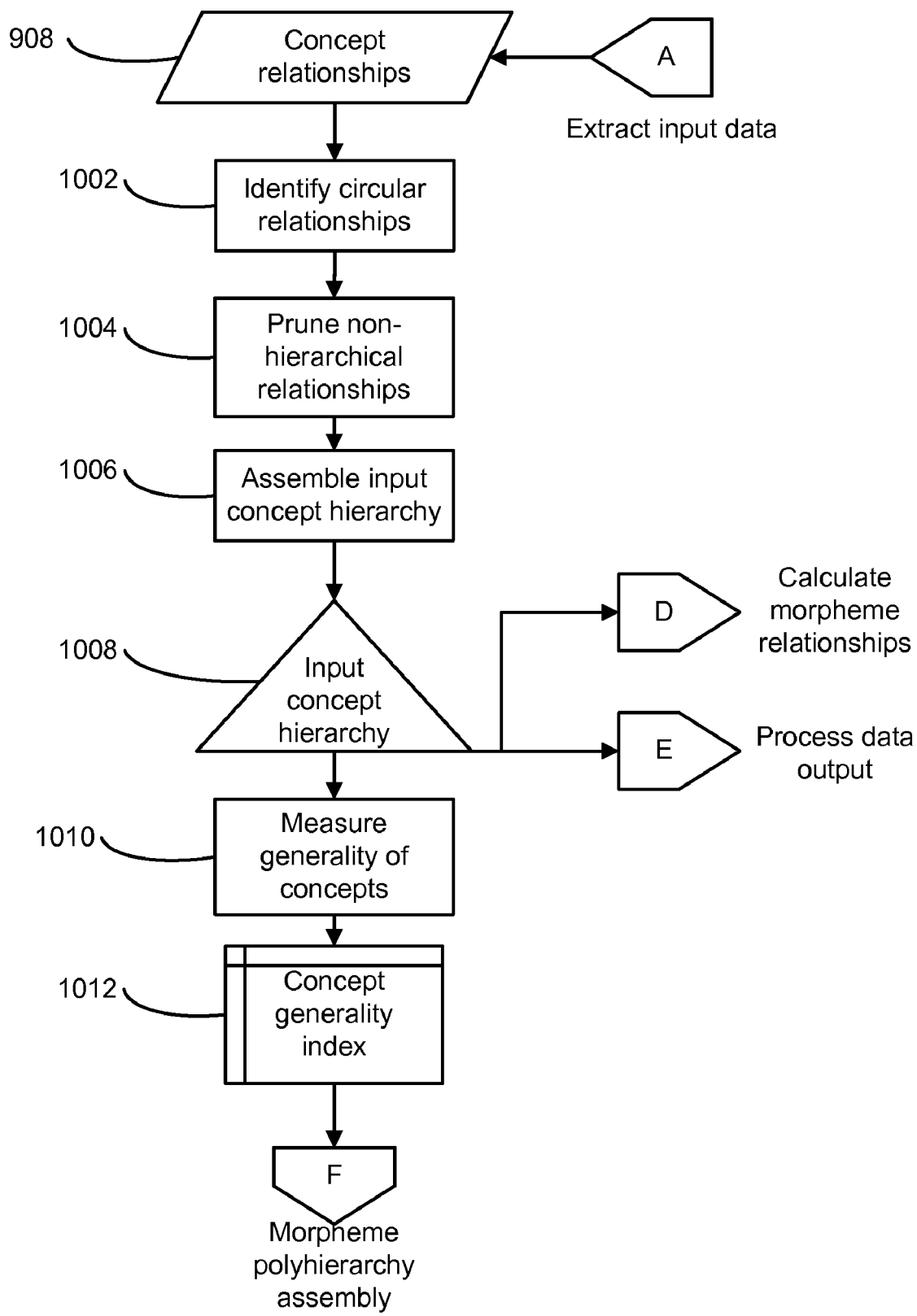
FIG. 10 illustrates a method of source structure analytics.

FIG. 10 illustrates the processing of the source data structure to extract source structure analytics. The source structure analytics provide data relating to a topology of the source data structure. The topology of the source data refers to a set of technical characteristics of the source data structure that describe its shape (characteristics such as the number of nodes contained in the structure, and the dispersal patterns of the relationships between nodes in the source data structure).

A primary objective of this analytical method is to measure the degree to which concepts 306 are general or specific (in relation to other concepts 306 in the training set 802). Herein, the measure of the relative generality or specificity of the concepts is referred to as the "generality". The source data characteristics analyzed in the preferred embodiment are described below. Specifics on the analytics and the characteristics will vary with the source data structures.

Concept relationships 908 are assembled for analysis. Circular relationships 1002 among the concepts 306 are identified (indicating the presence of non-hierarchical relationships) and resolved.

All concept relationships that are identified by the system as non-hierarchical are pruned from the set 1004. The pruned concept relationships are not involved in the subsequent processing, but may be made available for processing based on different transformation rules.

The concept relationships that were not pruned are processed as hierarchical relationships. The system assembles these concept relationships 1006 into an input concept hierarchy 1008 of all hierarchical concept relationships ordered into extended sets of indirect relationships. Assembling the input concept hierarchy 1008 involves ordering the nodes in the aggregate and removing any redundant relationships that may be inferred from other sets of relationships. The input concept hierarchy 1008 may comprise a polyhierarchy structure where entities may have more than one direct parent.

Once assembled, the input concept hierarchy 1008 comprises the structure for measuring the generality of the concepts 306 in the concept relationship set, as described in the steps below and is useful for other methods in the transformation process. The concept relationships in the input concept hierarchy 1008 are used to calculate potential morpheme relationships D, as described below and illustrated in FIGS. 13-14. The concept relationships in the input concept hierarchy are also used to process the output data for the system E, as described below and illustrated in FIG. 21.

The analysis of the input concept hierarchy proceeds to the measure of the generality of each concept 1010. Again, generality refers to how general or specific any given node is relative to the other nodes in the hierarchy 1008. Each concept 306 is assessed a generality measurement based on its location in the input concept hierarchy 1008.

Calculations are made of a weighted average degree of separation for each concept 308 from each root in the tree that intersects with the concept 306. The weighted average degree of separation refers to the distance of each concept 306 from the concepts 306 at the root nodes. Concepts 306 that are unambiguously root nodes are assigned a generality measure of one. The generality measurement increases for more specific concepts 306, reflecting their increased degree of separation from the most general concepts 306 that reside at the root nodes. Those skilled in the art will appreciate that many other measures of generality are possible.

The generality measurements for each concept 306 are stored in a concept generality index 1012 (e.g. in data store 910). The concept generality index 1012 is used to infer a set of generality measurements for the morphemes F, as described below and illustrated in FIGS. 16-17.

The methods described in the preferred embodiment apply to hierarchical-type relationships, also known as parent-child relationships. Parent-child relationships encompass a great deal of diversity in the types of relationships they can support. Examples include: whole-part, genus-species, type-instance, and class-subclass. In other words, by supporting hierarchical type relationships, the present invention applies to a huge expanse of classification tasks.

1.1.2.3 Process Preliminary Concept Definitions

Figure 11:
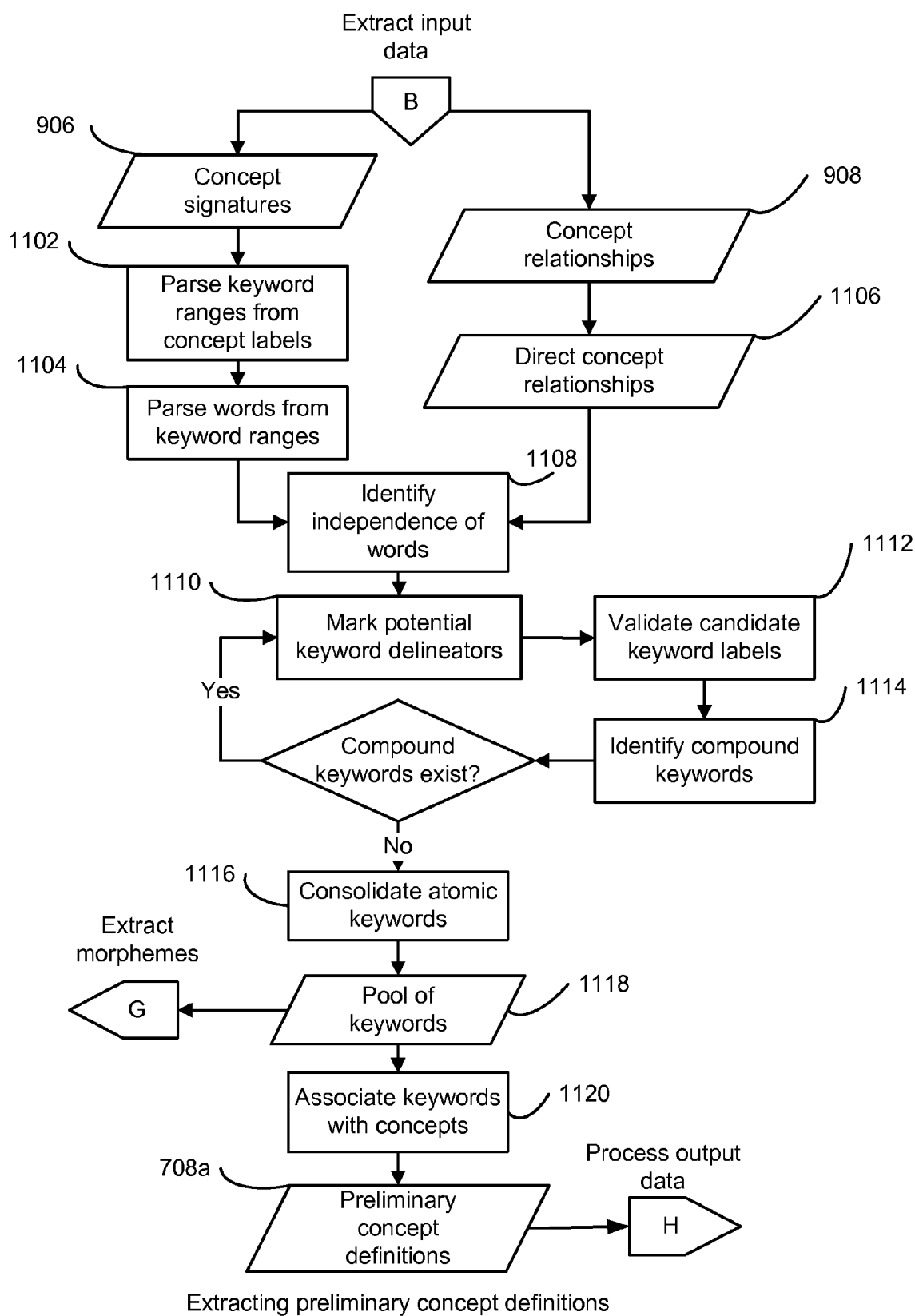
FIG. 11 illustrates a process of extracting preliminary concept-keyword definitions.

FIG. 11 illustrates a method of keyword extraction to generate the preliminary concept definitions. A primary objective of this process is to generate a structural definition for the concepts 306 in terms of keywords 308. At this stage in the preferred embodiment, the concept definitions are described as "preliminary" because they will be subject to revision in later stages.

Those of ordinary skill in the art will appreciate that there are many methods and technologies that may be directed to the goal of extracting keywords 308 as structural representations of concepts 306.

In the preferred embodiment, the level of abstraction applied to keyword extraction is limited. These limits are designed to derive keywords with the following qualities: Keywords are defined using (extracted based on) atomic concepts (where concepts present in other areas of the training set) and in response to the independence of words within direct relationship sets.

Concept signatures 906 and concept relationships 908 are gathered for analysis. In the preferred embodiment, this process is based on the extraction of textual entities. As such, in the description that follows, the concept signatures 906 are assumed to map directly to the concept labels that are assigned to concepts 306.

As labels are identified in the concept signatures 906, a relevant portion of the text string is extracted and used as the concept label 306a. In subsequent methods, as keywords 308 and morphemes 310 are identified in concepts 306, labels for keywords 308a and morphemes 310a are extracted from the relevant portions of the concept label 306a.

These domain-specific labels are eventually written to the output data. If the operations 800 are transforming a data structure that has been previously analyzed and classified, the entity labels are available directly in the source data structure. More details on this are provided in the description of the output data, below.

Note that this juncture between concept signature and concept label extraction represents an integration point for a wide variety of entity extraction tools, directed at many types of content nodes 302, such as images, multimedia, and the classification of physical objects.

A series of keyword delineators are identified in the concept labels. Preliminary keyword ranges 1102 are parsed from the concept labels 306a based on common structural delineators of keywords 308 (such as parentheses, quotes, and commas). Whole words are then parsed from the preliminary keyword ranges 1104, again using common word delineators (such as spaces and grammatical symbols). These pattern-based approaches to textual entity parsing are well known in the art.

The parsed words from the preliminary keyword ranges 1102 comprise one set of inputs for the next stage in the keyword extraction process. The other set of inputs is a direct concept relationship set 1106. The direct concept relationship set 1106 is derived from the set of concept relationships 908. The direct concept relationship set 1106 is comprised of all direct relationships (all direct parents and all direct children) for each concept 306.

These inputs are used to examine the independence of words in the preliminary keyword ranges 1108. Single word independence within direct relationship sets 1106 comprises delineators for keywords 308. After the keyword ranges have been delineated, checks are performed to ensure that all portions of the derived keywords 308 are valid. Specifically, all sections of the concept label 306*a* that are delineated as keywords 308 must pass the word independence test.

In the preferred embodiment, the check for word independence is based on a method of word stem (or word root) matching, hereafter referred to as "stemming". There are many methods of stemming, well known in the art. As described in the methods of morpheme extraction below, illustrated in FIG. 12, stemming provides an extremely fine basis for classification.

Based on the independence of words in the preliminary keyword ranges, an additional set of potential keyword delineators 1110 are identified. In simplified terms, if a word presents in one concept label 306*a* with other words, and in a related concept label 306*a* absent those same words, than that word may delineate a keyword.

However, before the concept labels 306*a* are parsed to keyword labels 308*a* on the basis of these keyword delineators, the candidate keyword labels are validated 1112. All candidate keyword labels must pass the word independence test described above. This check prevents the keyword extraction process from fragmenting concepts 306 beyond the target level of abstraction, namely atomic concepts.

Once a preliminary set of keyword labels is generated, the system examines all preliminary keyword labels in the aggregate. The intent here is to identify compound keywords 1114. Compound keywords present as more than one valid keyword label within a single concept label 306*a*. This test is based directly on the objective of atomic keywords as the scope of the concept-keyword abstraction.

In the preferred embodiment, recursion is used to exhaustively split the set of compound keywords into the most elemental set of keywords 308 that is supported by the training set 802.

If compound keywords remain in the evolving set of keyword labels, an additional set of potential keyword delineators 1110 is generated, where the matching atomic keywords are used to locate the delineators. Again, the delineated keyword ranges are checked as valid keywords, keywords are extracted, and the process repeats until no more atomic keywords can be found.

A final method round of consolidation is used to disambiguate keyword labels across the entire domain. Disambiguation is a well known requirement in the art, and there are many approaches to it. It general, disambiguation is used to resolve ambiguities that emerge when entities share the same labels.

In the preferred embodiment, a method of disambiguation is provided by consolidating keywords into single structural entities that share the same label. Specifically, if keywords share labels and intersecting direct concept relationship sets, then there exists a basis for consolidating the keyword labels, associating them with a single keyword entity.

Alternatively, this method of disambiguation may be relaxed. Specifically, by removing the criterion of intersecting direct concept relationship sets, all shared keyword labels in the domain consolidate to the same keyword entities. This is a useful approach when the domain is relatively small or quite focused in its subject matter. Many methods of disambiguation are known in the art.

The result of this method of keyword extraction is a set of keywords 1118, abstracted to the level of "atomic concepts". The keywords are associated 1120 with the concepts 306 from which they were derived, as the preliminary concept definitions 708*a*. These preliminary concept definitions 708*a* will later be extended to include morpheme entities in their structure, a deeper and more fundamental level of abstraction.

The entities 708*a* derived from this process are passed to subsequent processes in the transformation engine. Preliminary concept definitions 708*a* are the inputs to the morpheme extraction process G, described below and illustrated in FIG. 12 and output data process H, described below and illustrated in FIG. 21.

1.1.2.4 Extract Morphemes

In traditional faceted classification, the attributes for facets are generally limited to concepts that can be identified and associated with other concepts using human cognition. As a result, the attributes may be thought of as atomic concepts, in that the attributes constitute concepts, absent any deeper context.

The methods described herein use statistical tools across large data sets to identify elemental (morphemic), irreducible attributes of concepts and their relationships. At this level of abstraction, many of the attributes would not be recognizable to human classificationists as concepts. However, when combined into relational data structures across entire domains, they are able to carry the semantic meaning of the concepts using less information.

Figure 12:
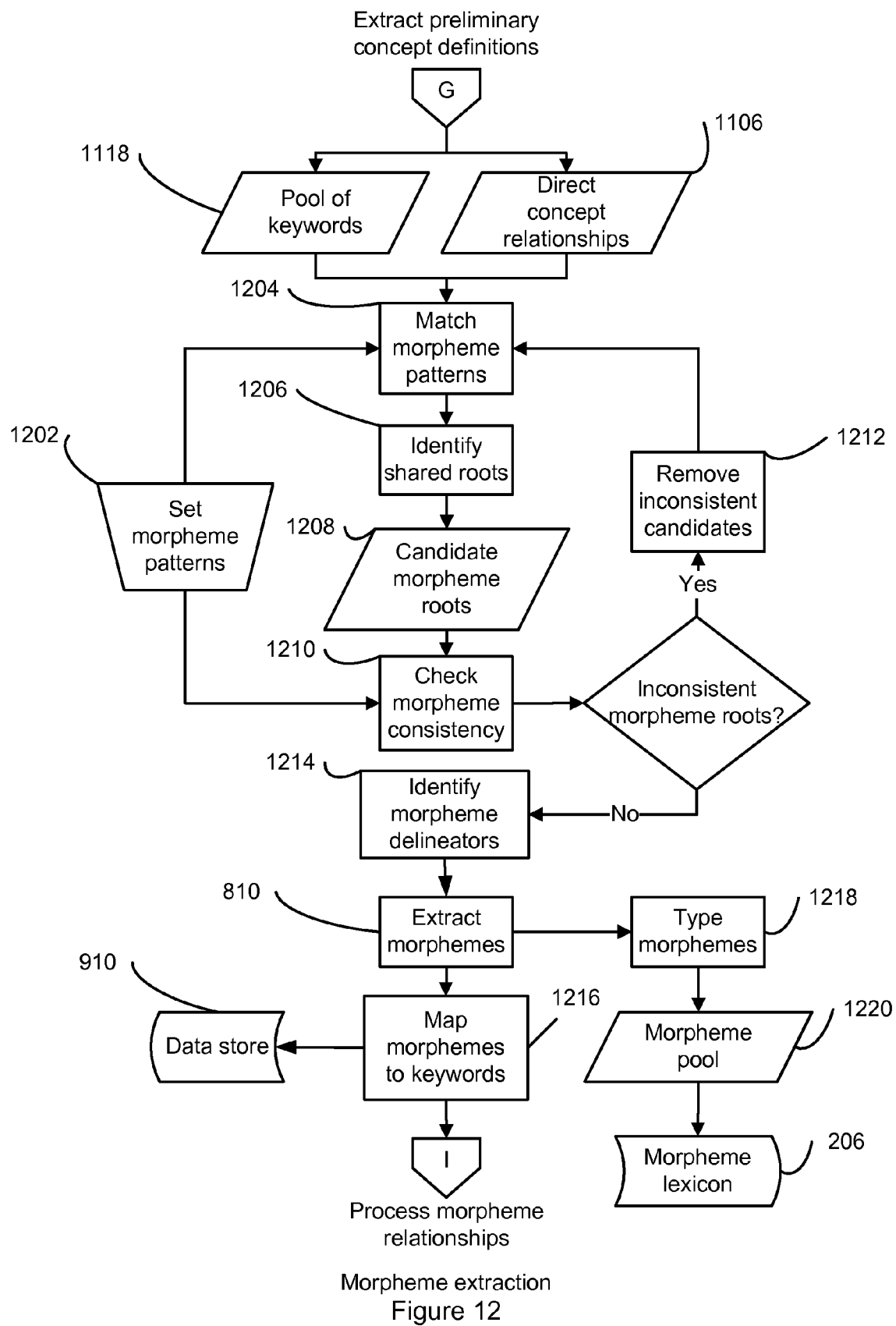
FIG. 12 illustrates a method of extracting morphemes.

FIG. 12 illustrates the method by which morphemes 310 are parsed and associated with keywords 308 to extend the preliminary concept definitions 708*a*. The method of morpheme extraction continues from the method of generating the preliminary concept definitions, described above and illustrated in FIG. 11.

Note that in the preferred embodiment, the methods of morpheme extraction have elements in common with the methods of keyword extraction. Herein, a more cursory treatment is afforded this description of morpheme extraction where these methods overlap.

The pool of keywords 1118 and the sets of direct concept relationships 1106 are the inputs to this method.

Patterns are defined to use as criteria for identifying morpheme candidates 1202. These patterns establish the parameters for stemming, and include patterns for whole word as well as partial word matching, as is well known in the art.

As with keyword extraction, the sets of direct concept relationships 1106 provide the context for pattern-matching. The patterns are applied 1204 against the pool of keywords 1118 within the sets of direct concept relationships in which the keywords occur. A set of shared roots based on stemming patterns are identified 1206. The set of shared roots comprise the set of candidate morpheme roots 1208 for each keyword.

The candidate morpheme roots for each keyword are compared to ensure that they are mutually consistent 1210. Roots residing within the context of the same keyword and the direct concept relationship sets in which the keyword occur are assumed to have overlapping roots. Further, it is assumed that the elemental roots derived from the intersection of those overlapping roots will remain within the parameters used to identify valid morphemes.

This validation check provides a method for correcting errors that present when applying pattern-matching to identify potential morphemes (a common problem with stemming methods). More importantly, the validation constrains excessive morpheme splitting and provides a contextually meaningful yet fundamental level of abstraction.

The series of constraints on morpheme and keyword extraction designed in the preferred embodiment also provide a negative feedback mechanism within the context of the complex-adaptive system. Specifically, these constraints work to counteract complexity and manage it within set parameters for classification.

Through this morpheme validation process, any inconsistent candidate morpheme roots are removed from the keyword sets 1212. The process of pattern matching to identify morpheme candidates is repeated until all inconsistent candidates are removed.

The set of consistent morpheme candidates is used to derive the morphemes associated with the keywords. As with the keyword extraction methods, delineators are used to extract morphemes 1214. By examining the group of potential roots, one or more morpheme delineators may be identified for each keyword.

Morphemes are extracted 810 based on the location of the delineators within each keyword label. More significant is the process of deriving one or more morpheme entities to provide a structural definition to the keywords. The keyword definitions are constructed by relating (or mapping) the morphemes to the keywords from which they were derived 1216. These keyword definitions are stored in the domain data store 706.

The extracted morphemes are categorized based on the type of morpheme (as for example, free, bound, inflectional, or derivational) 1218. In later stages of the construction process, the rules for building concepts may vary based on the type of morphemes involved and whether these morphemes are bound to other morphemes.

Once typed, the extracted morphemes comprise the pool of all morphemes in the domain 1220. These entities are stored in the system's morpheme lexicon 206.

A permanent inventory of each morpheme label may be maintained to be used to inform future rounds of morpheme parsing. (For more information, see the overview of the data structure transformations above, illustrated in FIG. 7.)

The morphemes derived from this process are passed to subsequent processes in the transformation engine to process morpheme relationships I, as described below and illustrated in FIGS. 13-14.

Those of ordinary skill in the art will appreciate that there are many algorithms that may be used to discover and extract keyword definitions comprised of morphemes.

1.1.2.5 Calculate Morpheme Relationships

Morphemes provide one set of elemental constructs that anchor the system's multi-tier faceted data structures. The other elemental construct are morpheme relationships. As discussed above and illustrated in FIGS. 3-5, morpheme relationships provide a powerful basis for creating dimensional concept relationships.

However, the challenge is in identifying truly morphemic morpheme relationships in the noise of ambiguity that exists in classification data. The multi-tier structure of the present invention provides one address to this challenge. By validating relationships across multiple levels of abstraction, ambiguity is successively pared away.

The sections that follow provide a second address to the challenge of discovering morpheme relationships. Specifically, methods of pattern augmentation are used to strip away noise to enhance the statistical identification of the elemental constructs.

Overview of Potential Morpheme Relationships

Figure 13:
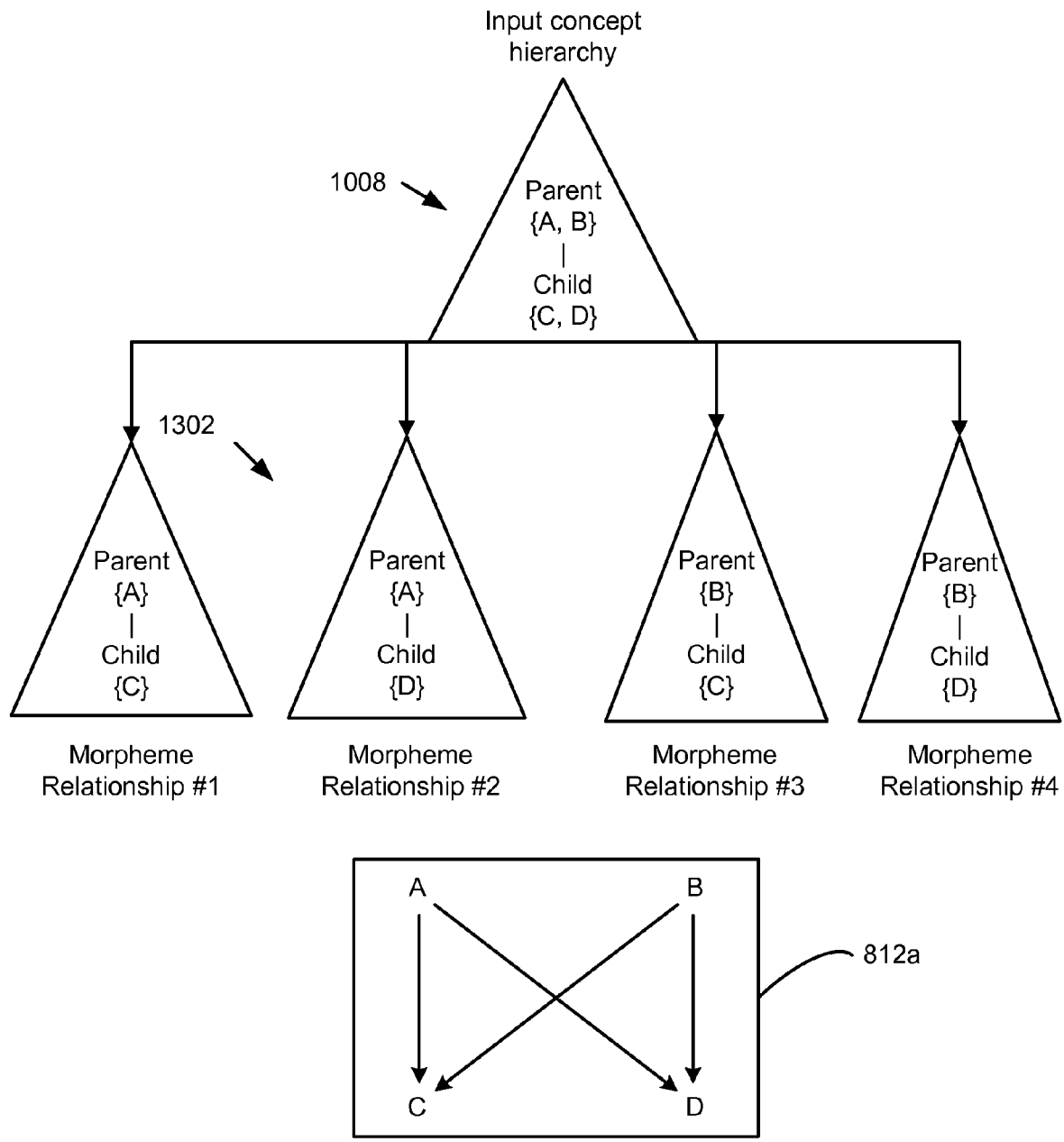
FIGS. 13-14 illustrate a process of calculating potential morpheme relationships from concept relationships.

FIG. 13 illustrates the method by which potential morpheme relationships are inferred from concept relationships in the training set.

Potential morpheme relationships are calculated to examine the prevalence of individual potential morpheme relationships in the aggregate of all concept relationships. Based on this examination, statistical tests may be applied to identify candidate morpheme relationships that have a high likelihood of holding true in the context of all the concept relationships in which they present.

In the system of the preferred embodiment, potential morpheme relationships are constructed as all permutations of relationships that may exist between morphemes in related concepts, wherein the parent-child directionality of the relationships are preserved.

In the example in FIG. 13, a portion of the input concept hierarchy 1008 shows a relationship between two concepts. The parent concept and its related child concept contain the morphemes {A, B} and {C, D}, respectively.

Again, concepts are defined in terms of one or more morphemes (grouped via keywords, in the preferred embodiment). As a result, any relationship between two concepts will imply at least one (and often more than one) relationship between the morphemes that define the concepts.

In this example, the process of calculating potential morpheme relationships is illustrated. Four potential morpheme relationships 812a may be inferred from the single concept relationship. Maintaining the parent-child directionality established by the concept relationship, and disallowing any repetition, there are four potential morpheme relationships that can be derived: A→C, A→D, B→C, B→D.

In general, if the parent concept contains X morphemes and the child concept contains y morphemes, then there will exist X times y potential morpheme relationships: the number of potential morpheme relationships is the product of the number of morphemes in the parent and child concepts.

In the preferred embodiment, this simple illustration of calculating morpheme relationships is refined to improve the statistical indicators generated. These refinements (namely, aligning morphemes) are noted below in the description of the method of potential morpheme relationship calculations, illustrated in FIG. 14.

These refinements to the basic method of identifying potential morpheme relationships serve to reduce the number of potential morpheme relationships. This reduction, in turn, reduces the amount of noise, thus augmenting the patterns that identify morpheme relationships, and makes the statistical identification of morpheme relationships more reliable.

Again, those of ordinary skill in the art will appreciate that there are many algorithms that may be used to derive potential morpheme relationships from a given set of concept relationships.

Method of Calculating Potential Morpheme Relationships

Figure 14:
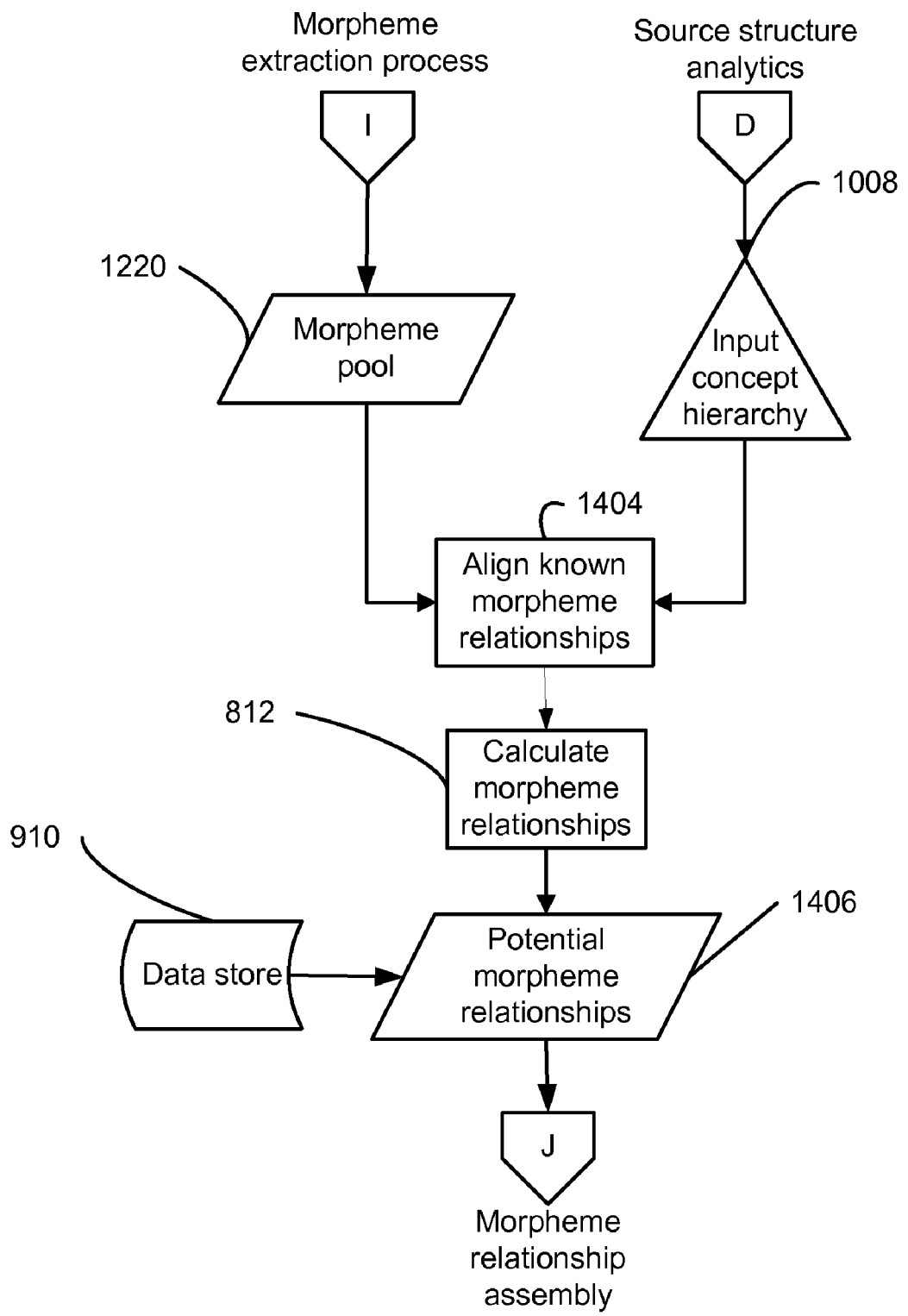

FIG. 14 presents the preferred embodiment of the process of calculating potential morpheme relationships in greater detail.

The intent here is to generate a set of potential morpheme relationships, which will later be analyzed to assess the likelihood that they are truly morphemic in nature (that is, they hold in every context that they present).

The present method of calculating potential morpheme relationships continues from the method of source structure analytics D, described above and illustrated in FIG. 10.

The method also extends from the methods of morpheme extraction I, as described above and illustrated in FIG. 12.

The inputs to this method of determining potential morpheme relationships are the pool of morphemes extracted from the domain 1220 and the input concept hierarchy 1008 that contains the validated set of concept relationships from the domain.

Morphemes within each concept relationship pair are aligned 1404 to reduce the number of potential morpheme relationships that may be inferred. Specifically, if two data elements are aligned, these elements cannot be combined with any other element in the same concept relationship pair. Through alignment, the number of candidate morpheme relationships is reduced.

In the preferred embodiment, axes are aligned based on shared morphemes, and include all morphemes bound to the shared morphemes. For example, if one concept is "Politics in Canada" and the other is "International Politics", the shared morphemes in the keyword "Politics" may be used as a basis for alignment.

Axes are also aligned based on existing morpheme relationships within the morpheme lexicon. Specifically, if any given potential morpheme relationship may be represented by morpheme relationships in the morpheme lexicon, either directly or indirectly constructed using sets of morpheme relationships, then the potential morpheme relationship is aligned on this basis.

An external lexicon (not shown in FIG. 14) may also be used to direct the alignment of potential morpheme relationships. WordNet, for example, is a lexicon that may be applied to alignment. A variety of information contained within the external lexicon may be used as the basis for the direction. Under one embodiment, keywords are first grouped by parts of speech; potential morpheme relationships are constrained to combine only within these grammatical groupings. In other words, alignment is based on grammatical parts of speech, as directed by the external lexicon. Direct morpheme relationships that may be inferred from an external lexicon may also be used as a basis for alignment.

The potential morpheme relationships are calculated 812 as all combinations of morphemes that are not involved in aligned sets. This calculation is described above and illustrated in FIG. 13.

The resultant set of potential morpheme relationships 1406 is held in the domain data store 910. Here the inventory of potential morpheme relationships is tracked as they present in the training set and are pruned through subsequent stages of analysis.

The potential morpheme relationships derived from this process are passed to the process for pruning and morpheme relationship assembly J, as described below and illustrated in FIGS. 15-17.

1.1.2.6 Prune Potential Morpheme Relationships

Preferably, the pool of potential morpheme relationships generated through the methods described above and illustrated in FIGS. 13-14 are pruned down to a set of candidate morpheme relationships.

Potential morpheme relationships are pruned based on an assessment of their overall prevalence in the training set. Those potential morpheme relationships that are highly prevalent have a greater likelihood of being truly morphemic (that is, of holding the relationship in every context).

In addition, morpheme relationships are assumed to be unambiguous in their relationships with more general (broader) related morphemes. The structural marker for this ambiguity is polyhierarchies. Morpheme relationships embody fewer attributes and provide more definite bases for relating morphemes. As such, potential morpheme relationships may also be pruned as they present in polyhierarchies.

To construct a hierarchy of morpheme relationships, it is preferable to use a set of morpheme relationship pairs that are also hierarchical. As such, the pool of potential morpheme relationships is analyzed in the aggregate to identify relationships that contradict this assumption of hierarchy.

The candidate morpheme relationships that survive this pruning process are preferably assembled into morpheme hierarchies. Whereas the candidate morpheme relationships are parent-child pairings, the morpheme hierarchies extend to multiple generations of parent-child relationships.

Figure 15A:
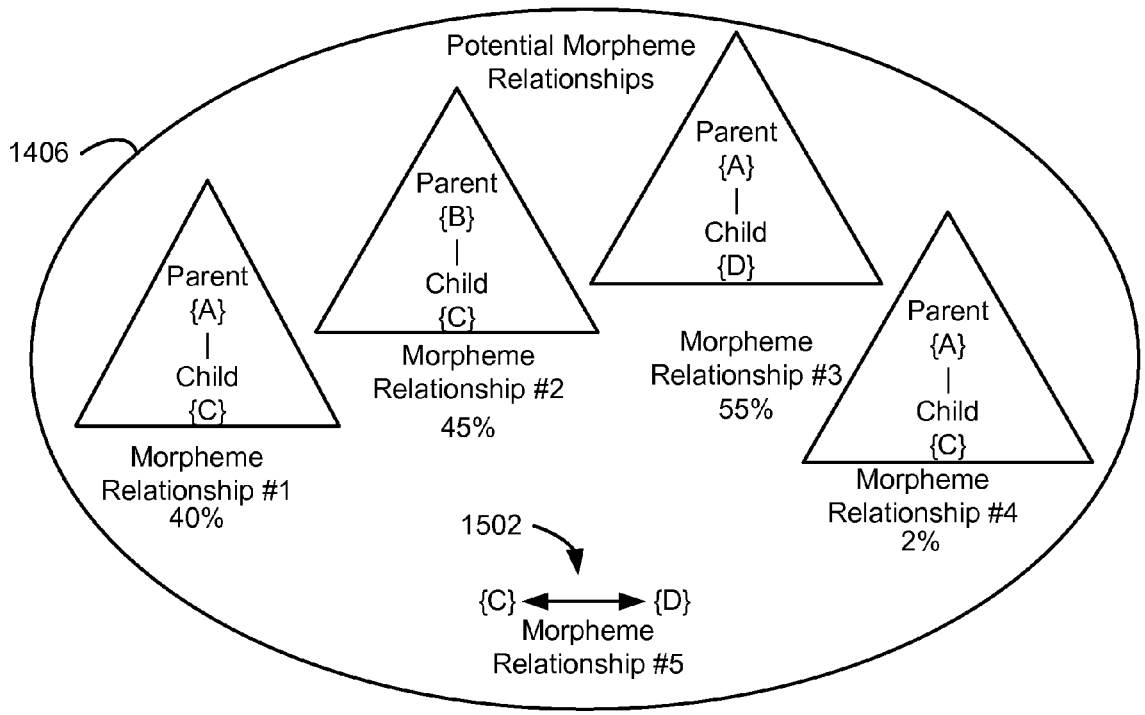
FIGS. 15A-15B, 16 and 17 illustrate a process of assembling a polyhierarchy of morpheme relationships from the set of potential morpheme relationships.
Figure 15B:
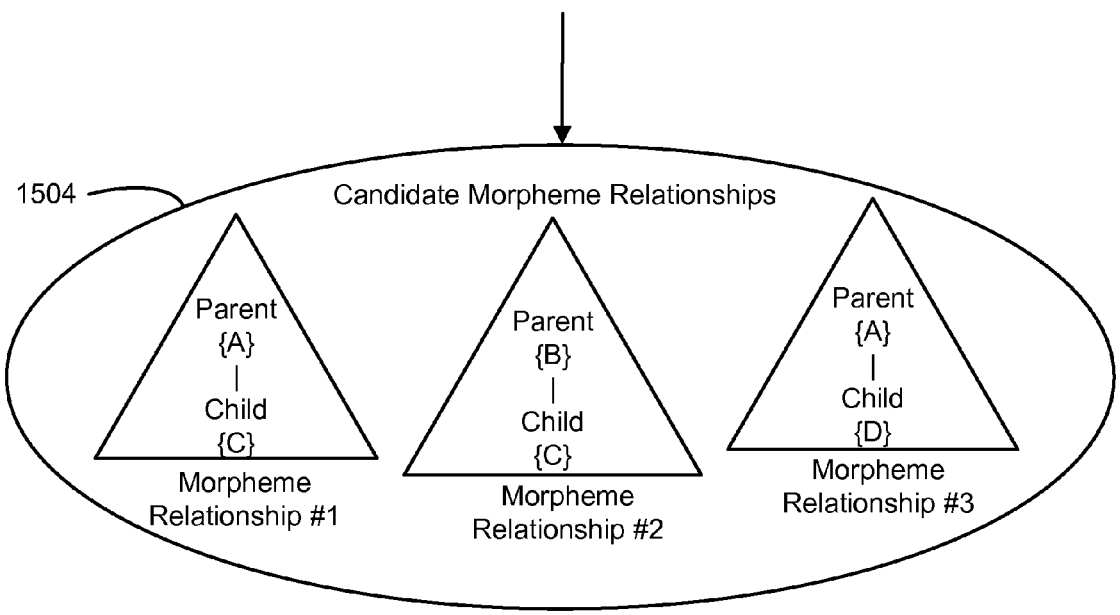

FIG. 15A and FIG. 15B illustrate the difference between potential morpheme relationships and the pruned set of candidate morpheme relationships.

In FIG. 15A, there are four potential morpheme relationship pairs that are hierarchical (parent-child). The first three of these relationships are relatively prevalent in the domain, but the fourth is relatively rare. Accordingly, the fourth pair is pruned from the set of potential morpheme relationships.

The first three relationship pairs in the set of potential morpheme relationships 1406 are also consistent with the assumption of hierarchy. However, the bi-directional fifth relationships 1502 conflict with this assumption. The direction of relationship D→C conflicts with the relationship C→D. This morpheme pair is re-typed as related through an associative relationship and removed from the set of candidate morpheme relationships 1504. FIG. 15B shows the pruned set of candidate morpheme relationships.

1.1.2.7 Assemble Morpheme Relationships

Merging Morpheme Relationships

Figure 16:
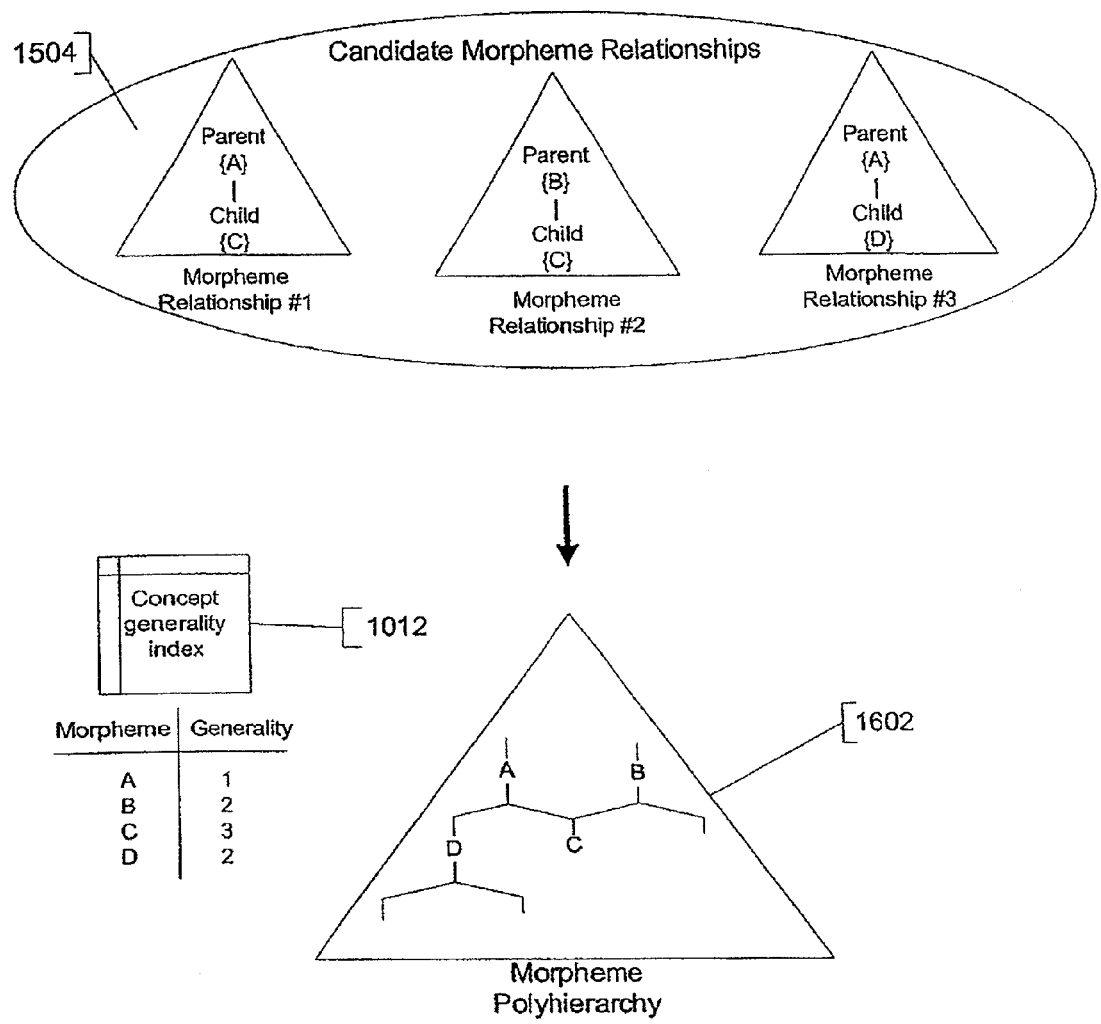

FIG. 16 illustrates the consolidation of candidate morpheme relationships into an overall morpheme polyhierarchy. All candidate morpheme relationship pairs are incorporated into one aggregate set, connecting logically consistent generational trees (as described in more detail below).

This data structure is described as a "polyhierarchy" since it may result in singular morphemes involved in more than one direct relationship with more general morphemes (multiple parents). This polyhierarchy will be transformed into a strict hierarchy (single parents only) in later stages of the process.

The potential morpheme relationships that survive the conflict pruning process (described above and illustrated in FIG. 15B) are collected into a set of candidate morpheme relationships 1504. Preferably, the set of candidate morpheme relationships should be merged into an overall morpheme polyhierarchy 1602.

In the preferred embodiment, the constraints on the process of constructing the overall polyhierarchy are: 1) that the set of candidate morpheme relationships in the polyhierarchy is logically consistent in the aggregate; 2) that the polyhierarchy uses the least number of polyhierarchical relationships necessary to create a logically consistent structure.

A recursive ordering algorithm may be used to assemble the trees and highlight conflicts and proposed resolutions. The reasoning applied to the following example illustrates the logic of this algorithm.

Based on relationship hierarchy #1, A is superior (that is, more general) than C. Based on hierarchy #2, B is superior to C. Based on hierarchy #3, A is superior to D. The four morphemes can be logically combined with A and B superior to C, and A superior to D.

Where more than one logical ordering is possible, the concept generality index 1012 is used to resolve the ambiguity. (The concept generality index is created through a method of source structure analytics, described above and illustrated in FIG. 10.) This index is used to compare morphemes to assess whether morphemes are relatively more general or more specific than other morphemes (with the generality measured in terms of the degrees of separation from the root nodes).

In the example, both A and B are logically consistent topmost nodes based on the set of candidate morpheme relationships. A and B are also both parent to C. Thus, a polyhierarchical set of relationships is generated at C. Since there is no information in the sample set to conflict with the polyhierarchical set of relationships, the relationships are assumed valid. Processing would continue to resolve the polyhierarchies in later stages.

If new data presented that indicated that A and B were instead related nodes through indirect relationships, then the system would resolve the polyhierarchy immediately and order A and B in the same tree. The priority of A and B would be determined through the generality index. Here, A has a lower generality ranking than B. It is thus accorded a higher (more general) position in the resultant polyhierarchy 1602.

Morpheme Polyhierarchy Assembly

Figure 17:
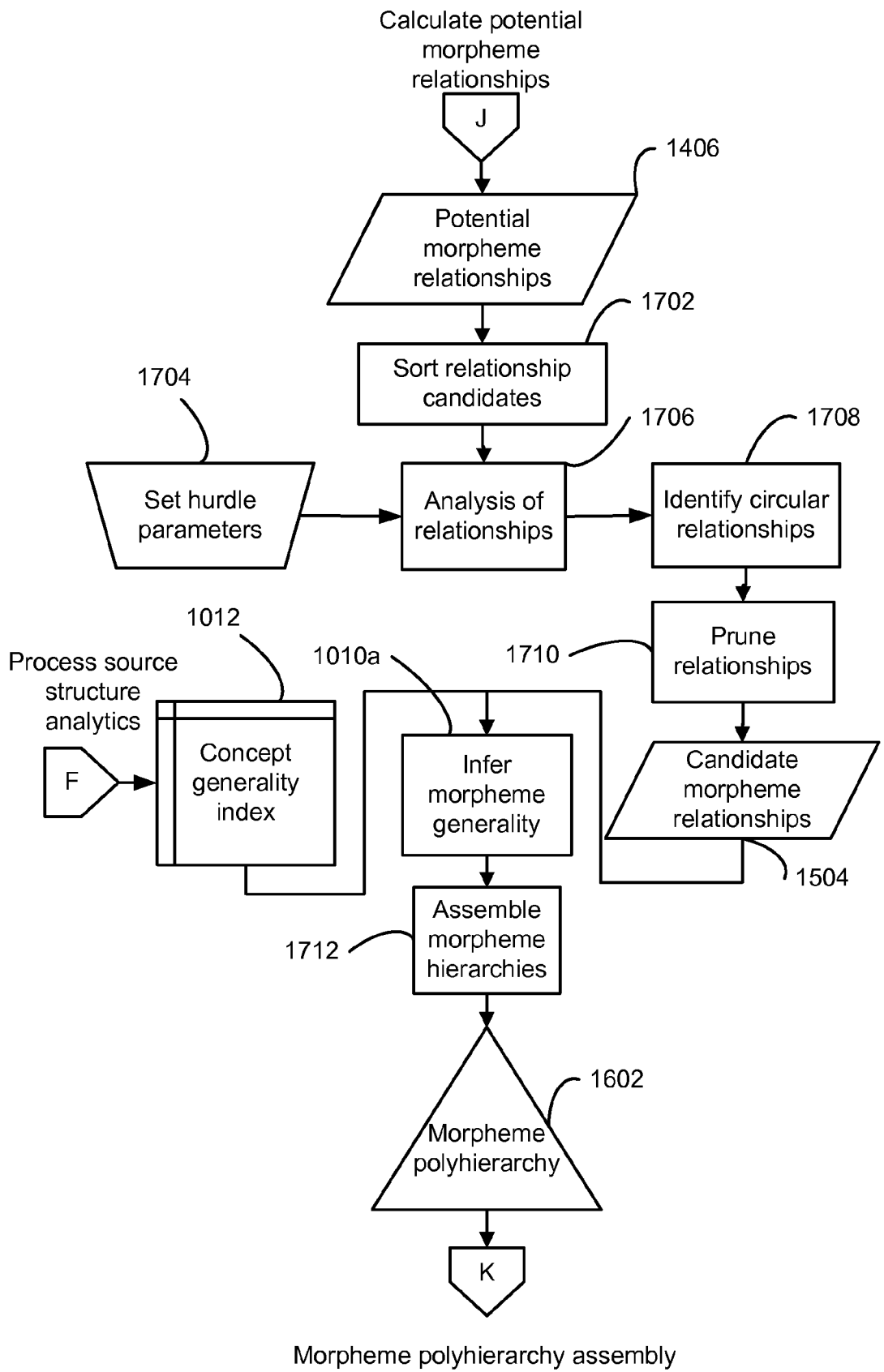

FIG. 17 illustrates a method by which the morpheme polyhierarchy may be assembled from the candidate morpheme relationships.

The morpheme hierarchy is assembled by analyzing the candidate morpheme relationship pairs in the aggregate. As in input concept hierarchy assembly, the objective is to consolidate the individual pairs of relationships into a unified whole.

The method of morpheme relationship assembly continues from the method of calculating the potential morpheme relationships J, described above and illustrated in FIG. 13-14.

The set of potential morpheme relationships 1406 is the input to this method. The candidate morpheme relationships are sorted 1702 based on an analysis of the concept relationships that contain the morphemes. The concept relationships are sorted based on the aggregate count of morphemes in each concept relationship pair (lowest to highest).

Morpheme relationships increase in likelihood as the number of morphemes involved in the concept relationship pair decreases (since the probability for any given morpheme relationship candidate is factored by the number of potential candidates in the pair). Therefore, in the preferred embodiment, the operations prioritize the analysis of concept relationships with lower morpheme counts. Lower the number of morphemes in the pair and you increase the chances of finding a truly morphemic morpheme relationship.

Parameters to define the statistically relevant boundaries of morpheme relationships are set 1704. These parameters are based on the prevalence of the morpheme relationships in the aggregate. The object is to identify those that are highly prevalent in the domain. These constraints on the morpheme relationships also contribute to the negative feedback mechanism of the complex-adaptive system. An analysis of the relationship set 1706 in the aggregate is conducted to determine the overall prevalence of each relationship. This analysis may preferably combine statistical tools conducted within sensitivity parameters controlled by system administrators. The exact parameters are tailored to each domain and may be changed by domain owners and system administrators.

As with the concept relationship analysis, circular relationships 1708 are used as a structural marker to negate the assumption of hierarchical relationships. Potential morpheme relationships are pruned if they do not pass the filters of prevalence and hierarchy 1710.

The pruned set of potential morpheme relationships comprises the set of candidate morpheme relationships 1504. The generality of the morphemes 1010$a$ is inferred from the generality of the source structure concepts, as embodied in the concept generality index 1012.

Concepts embodying the lowest numbers of morphemes are used as surrogates for the generality of each morpheme. To illustrate the basis of this assumption, assume that a concept is comprised of only one morpheme. Given the high degree of relatedness between the concept and the single morpheme that comprises it, it is likely that the generality of the morpheme would closely correlate to the generality of the concept.

This reasoning directs the calculation of morpheme generality in the preferred embodiment. Specifically, the system gathers the set of concepts that embody the lowest number of morphemes in the aggregate. That is, the system selects a set of concepts that represents all morphemes in the set.

The concept generality index 1012 is to be used to prioritize dimensional concept relationships and is preferably stored (not shown) in the domain data store 706.

Morpheme hierarchies are assembled into an overall polyhierarchy structure 1712, using a method as described above and illustrated in FIG. 16. This involves ordering the nodes in the aggregate and removing any redundant relationships that may be inferred from other sets of indirect relationships. The concept generality index created is used to order the morphemes from most general to most specific.

Those of ordinary skill in the art will appreciate that there are many algorithms that may be used to merge a collection of hierarchical morpheme relationships into a polyhierarchy, as is known in the art.

1.1.2.8 Assemble Morpheme Hierarchy

FIGS. 18A-20 illustrate the transformation of the morpheme polyhierarchy into a morpheme hierarchy.

Morpheme Polyhierarchy Attribution

Figure 18A:
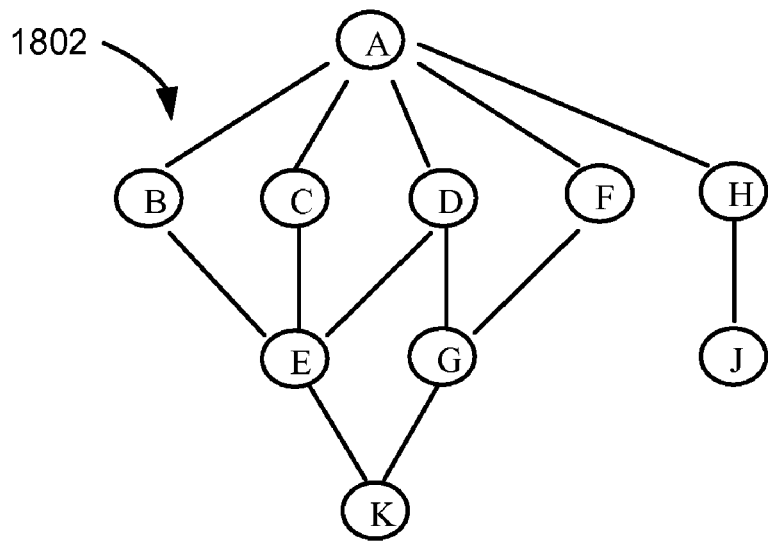
FIGS. 18A, 18B and 19 illustrate the reordering of morpheme polyhierarchy into a strict hierarchy using a method of attribution.
Figure 18B:
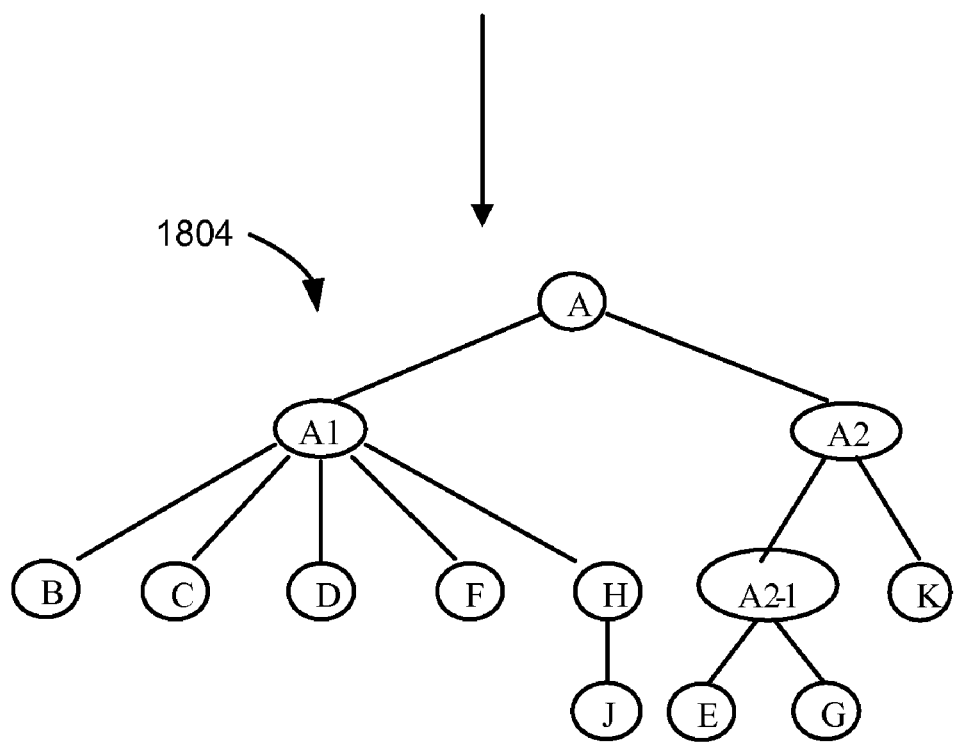

FIGS. 18A-18B illustrate a process of morpheme attribution and example results. Attribution in this context refers to the manner in which facet attributes are ordered and assigned to data elements. Just as the operations place constraints on entity extraction (such as keyword and morpheme extraction), the morpheme hierarchy is built using explicit constraints on morpheme relationships.

The morpheme relationships that link morphemes into hierarchies are, by definition, morphemic. Morphemic entities are fundamental and unambiguous. Morphemes must thus relate to only one parent. In a set of morpheme relationships (the morpheme hierarchy), morphemes can exist in only one location.

Based on these definitions in the preferred knowledge representation model, morphemes can be presented as attributes within facet hierarchies of morphemic data. The knowledge representation model thus provides for the faceted data and multi-tier enhanced method of faceted classification.

In the preceding methods, the aggregation of candidate morpheme relationships may present sets of morpheme polyhierarchies 1802. Thus, attribution is used to weigh these conflicts in the knowledge representation model and resolve solutions 1804.

The method of attribution in the preferred embodiment involves finding a place for each morpheme in the hierarchy that does not conflict with the morphemic requirements of hierarchy.

Morphemes in polyhierarchies may ascend to new positions within their original trees or moved to entirely new trees. This process of attribution ultimately defines the topmost root morpheme nodes in the facet hierarchy. Thus, the root morpheme nodes in the morpheme hierarchy are defined as the morpheme facets, with each morpheme contained within the morpheme facet attribute trees.

The following discussion illustrates the method for removing multiple parents using the concept of attributes.

Again, the structural marker for the conflict is the presence of multiple parents presenting in the morpheme polyhierarchy 1802. To remove the conflicts, morphemes with multiple parents are reconsidered as attributes of the ancestors of the shared parents.

Preferably, attribute classes are created to maintain the grouping of the parents originally shared by the reorganized morpheme and to keep the morpheme in a separate attribute class from those parents. (In cases where there is no unique ancestor, the method promotes the morphemes to the root level of the hierarchy, as a new morpheme facet.)

Preferably, relationships are reorganized into attribute classes from the root nodes to the leaf nodes. Multiple parents are first reorganized into attributes so that a singular parent can be identified. That is, top-down traversal of the morpheme relationships provides for attribution that resolves to a solution set 1804.

Generally, if two morphemes share at least one parent, they are siblings (associative relationship) in the context of that shared parent. Sibling child nodes may be grouped under a single attribute class. (Note that the child nodes need only share one parent; they need not share all parents.) If morphemes do not share at least one parent, they are grouped as separate attributes of the shared ancestor.

To choose between alternatives, we weigh the relevance of the source relationships. Measures of relationship relevance were introduced above in the discussion of source structure analytics, illustrated in FIG. 10.

Starting from the top-down, the transforming steps breakdown as follows:

1. The sibling group {B, C, D, F, H} share a single parent, A. Each individual node would be checked to see if there are multiple parents. In this case, none of these nodes have multiple parents, so there is no need to reorganize these relationships.
2. The morpheme E has multiple parents. The closest single-parent ancestor of E is A. E needs to be reorganized as an attribute of A.
3. The parents of E, {B, C, D, F, H} are grouped under the attribute class, A1. E then becomes a sibling of A1, as an attribute of A.
4. The morpheme G also has multiple parents. As in steps (2-3), it needs to be reorganized as an attribute of A. In addition, since E and G share at least one parent, they can be grouped under a single attribute class, A2.
5. The morpheme, J, has a unique parent, H. This parent-child relationship does not need to be reorganized.
6. The morpheme, K, has multiple parents, E and G. The unique ancestor of E and G is now, A2. K needs to be reorganized as an attribute of A2.
7. The parents of K, {E, G} are grouped under the attribute class, A2-1. K then becomes a sibling of A2-1, as an attribute of A2.

The end result is the morpheme hierarchy, conforming to the assumptions of truly morphemic attributes and morpheme relationships defined by the knowledge representation model of the invention.

Morpheme Hierarchy Reorganization

Figure 19:
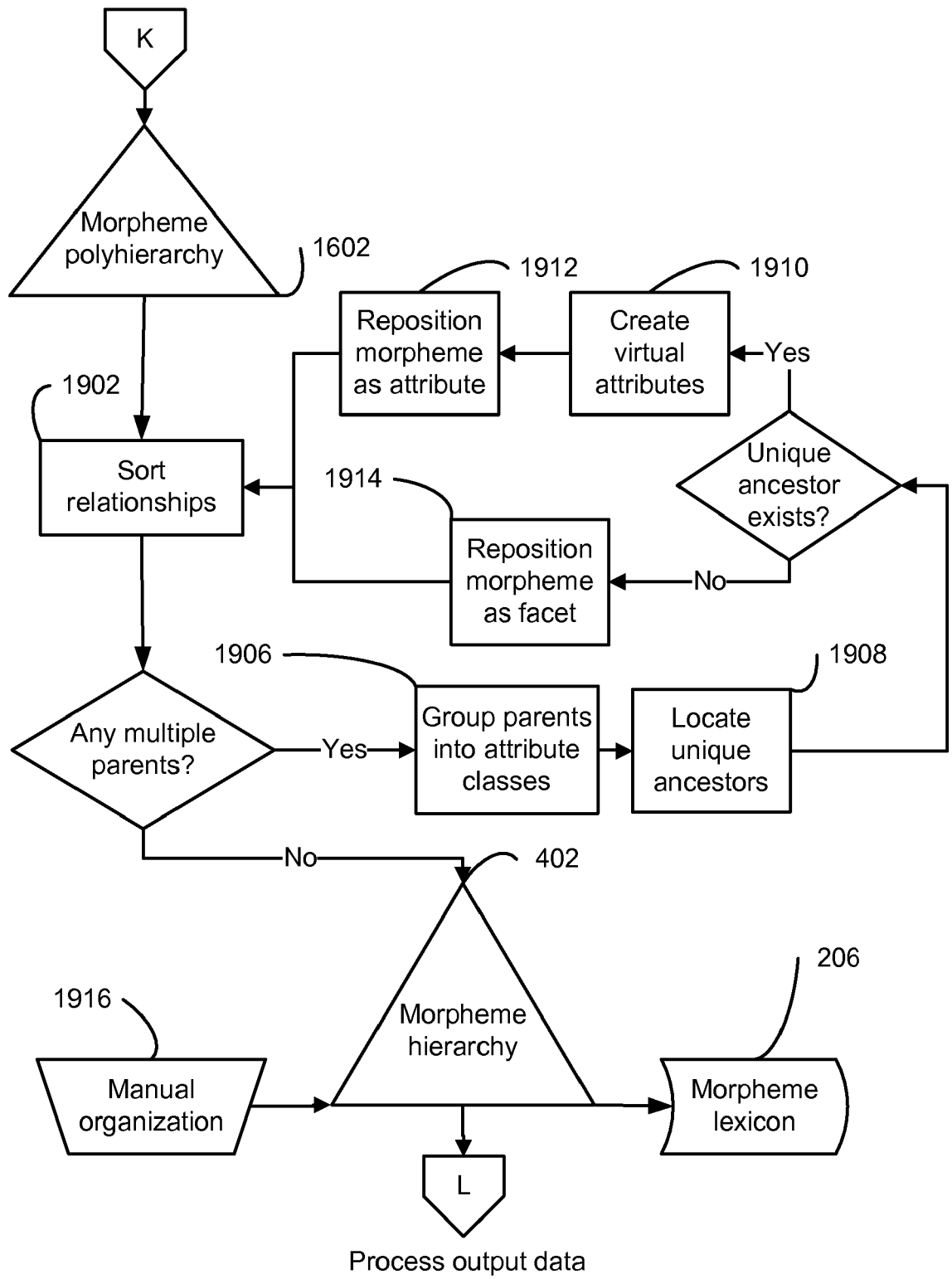

FIG. 19 presents the recursive algorithm that provides for the method of attribution in the preferred embodiment. The core logic of this morpheme hierarchy reorganization is the method of attribution described above and illustrated in FIG. 18.

The inputs for this method are the morpheme polyhierarchy K, as described above and illustrated in FIGS. 15-17. The input to the present method is the morpheme polyhierarchy 1602. Relationships are sorted from root nodes to leaf nodes 1902. Each morpheme in the morpheme polyhierarchy is checked for multiple parents. Herein, the morpheme that is the focus of the analysis is known as the active morpheme.

If any multiple parents exist, the set of multiple parents for the active morpheme are grouped into sets, hereafter the morpheme attribute classes 1906. The morpheme attribute classes are used to direct how the morphemes in the reorganized tree should be ordered.

For each morpheme attribute class, a unique ancestor is located 1908 that does not have a multiple parent. Preferably, the ancestor is uniquely associated with only the attribute class (group of parents shared by the morpheme).

If the ancestor exists, the system creates one or more virtual attributes 1910 to contain all the morphemes in the morpheme attribute class. This node in the tree is called a "virtual attribute" because it is not associated with any morpheme directly and will thus not be involved in any concept definitions. It is a virtual attribute, not a real attribute.

If the ancestor exists and one or more attributes are created, the active morpheme is reorganized as an attribute of the ancestor 1912, either directly related to the ancestor or grouped with other morphemes in a morpheme attribute class.

If the unique ancestor does not exist, the morpheme is repositioned as a root node (facet) in the tree 1914.

The system also allows administrators to manually alter 1916 the pool of morpheme relationships and the resultant morpheme hierarchy to refine or displace the results generated automatically.

The end result of this process is the morpheme hierarchy 402, which comprises a hierarchical arrangement of elemental morphemes. One of the elemental constructs of the system's data structure, the morpheme hierarchy is used to categorize and arrange the entities into increasing complex levels of abstraction.

The morpheme relationships in the morpheme hierarchy are entered in the morpheme lexicon 206. Morpheme labels are assigned to the morphemes based on the prevalence of labels stored in the system. The morpheme label that is most prevalent in the system is used as the single signature label for that morpheme.

The outputs of this method are processed as system output data L, as described below and illustrated in FIG. 21.

Alternative manners to transform a polyhierarchy to a strict hierarchy may be used. A single parent may be chosen based on any of a number of weighting factors to remove a multi-parent situation. In a simple solution, multi-parent relationships may be deleted.

Figures 20A, 20B:
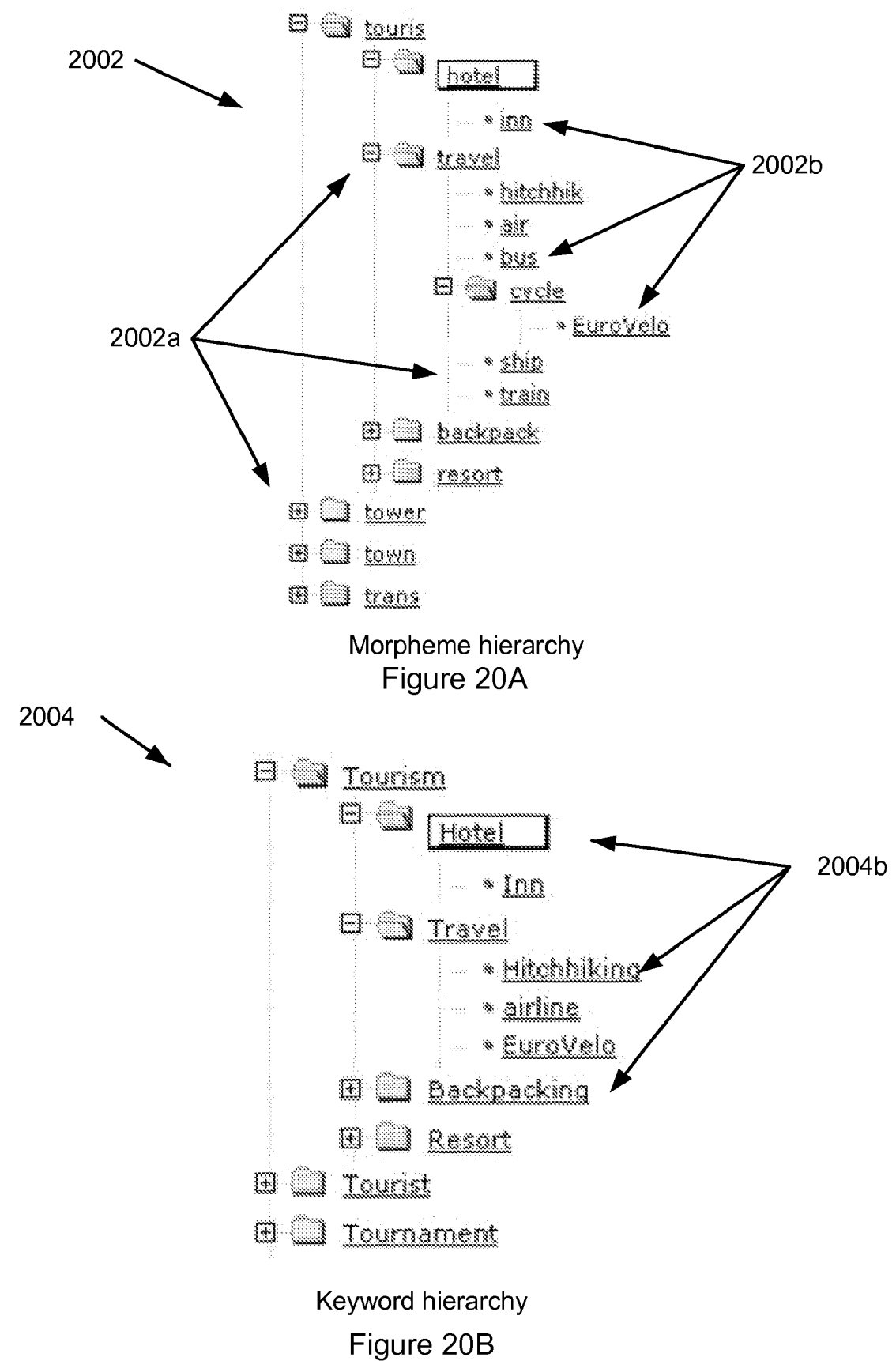
FIGS. 20A and 20B illustrate sample fragments from a morpheme hierarchy and a keyword hierarchy.

FIG. 20A illustrates a sample tree fragment from the assembled morpheme hierarchy. Each node in the tree (e.g. 2002*a*) represents a morpheme in the morpheme hierarchy. The folder icons are used to indicate morphemes that are parents to related morphemes nested underneath (morpheme relationships). The texts next to each node (e.g. 2002b) are the associated morpheme labels (in many cases, partial words).

1.1.3 Build Dimensional Structure

Here begins the process of building (or synthesizing) the dimensional concept taxonomy 210 based on the enhanced method of faceted classification. This classification generates dimensional concept relationships through the union of the morpheme hierarchy with the set of concept definitions (more specifically defined in terms of the morphemes, with zero or more morphemes as morpheme attributes within the morpheme hierarchy).

The enhanced method of faceted classification is applied at multiple tiers of data abstraction. In this way, multiple domains may share the same elemental constructs for classification, while maintaining domain-specific boundaries.

1.1.3.1 Process Output Data

The following points summarize the steps involved in synthesizing the faceted classification data structure (as further described below):

Preferably, for each domain to be classified, output the data structures as the domain-specific keyword hierarchy and the set of domain-specific concept definitions (more specifically defined in terms of domain-specific keywords, with zero or more domain-specific keywords as keyword attributes within the domain-specific keyword hierarchy).

The domain-specific faceted data described above may be derived from elemental constructs shared across domains. The preliminary concept definitions are revised and significantly extended with new information. This is accomplished by comparing the information in the morpheme hierarchy with the original concept relationships in the training set.

Specifically, the synthesizing operations assign concept definitions to content nodes based on an analysis of not only the explicit definitions provided by domain owners, but also through an analysis of all intersecting concepts and concept relationships in the aggregate. A preliminary definition of "explicit" attributes is assigned, which is later supplemented with a far richer set of attributes "implied" by the concept relationships that intersect with the content nodes.

The candidate morpheme relationships are assembled into an overall morpheme hierarchy, to be used as the data kernel for the faceted classifications. A separate facet hierarchy for each domain is created from the unique intersections of keywords in each domain and their morphemes. This data structure is the expression of the morpheme hierarchy limited to the boundaries of the domain.

The facet hierarchy is expressed in the vocabulary of the domain (its unique set of keywords) and includes only those morpheme relationships that factor into the domain. The faceted classification for each domain is outputted as the set of concept definitions for that domain and the facet hierarchy.

Thus, in the preferred embodiment, the domain-specific facet hierarchies are inferred from the centralized morpheme hierarchy. It provides for a richer set of facets for smaller domains. It builds on the shared experiences of multiple domains (which may correct for errors that present in smaller domains). And it facilitates faster processing of domains.

In another embodiment, the system could create a unique facet hierarchy for the domain based directly on the methods described above, illustrated in FIGS. 18-19.

FIGS. 20A and 20B illustrate tree fragments from the assembled morpheme hierarchy 2002 (as described above) and tree fragments from the domain-specific keyword hierarchy 2004 as derived in the preferred embodiment. Note that in the tree fragment for the keyword hierarchy 2004, texts next to each node (e.g. 2004b) representing the associated keyword labels are full words as they would present in the domain. Further, the tree fragment for the keyword hierarchy 2004 is a subset of the tree fragment for the morpheme hierarchy 2002, contracted to include only those nodes relevant to the domain for which the keyword hierarchy is derived.

Figure 21:
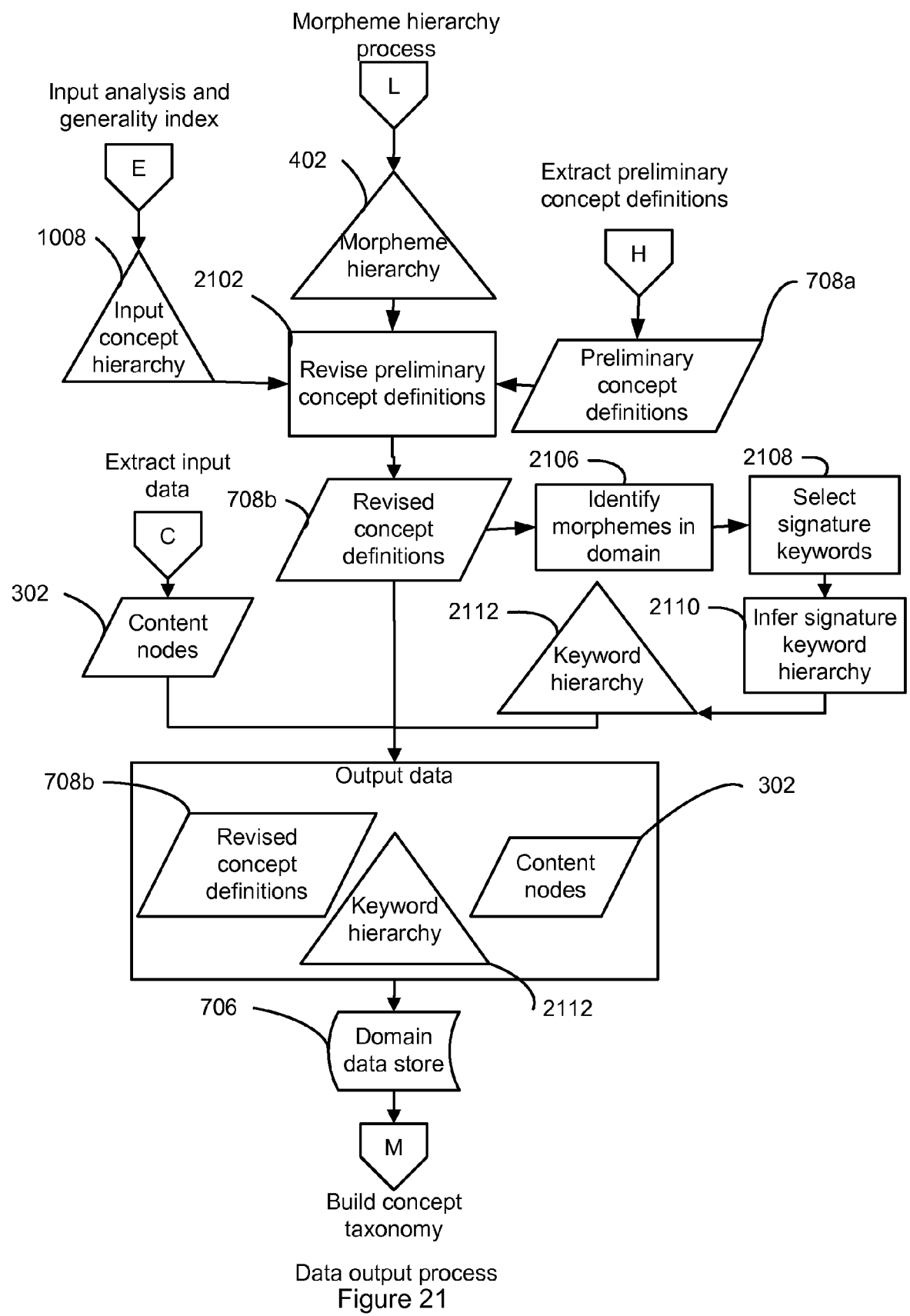
FIG. 21 illustrates a method of preparing output data for use in constructing the dimensional concept taxonomy.

FIG. 21 illustrates the operations of preparing the output data for the enhanced method of faceted classification.

The output data is comprised of the revised concept definitions and a keyword hierarchy for the domain. The keyword hierarchy is based on the morpheme hierarchy.

Inputs to this process are the set of content nodes 302 to be classified, the input concept hierarchy 1008, the morpheme hierarchy 402, and the preliminary concept definitions 708a. Respective operations C, E, L and H to generate or otherwise obtain these inputs are described above.

The intersection of morpheme attributes within the first concept definition 708a and input concept relationships are used 2102 to revise the first concept definition 708a to a second concept definition 708b. Specifically, if concept relationships in the source data cannot be inferred from the morpheme hierarchy, then the concept definitions are extended to provide for attributes "implied" by the concept relationships. The result is the set of revised concept definitions 708b.

Identify the set of relevant morpheme relationships 2106 in the morpheme hierarchy from the set of all morphemes participating in the domain.

The morphemes in the reduced and domain-specific version of the morpheme hierarchy are labeled using keywords from the domain 2108. For each morpheme, select a signature keyword that uses that morpheme the greatest number of times. Assign the most prevalent keyword label for each keyword. Individual keywords are limited to one occurrence in the facet hierarchy. Once a keyword is used as a signature keyword, it is unavailable as a surrogate for other morphemes.

The morpheme hierarchy is consolidated into a set of morpheme relationships that includes only the morphemes participating in the domain and the keyword hierarchy 2112 is inferred 2110 from the consolidated morpheme hierarchy.

The output data 210a representing the faceted classification is comprised of the revised concept definitions 708b, the keyword hierarchy 2112, and the content nodes 302. The output data is transferred to the domain data store 706.

The concept relationships in the input concept hierarchy also directly affect the output data in the domain data store 706. Specifically, the input concept hierarchy may be used to prioritize the relationships inferred from the synthesis portion of the operations. The pool of concept relationships drawn directly from the source data represents "explicit" data, as opposed to the dimensional concept relationships that are inferred. Relationships inferred that are explicit in the input concept hierarchy (directly or indirectly) are prioritized over relationships that did not present in the source data. That is, explicit relationships may be deemed more significant than the additional relationships inferred from the process.

The output data is now available as a complex dimensional data structure to render the dimensional concept taxonomy M.

1.1.3.2 Construct Concept Relationships

The organizing principles of the enhanced method of faceted classification are illustrated in FIGS. 3-5, first introduced above, and described in more detail below, illustrated in and FIGS. 22-24. In the preferred embodiment, both explicit and implicit morpheme relationships can be combined with contextual investigations of the domain to infer complex dimensional relationships in the dimensional concept taxonomy.

In the preferred embodiment of the invention, the interplay of the structural entities of the knowledge representation model (described above) establish logical links between morphemes, morpheme relationships, concept definitions, content nodes, and concept relationships, as follows:

Dimensional concept relationships that are inferred directly from the facet hierarchy are known herein as explicit relationships. Dimensional concept relationships that are inferred from intersecting sets of facet attributes within concept definitions assigned to the content nodes to be classified are known as implicit relationships.

Preferably, concept definitions are described using morphemes as facet attributes. As described above, it does not matter whether the facet attributes (morphemes) are explicit ("registered" or "known") in the lexicon or implicit ("not registered" or "unknown"). There should simply be a valid description associated with the concept definition to carry its meaning in the dimensional concept taxonomy. Valid concept definitions provide raw materials to describe the meaning of the content nodes in the dimensional concept taxonomy. In this way, objects in the domain may be classified in the dimensional concept taxonomy whether or not they were previously analyzed as part of the training set. As is well known in the art, there are many methods and technologies available to assign concept definitions to objects to be classified.

Explicit relationships between concepts are calculated by examining the relationships between the attributes in their concept definitions. If concept definitions contain attributes that are related either directly or indirectly in the facet hierarchy (hereafter, of the same "lineage") to those in the content node being classified (hereinafter, the "active node"), then explicit relationships exist between the concepts along the dimensional axis represented by the attributes involved.

Subject to limiting constraints (described below), implicit relationships are inferred between any concepts that share a subset of attributes in their concept definitions. The intersecting set of attributes establishes a parent-child relationship.

Axes are defined in terms of facet attribute sets. In the preferred embodiment, axes are defined by the set of facets (root nodes) in the facet hierarchy. These attribute sets can then be used to filter concepts into consolidated hierarchies of dimensional concept relationships. Alternatively, any set of attributes may be used as bases of dimensional axes, for dynamically constructed (custom) hierarchies derived from the complex dimensional structure.

Preferably, a dimensional concept relationship exists if and only if explicit and/or implicit relationships may be drawn for all axes in the parent concept definition. Thus dimensional concept relationships are structurally intact across all dimensions defined by the attributes.

1.1.3.3 Implicit Relationships

If concepts within the active content node contain facet attributes (preferably and hereafter, as morphemes) of the same lineage as those in other content nodes (hereinafter "related nodes"), then relationships exist between the concepts of the active and related nodes. In other words, each concept inherits all the relationships inferred by the relationships between their morphemes, as existing in the content nodes.

The process of calculating implicit relationships assumes that any content nodes that share all or a subset of morphemes from their concept definitions are related. The intersecting set of morphemes establishes a parent-child relationship.

1.1.3.4 Priority and Directionality

Priorities within concept relationships are determined first by examining the overall priorities of any registered morphemes within the sets in question. The topmost registered morpheme establishes the priority for the set.

For example, if the first set includes three registered morphemes with priority numbers {3, 37, 303}, the second set includes two registered morphemes with priorities {5, 490}, and the third set includes three registered morphemes with priorities {5, 296, 1002}, then the sets would be ordered: {3, 37, 303}, {5, 296, 1002}, {5, 490}. The first ordered set is prioritized based on the top overall ranking of the morpheme with priority 3 contained in its set. The latter two sets both have a topmost morpheme priority of {5}. Therefore, the next highest morpheme priorities in each set are examined to reveal that the set containing the morpheme with priority {296} should be the higher prioritized set.

Where the content nodes in the concept relationships are not differentiated by the registered morphemes, the system uses the number of implicit morphemes as the basis for prioritization. The set with the fewest number of morphemes is assumed to be of a higher priority in the hierarchy. Where content nodes contain the same explicit morphemes and the same number of unregistered implicit morphemes, the content nodes are considered at parity with each other. When content nodes are at parity, priority is established by the order in which each of these content nodes is discovered by the system.

Figure 22:
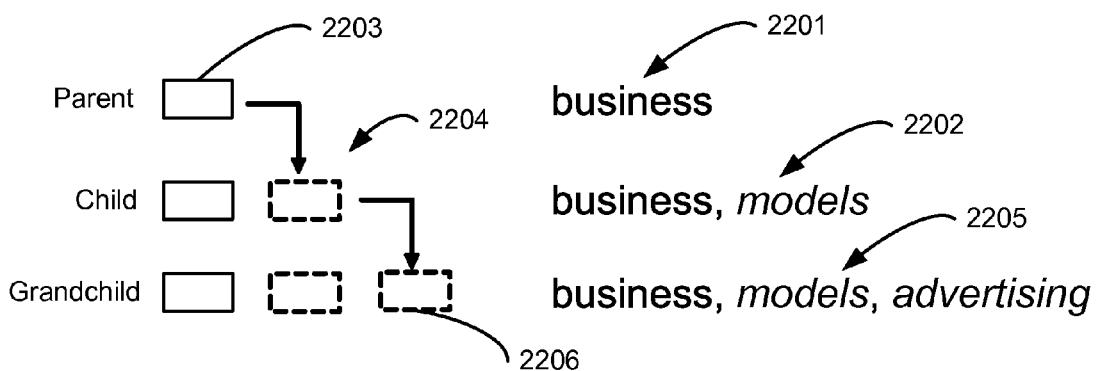
FIGS. 22, 23 and 24 illustrate how faceted output data is used to construct a dimensional concept taxonomy.
Figure 22:
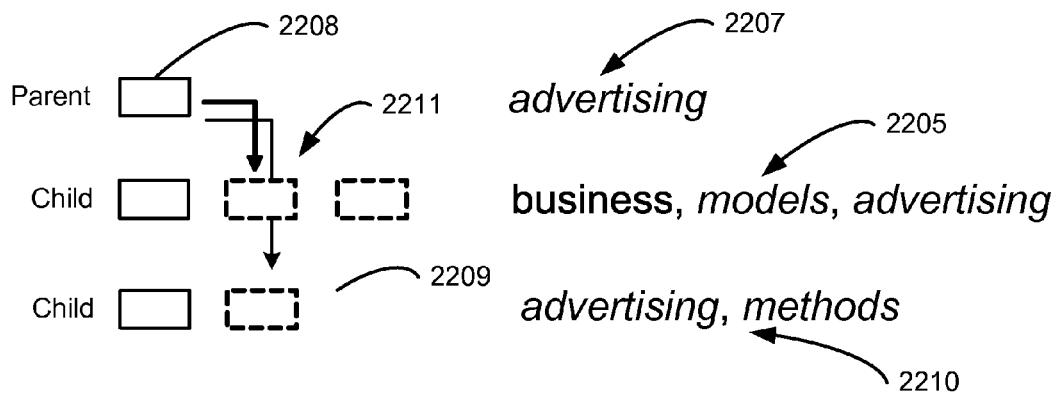

FIG. 22 provides a simple illustration of the preferred embodiment construction of the implicit relationships and the determination of the priority of the nodes in the resultant hierarchy.

In this example, the morpheme "business" 2201 is registered in the morpheme lexicon. Assume that through user interactions, a content node is constructed with a concept definition that contains this morpheme, plus a new morpheme, "models" 2202, that is not recognized in the morpheme lexicon.

Continuing the example above, the morpheme "business" has the highest priority 2203. The set "business, models" is an implied child of "business" 2204. Any additional morphemes that are added to this set, such as "advertising" 2205, would create additional layers in the hierarchy 2206.

Any morphemes, whether explicit in the system or implied, can be used as a basis for a classification hierarchy (or axis). Continuing the example above, the implicit morpheme "advertising" 2207 is the parent 2208 of a hierarchy based on this morpheme. The set "business, models, advertising" 2205 is a child 2209 in this hierarchy. Any additional set that includes "advertising" would also be a member of this hierarchy. In the example, the set "advertising, methods" 2210 is also a child to advertising 2211. Since the morpheme "business" is registered, the set "business, models, advertising" is given a higher priority in the advertising hierarchy over the set "advertising, methods", which contains only implicit morphemes.

1.1.3.5 Axial Definitions and Structural Integrity

Another rule for building the dimensional concept taxonomy in the preferred embodiment of the system concerns the structural integrity of the dimensional axes. Each morpheme (attribute) set as a concept definition (an axial definition) may establish a dimensional axis. Dimensional concept relationships inferred from these morphemes must be structurally intact across all dimensions as determined by the parent node. In other words, all dimensions that intersect with the parent concepts must also intersect all the child concepts of the node. The following example will illustrate:

Consider the active content node with the concept definition {A, B, C},

Where A, B, C are three morphemes in a concept definition, and the morphemes E, F, G are children of A, B, C, respectively, in the morpheme hierarchy;

{A, B, C} refers to a concept definition described with morphemes A and B and C

{A, *} refers to a combination of explicit morpheme A and implicit morpheme(s) {*} to establish a node that is an implicit child of A {A|B} refers to either the morpheme {A} or {B}.

The three morphemes A, B, C in the active node, in this example, may be used to establish three dimensions (or intersecting axes) in the dimensional concept hierarchy. For any other content nodes to be a child of this node, candidates must be children relative to all three axes. The notation that follows is the solution set of explicit and implicit relationships as defined by the preferred embodiment of the invention:

$$\{(A|E|A,*|E,*), (B|F|B,*|F,*), (C|G|C,*|G,*)\},$$

Where the morpheme of the first dimension is A or E or an implicit morpheme of A or an implicit morpheme of E;

where the morpheme of the second dimension is B or F or an implicit morpheme of B or an implicit morpheme of F;

where the morpheme of the third dimension is C or G or an implicit morpheme of C or an implicit morpheme of G.

The combination of explicit and implicit relationships in the morphemes thus establishes the rules for building hierarchical relationships between concepts.

As is known in the art, there are many ways to optimize these types of filtering and ordering functions. They include data management tools such as indices and caches. These refinements are well known in the art and will not be discussed further herein.

The facet hierarchy (as expressed by the morpheme hierarchy) is used to prioritize the content nodes. Specifically, each content node embodies attributes that present in at most one location in the facet hierarchy. The priority of the attributes in the hierarchy determines the priority of the nodes.

An alternate embodiment of node prioritization concerns "signature" nodes. These are defined as the content nodes that best describe (or give meaning) to their associated concepts. For example, a domain owner may associate a photograph with a specific concept as the signature identifier for that concept. Signature nodes may thus be prioritized.

There are many ways to implement signature nodes. For example, labels, as a special class of content nodes, are one way. A special attribute may be assigned to signature nodes and that attribute may be given the highest priority in the facet hierarchy. Or a field may be used in the table of content nodes to stipulate this attribute.

The prioritization based on the facet hierarchy may be supplemented by automatic bases such as alphabetization, numerical, and chronological sorting. In traditional faceted classification, prioritization and sorting are issues of notation and citation order. Systems typically provide for a dynamic reordering of the attributes for prioritization and sorting. Therefore, no further discussion of these operations is made here.

1.1.3.6 Method of Building Concept Taxonomy

As described above, a single content container or content node (such as a web page) may be assigned more than one concept. Consequently, a single content container or content node may reside on many discrete hierarchies in the dimensional concept taxonomy.

Figure 23:
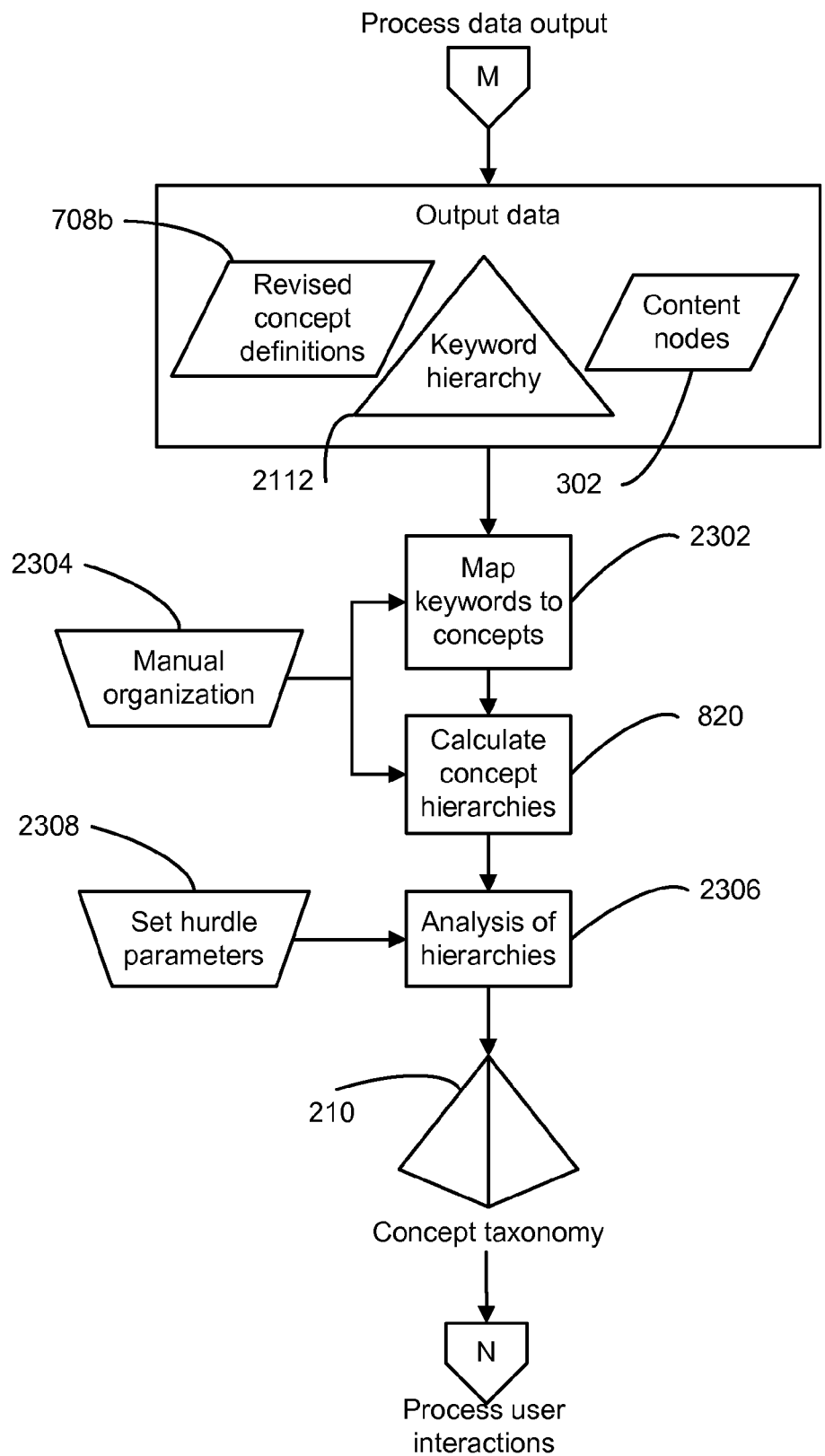

FIG. 23 illustrates the process in the preferred embodiment by which the output data for the faceted classification produces the dimensional concept taxonomy 210 to reorganize the domain. The output data is generated M (as described above and illustrated in FIG. 21). The inputs for this method are the revised concept definitions 2104, the keyword hierarchy 2112, and the content nodes 302 from the domain.

Each concept definition 708b is mapped to keywords 2302 in the keyword hierarchy 2112. New dimensional concept relationships for the concepts are generated 820 by the rules of explicit and implicit relationship construction, as described above and illustrated in FIGS. 3-5, and 22.

Preferably, the scope of processing is limited to the relationships proximate to the area of the dimensional structure in focus by the end-user or end-process (discussed below).

Administrators of the information structure may prefer to manually adjust 2304 the results of the automatically generated dimensional concept taxonomy construction. Preferably, the operations support these types of manual interventions but do not require user interactions for the fully automated operation.

Preferably, an analysis 2306 is used to assess the parameters of the resultant dimensional concept taxonomy. Again, statistical parameters preferably are set 2308 by the administrators as scaling factors for the dimensional concept taxonomy. They may also limit the complexity as negative feedback in the complex-adaptive system by reducing the scope of processing, and thus scale back the number of hierarchies that are incorporated.

The dimensional concept taxonomy 210 is available for user interactions N, as described below and illustrated in FIG. 29.

Note that the data structure that derives the dimensional concept taxonomy 210 may be represented in many ways, for many purposes. In the description that follows, there is illustrated the purpose of end-user interactions. However, these structures may also be used in the service of other data manipulation technologies, for example as an input to another information retrieval or data mining tool (not shown).

1.1.3.7 Scope of Domain Processing

As the size of the domain and facet hierarchy increase, the number of dimensional concept relationships that may be inferred grows rapidly. Limits may be placed on the number of relationships generated.

In one embodiment, all content nodes in the domain are examined and compared before a complete view of the dimensional concept taxonomy is generated. In other words, the system discovers all the content nodes in the domain that may be related before any inferences are made about the direct hierarchical relationships between these related nodes.

In another embodiment, instead of analyzing the entire domain, a localized region of the domain is analyzed based on the users' active focus. This localized analysis may be applied to materials whether or not they were analyzed previously as part of the training set. Parameters are set by administrators to balance the depth of analysis with the processing time (latency).

Figure 24:
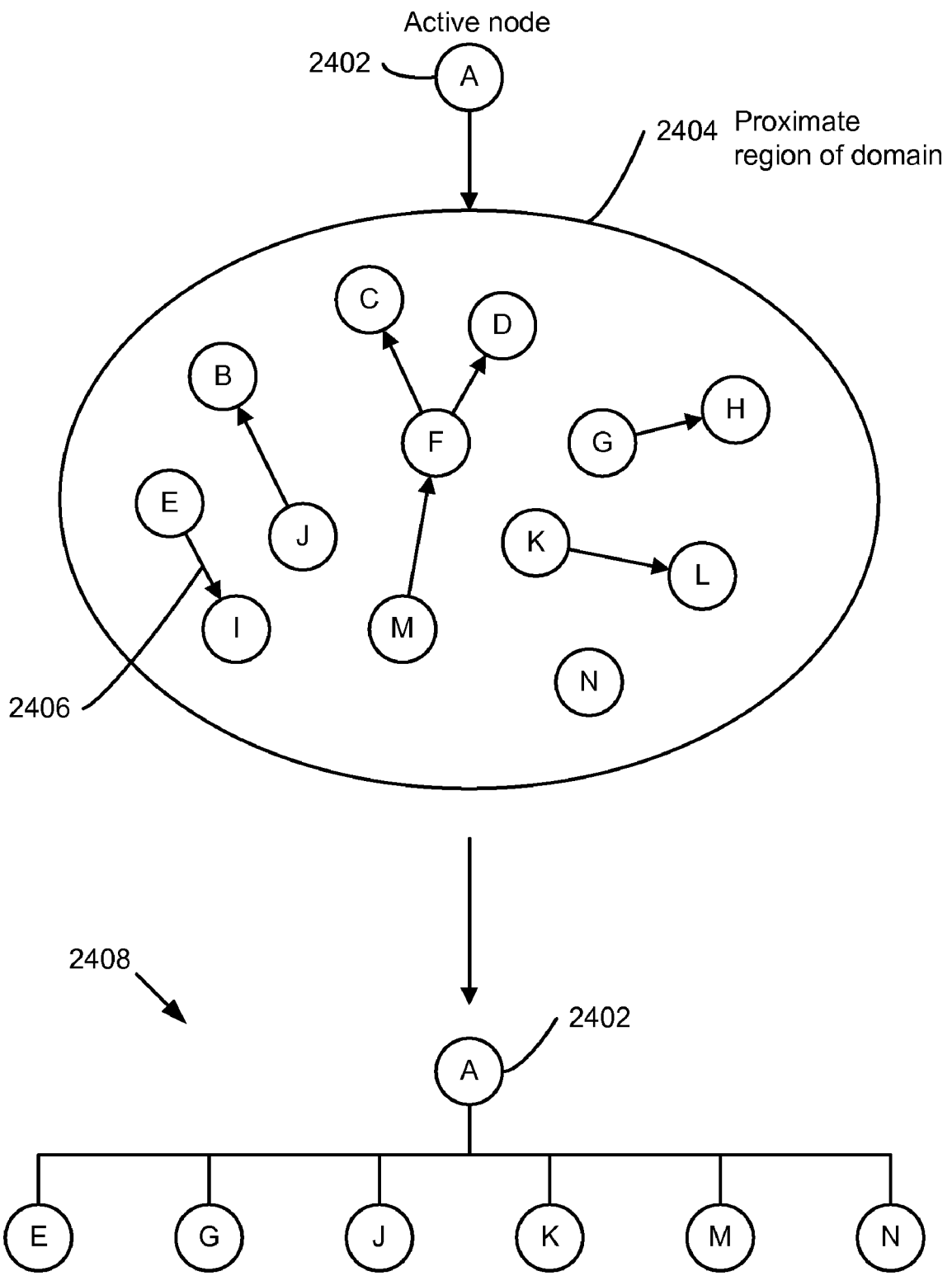

FIG. 24 illustrates the selection of candidate content nodes from the domain and the ordering of those content nodes into dimensional concept hierarchies. A constrained view of the domain relative to active node 2402 is preferably taken. Rather than processing the entire domain, operations may do a directed investigation of all content nodes (e.g. 2406) in the immediate proximity 2404 of the active node 2402. Proximity may be determined using morpheme lineages (extended relationships between morphemes) as stored in the morpheme lexicon. In this way, meaningful and comprehensive information may be provided in a specific context of the domain, without expending processing costs on the entire domain.

Recursive algorithms are useful to sub-divide this undifferentiated group of related content nodes into specific structural groups. The groups are described relative to the active container, as parents and children (hierarchical relationships), and siblings (associative relationships). The structural relationships described by these groups are well known in the art. These proximate nodes are then ordered into hierarchical relationships relative to the active node, based on the underlying morpheme relationships and morphemes involved.

In FIG. 24, this hierarchy is illustrated as the subset of relationships between content nodes (e.g. 2406) within the candidate set of content nodes 2404. In the resultant hierarchical tree 2408, those content nodes that are directly related to the active node 2402 (direct children) do not have any other parents within the candidate set 2404. The remaining content nodes in the candidate set would be positioned deeper in the hierarchy, as indirect children (descendents).

The scope of processing may be further limited by constraining the concept definitions of the dimensional axes. An individual axis (hereafter, the "active axis") may be established by referencing a subset of morphemes from a parent node, thus constraining the set of parents (ancestors) that may link to the active node. Effectively, the concept definition associated with the active axis establishes a virtual parent node that constrains the polyhierarchy that extends from the active node to only those content nodes that reside on the hierarchy defined by the concept definition of the active axis.

The following example illustrates this constraint using the example introduced above, with the concept definition {A, B, C}. In this example, the dimensional concept relationships derived are constrained to an active axis with the concept definition {A,B}. Under this constraint, the set of possible parents (ancestors) to the active node are limited to the set, {(A,B)|A|B}. In other words, matching concept definitions would only include combinations of A or B, but not C (again, assuming in this example that there are no parents to A or B in the morpheme hierarchy).

For materials that were not analyzed as part of the training set, the system would use the operations of the localized analysis to classify materials under the enhanced faceted classification scheme derived from the training set materials.

Figure 25:
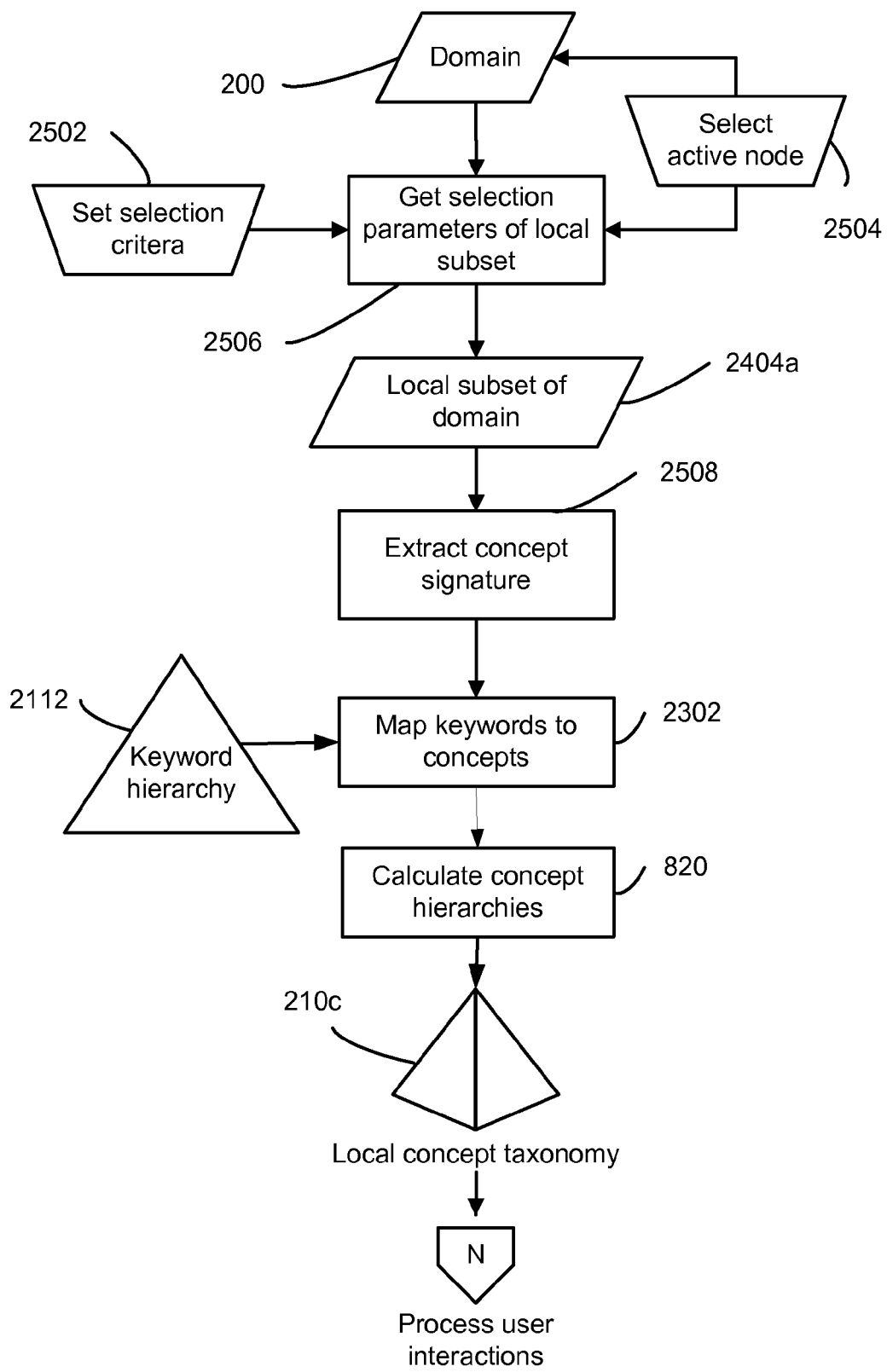
FIG. 25 illustrates a dimensional concept taxonomy build for a localized domain set.

FIG. 25 illustrates the operations of classifying a local subset of materials from the domain that were not part of the training set used to develop the faceted classification scheme.

From the domain 200 a local subset of the domain materials 2404a is selected for processing. The materials are selected based on selection criteria 2502 established by the domain owners. The selection is made relative to the active node 2504 that is the basis for the localized region. The selection process generates the parameters of the local subset 2506, such as a list of search terms that describe the boundaries of the local subset.

There are many possible selection criteria for the local set. In one embodiment, the materials are selected by passing the concept definition associated with the active node to a full-text information retrieval (search) component to return a set of related materials. Such full-text information retrieval tools are well known in the art. In an alternate embodiment, an extended search query may be derived from the concept definition in the active node by examining the keyword hierarchy to derive sets of related keywords. These related keywords may in turn be used to extend the search query to include terms related to the concept definition of the active node.

The local subset of the domain 2404a derived from the selection process comprises the candidate content nodes to be classified. For each candidate content node in the local subset, a concept signature is extracted 2508. The concept signatures are identified by the domain owners and are used to map keywords 2302 in the domain-specific keyword hierarchy 2112 to provide concept definitions for each candidate content node. Again, the build component does not require that all keywords derived from the concept signatures are known to the system (as registered in the keyword hierarchy).

Concept hierarchies are calculated 820 for the candidate content nodes using the build rules of implicit and explicit relationships described above. The end result is a local concept taxonomy 210c, wherein the content nodes from the local subset of the domain are organized under the constructive scheme derived for that domain from the training set. The local concept taxonomy is then available as an environment for user interactions to further refine the classification.

Note that the operations of classifying a local subset of materials from the domain, as described above, may also be used to classify new domains. In other words, the training set from one domain may be used as the basis for a constructive scheme to classify materials from a new domain, thus supporting a multi-domain classification environment.

1.1.4 User Interactions

The dimensional concept taxonomy provides an environment for user interactions. In a preferable embodiment, there is provided two main user interfaces. A navigation "viewer" interface provides for browsing the faceted classification. This interface is of a class known as "faceted navigation". The other interface is known as an "outliner", which allows end users to change the relationship structure, concept definitions, and content node assignments.

The general features of faceted navigation and outliner interfaces are well known in the art. Novel aspects described herein below, particularly as they related to the complex-adaptive system 212, will be apparent to those of skill in the art

1.1.4.1 Viewing the Concept Taxonomy

The dimensional concept taxonomy is expressed through the presentation layer. In the preferred embodiment, the presentation layer is a web site. The web site is comprised of web pages that render a set of views of the dimensional concept taxonomy. The views are portions (e.g. a subset of the polyhierarchy filtered by one or more axis) of the dimensional context taxonomy within the scope of an active node. The active node in this context is a node within the dimensional concept taxonomy that is presently in focus by the end-user or domain owner. In the preferred embodiment, a "tree fragment" is used to represent these relationships.

Users may provide text queries to the system to move directly to the general area of their search and information retrieval. Views may be filtered and sorted by the facets and attributes that intersect with each concept, as is well known in the art.

Content nodes are categorized by each concept. That is, for any given active concept, all content nodes that match the attributes of that concept as filtered by the user are presented. The "resolution" of each view may be varied around each node. This refers to the breadth of relationships displayed and the exhaustiveness of the survey. The issue of the resolution of the view may also be considered in the context of the size and selection of the domain portion that is analyzed. Again, there is a trade-off between the depth of the analysis and the amount of time it takes to process. The presentation layer operates to select a portion of the domain to be analyzed based on the location of the active node, the resolution of the view, and parameters configured by administrators.

Figure 26:
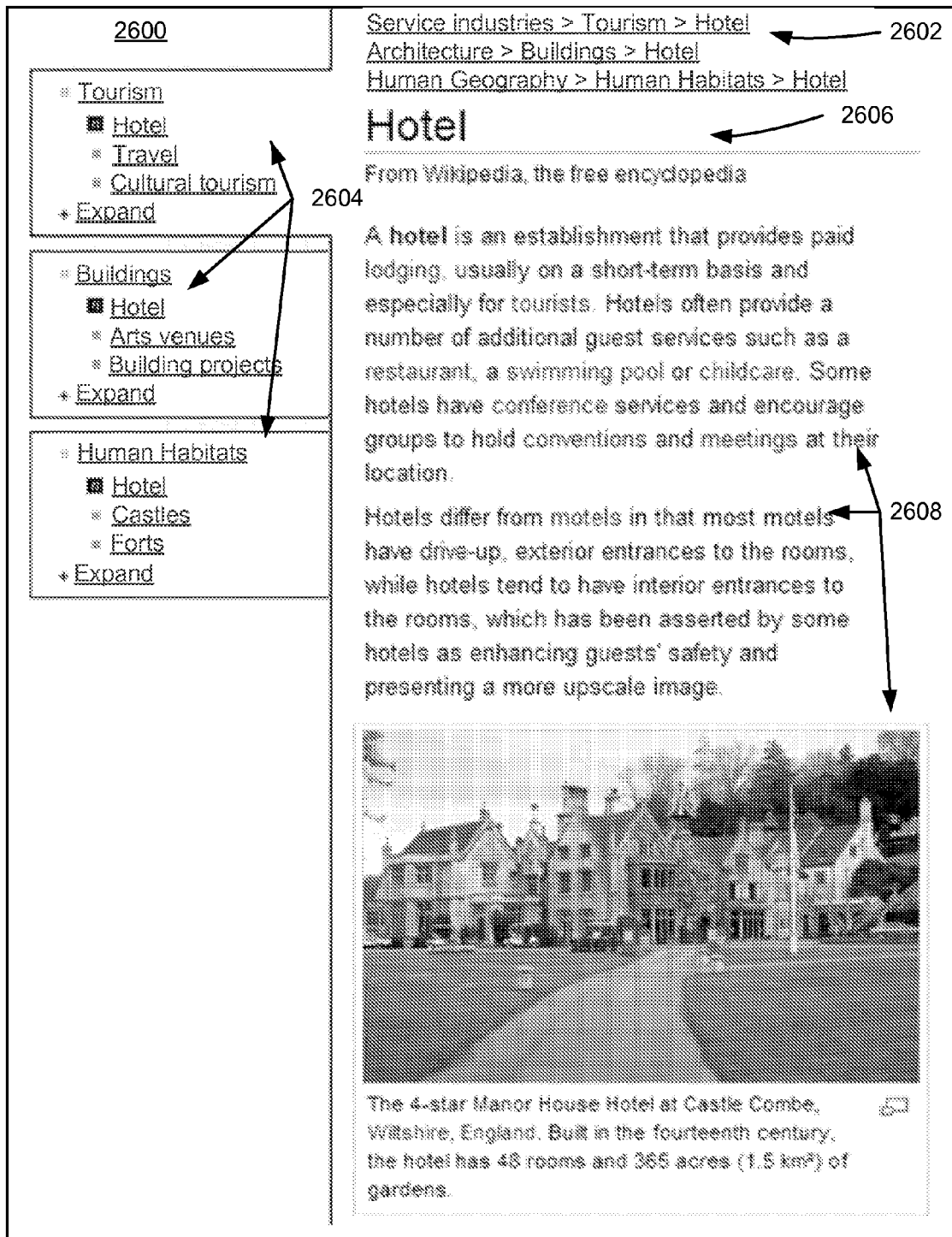
FIG. 26 illustrates a view of a dimensional concept taxonomy in a browser-based user interface.

FIG. 26 provides an illustrative screen capture of the main components of the dimensional concept taxonomy presentation UI for end-user viewing and browsing.

The content container 2600 holds the various types of content in the domain, along with the structural links and concept definitions that form the presentation layer for a dimensional concept taxonomy. One or more concept definitions are associated with the content nodes in the container. The system is able to manage any type of informational element, registered in the system along with a URI and the concept definitions used to calculate dimensional concept relationships, as described herein.

In the preferred embodiment, user interface devices that are usually associated with traditional linear (or flat) information structures are compounded or stacked to represent dimensionality in the complex dimensional structures.

Compounding traditional Web UI devices such as navigation bars, directory trees 2604, and breadcrumb paths 2602 are used to show the dimensional intersections at various nodes in the information architecture. Each dimensional axis (or hierarchy) that intersects with the active content node 2606 may be represented as a separate hierarchy, one for each intersecting axis.

Structural relationships are defined by pointers (or links) from the active content container to related content containers in the domain. This provides for multiple structural links between the active container and the related containers, as dictated by the dimensional concept taxonomy. The structural links may be presented in a variety of ways, including a full context presentation of the concepts, a filtered presentation of the concepts that displays only the keywords on the active axis, a presentation of content node labels, etc.

Structural links provide the context for the content nodes 2608 within the dimensional concept taxonomy, organized in prioritized groupings of content nodes within one or more relationship types (for example, parent, child, or sibling).

XSLT is used to present structural information as a navigation path on the Web site, allowing a user to navigate the structural hierarchy to containers related to the active container. This type of presentation of structural information as navigation devices on a web site would be among the most basic applications of the system.

These and other navigational conventions are well known in the art and will not be discussed further herein.

There are many methods and technologies that may be used to present multi-dimensional information structures and provide interactivity to end-users. For example, multivariate forms may be used to allow users to query the information architecture along many different dimensions simultaneously. Technologies such as "pivot tables" may be used to hold one dimension (or variable) constant in the information structure while other variables are changed. Software components such as ActiveX may be embedded in the Web pages to provide interactivity with the underlying structure. Visualization technologies may provide three-dimensional views of the data. These and other variations will be apparent to those skilled in the art and do not limit the scope of the present invention.

1.1.4.2 Editing the Concept Taxonomy

The presentation layer distils the dimensional structure down to simplified views (such as web pages that include links to related pages in the dimensional concept taxonomy) that are necessary for human interaction. As such, the presentation layer may also double as the editing environment for the informational structures from which it is derived. In the preferred embodiment, the user is able to switch to editing mode from within the presentation layer to immediately edit the structures.

An outliner provides the means for users to manipulate hierarchical data. The outliner also allows users to manipulate the content nodes that are associated with each concept in the structure.

Preferably, user interactions alter the context and/or the concepts assigned to the nodes in the dimensional concept taxonomy. Context refers to the position of a node relative to the other nodes in the structure (that is, the dimensional concept relationships that establish structure). Concept definitions describe the content or subject matter of the node, expressed as collections of morphemes.

The user is presented with a review process in the preferred embodiment, to enable the user to confirm the parameters of such user's edits. The following dimensional concept taxonomy information is preferably exposed to the user for this review: 1) the content of the node; 2) the morpheme groups (expressed as keywords) associated with the content; and 3) the position of the node in the taxonomic structure. The user is able to alter the parameters of the latter two (morphemes and relative positioning) to make the information consistent with the first (the content at that node).

Thus, interactions in the preferred embodiment of the invention may be summarized as some combination of two broad types: a) container edits; and b) taxonomy edits.

Container edits are changes to the assignment of content containers (such as URL addresses) to the content nodes that are classified within the dimensional concept taxonomy. Container edits are also changes to the descriptions of the content nodes within the dimensional concept taxonomy.

Taxonomy edits are context changes to the position of the nodes in the dimensional concept taxonomy. These changes include the addition of new nodes into the structure and the repositioning of existing nodes. This dimensional concept taxonomy information is fed back into the system as changes to the morpheme relationships that are associated with the concepts that are affected by the user interactions.

With taxonomy edits, new relationships between concepts in the taxonomy may be created. These concept relationships are constructed through the user interactions. Since these concepts are based on morphemes, new concept relationships are associated with new sets of morpheme relationships. This dimensional concept taxonomy information is fed back into the system to recalculate these implied morpheme relationships.

User interactions may also be provided at more elemental levels of abstraction, such as keywords and morphemes.

Figure 27:
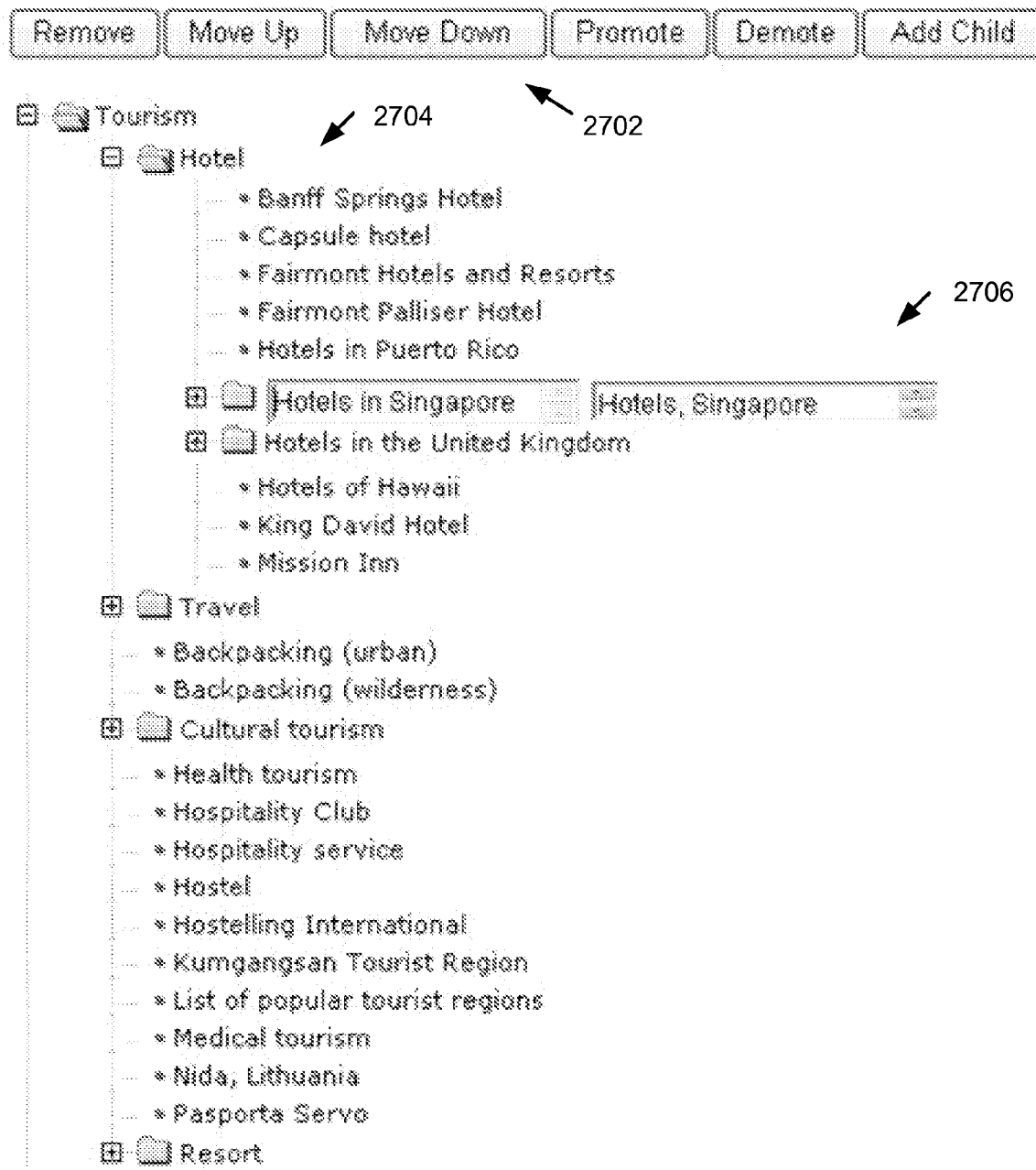
FIG. 27 illustrates an environment for user interactions in an outliner-based user interface.

FIG. 27 illustrates the outliner user interface. It shows devices to change the location of nodes 2702 in the structure 2704 and to edit the containers and concept definition assignments at each node 2706.

A view of the dimensional concept taxonomy is presented to the user through the user interface described above. It is assumed, for the purposes of illustration, that after reviewing the classification, the user wishes to reorganize it.

In the preferred embodiment, using a client-side control, the user is able to move nodes in the hierarchy to reorganize the dimensional concept taxonomy. In so doing, the user would establish new parent-child relationships between nodes.

As the location of the node is edited, it will make relevant a new set of relationships between the underlying morphemes. This in turn may require a recalculation to determine the new set of inferred dimensional concept relationships. These changes are queued to calculate the new morpheme relationships inferred by the concept relationships.

The changes may be stored as exceptions to a shared dimensional concept taxonomy (hereinafter a community concept taxonomy) for the personalized needs of the user (see below for more details on personalization).

Those skilled in the art will appreciate that there are many such controls and alternate technologies available to facilitate this interactivity.

Figure 28:
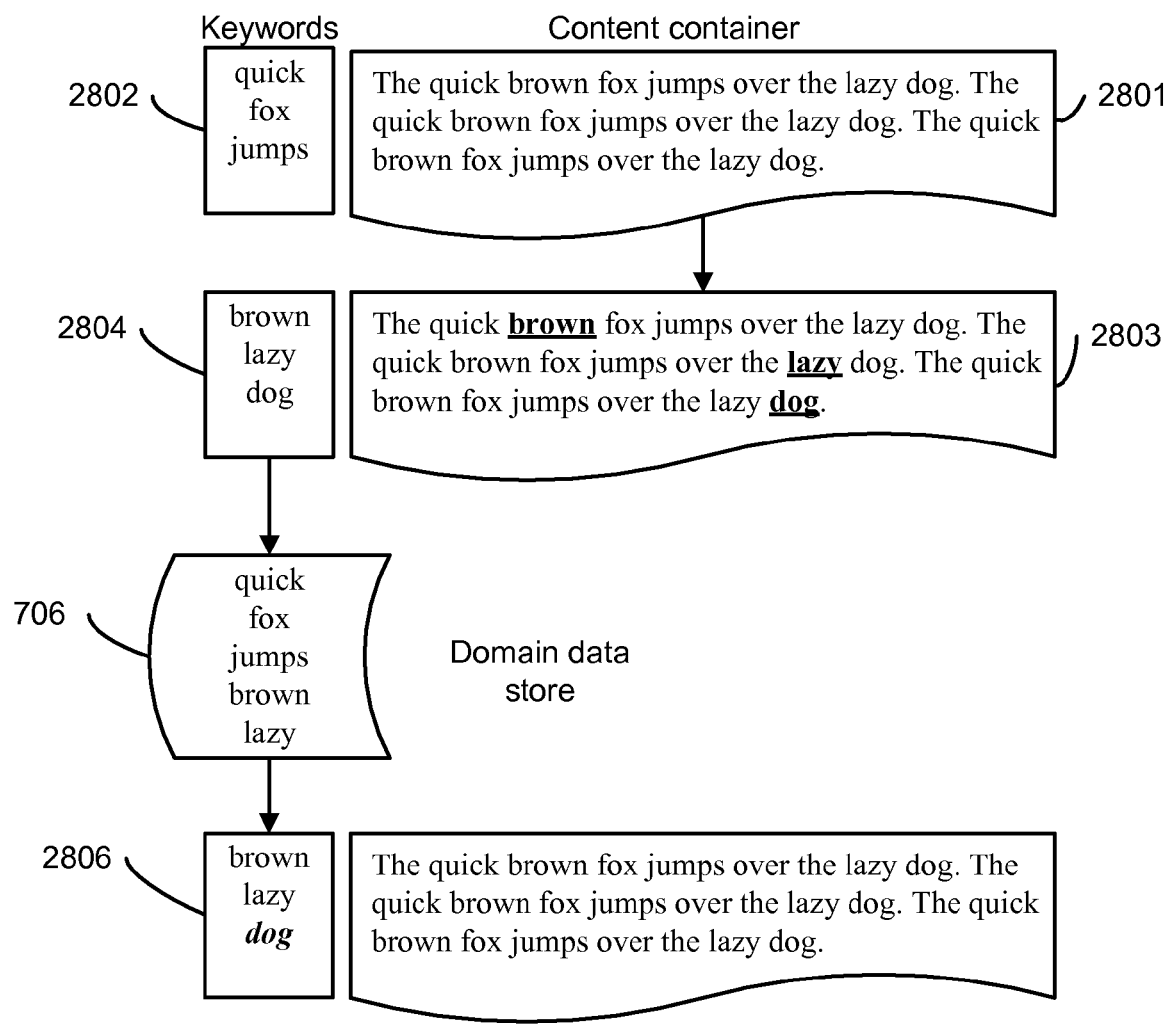
FIG. 28 illustrates a process of user interactions that edit content containers within the dimensional concept taxonomy.

FIG. 28 illustrates the preferred embodiment of the process of container edits. Container edits are changes to the concept definitions and the underlying morphemes that describe each content node. With these changes, users alter the underlying concept definition of a content node. In so doing, they alter the morphemes that are mapped to the concept definitions at these content nodes.

The user interactions construct the concept definition assigned to the content node, expressed as a collection of keywords. In this construction, the user interacts with the system's morpheme lexicon and domain data store. Any new keywords that are created here are sent to the system's morpheme extraction process, as described above.

In this example, a document 2801 is the active container. In the user interface, the set of keywords 2802 that describe the content is presented to the user along with the document. (The relative position of this node in the dimensional concept taxonomy is not shown here to simplify the example.)

In the example, as the user reviews the content, the user determines that the keywords associated with the page are not optimal. New keywords are selected by the user to replace the set that loaded with the page 2803. The user updates the list of keywords 2804 as the new concept definition associated with the document.

These changes are then passed to the domain data store 706. The data store may be searched to identify all keywords registered in the system.

In this example, the list includes all keywords identified by the user, with the exception of "dog". As a result, "dog" will be processed as an implicit keyword that modifies the explicit keywords that are registered in the system 2806.

The implicit keywords will be analyzed in full when the domain is reviewed by the centralized transformation engine. It will then be replaced by an explicit keyword (either as an existing keyword or a new keyword) and associated with one or more morphemes.

1.1.4.3 Complex-Adaptive Processing

Figure 29:
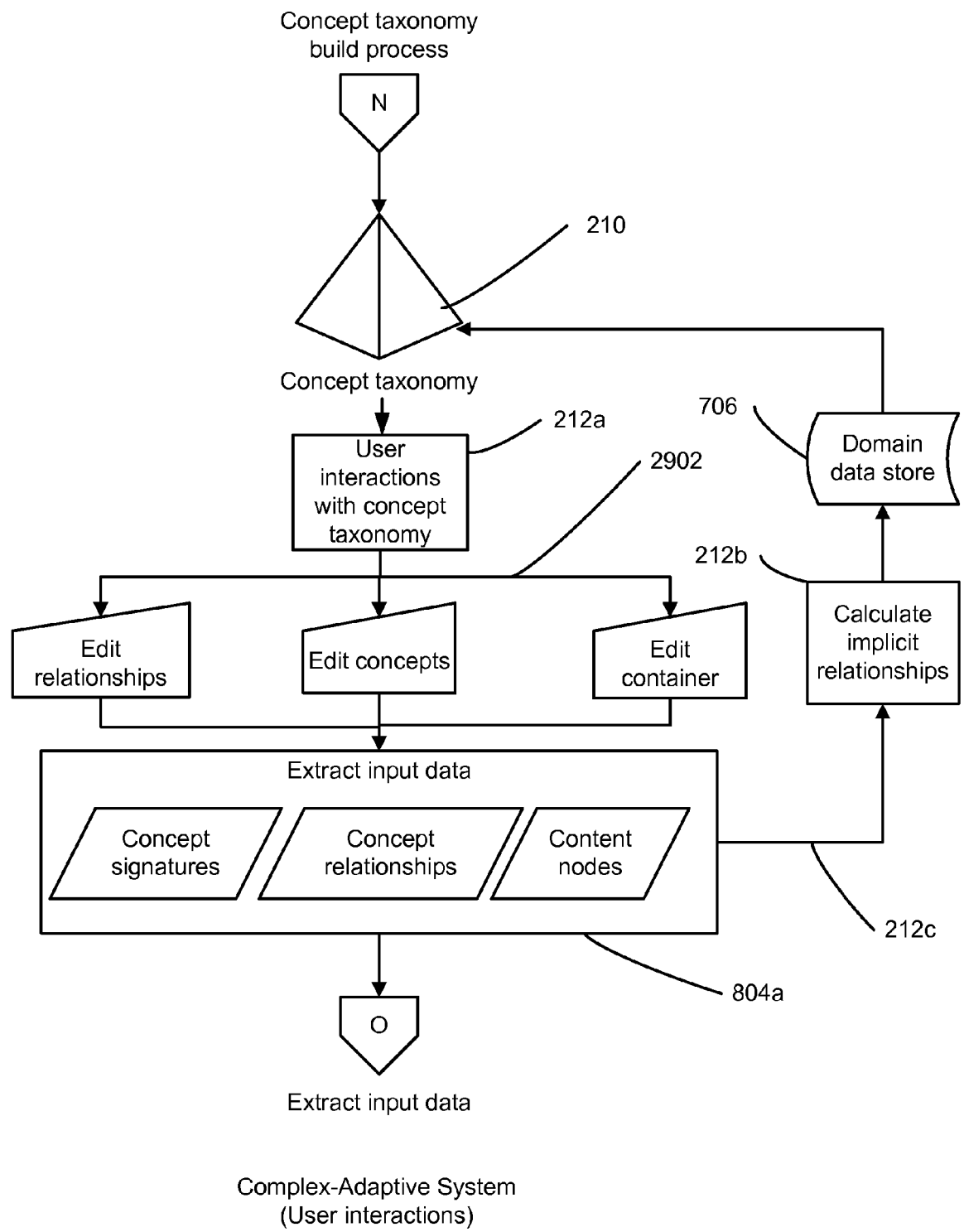
FIG. 29 illustrates a series of user interactions and feedback loops in the complex-adaptive system.

FIG. 29 illustrates the method for processing user interactions in a complex-adaptive system. It builds upon the dimensional concept taxonomy process described above N. User interactions establish a series of feedback loops in the system. The adaptive process of refinement to the complex dimensional structures is accomplished through the feedback loops initiated by end-users.

Therefore, we may summarize the methods of the complex-adaptive process as follows:

Provide dimensional concept taxonomy as an environment for user interactions 212*a*. Once a dimensional concept taxonomy 210 has been presented to users, it becomes an environment for revising existing data, as well as a source for new data (dimensional concept taxonomy information). The input data 804*a* comprised of the edits to existing data and the input of new data by users. It also provides for evolving and adapting the classifications to dynamic domains.

User interactions may comprise a feedback loop back in the system O. Unique identifiers in the data elements in the dimensional concept taxonomy information are uniquely identified using a notation system based on the morpheme elements stored in the centralized system. Thus, each data element in the dimensional concept taxonomies produced by the system is identified in a way that can be merged back into the centralized (shared) morpheme lexicon.

Therefore, when users manipulate those elements, the contingent effects on the related morpheme elements may be tracked. These changes reflect new explicit data in the system, to refine any of the inferred data automatically generated by the system. In other words, what was originally inferred by the system may be reinforced or rejected by the explicit interactions of the end-users.

User interactions may comprise both new data sources and revisions to known data sources. Manipulations to known elements are translated back to their morpheme antecedents. Any data elements that are not recognized by the system represent new data. However, since the changes are made in the context of the existing dimensional concept taxonomy produced by the system, this new data may be placed in the context of known data. Thus, any new data elements added by users are provided in the context of the known elements. The relationships between the known and the unknown greatly extend the amount of dimensional concept taxonomy information that may be inferred from the users' interactions.

A "shortcut" feedback loop 212*c* in the system provides a real-time interactive environment for end-users. The taxonomy and container edits 2902 initiated by the user are queued in the system and formally processed as system resources become available. Users, however, sometimes require (or prefer) real-time feedback to their changes to the dimensional concept taxonomy. The time required to process the changes through the system's formal feedback loops may delay this real-time feedback to the user. As a result, the preferred embodiment of the system provides a shortcut feedback loop.

This shortcut feedback loop begins by processing user edits against the domain data store 706 as it exists at that time. Since the users' changes may include dimensional concept taxonomy information that does not presently exist in the domain data store, the system must use a process that approximates the effect of the changes.

The rules for creating implicit relationships 212*b* (described above) are applied to new data as a short-term surrogate for full processing. This approach allows users to immediately insert and interact with the new data.

As opposed to the dimensional concept relationships calculated through the system's formal processes, this approximation process uses the presence of morphemes unknown to the system in sets of known morphemes to qualify and adjust the dimensional concept relationships of the known morphemes in the set. These adjusted relationships are described as "implicit relationships" 216, described in greater detail above.

For new data elements, short-term concept definitions are assigned based on implicit relationships (described above) to facilitate real-time processing of the interactions. At the completion of the next full processing cycle for the domain, the short-term implied concept definitions are replaced with the complete concept definitions devised by the system.

Those skilled in the art will appreciate that there are many algorithms that may be used to approximate the influence of unknown morphemes on the relationships of known morphemes in the system.

1.1.4.4 Personalization

Figure 30:
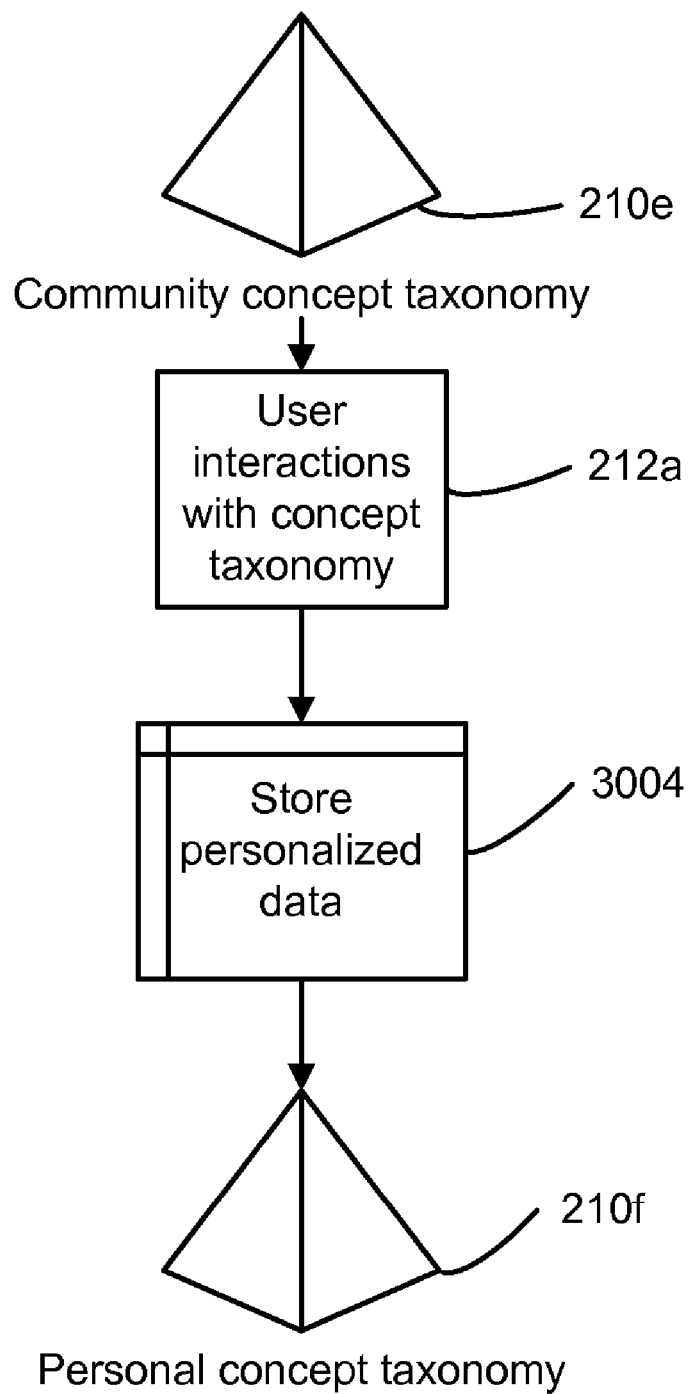
FIG. 30 illustrates operations of personalization.

FIG. 30 illustrates an alternate embodiment of the invention which provides for features of personalization, wherein personalized versions of the dimensional concept taxonomy may be maintained for each individual user of the domain.

Preferably, to personalize the community concept taxonomy 210e, along with a personalized concept taxonomy 210f for each individual user. The first time an end-user interacts with the system, each end-user will be engaging the community concept taxonomy 210e. Following interactions will engage the user's personalized view of the taxonomy 210f.

Data structures are "personalized" by collating a unique representation of the data structure in response to user interactions 212a representing the preferences of each end user. The results of the edits are stored as the personalized data from the user interactions 3004. In one embodiment, these edits are stored as "exceptions" to the community concept taxonomy 210e. When the personal concept taxonomy 210f is processed, the system substitutes any changes it finds in the users' exceptions table.

The elements illustrated identify the collaborators in the system's complex-adaptive processes. It provides a means to associate unique identifiers with each user and store their interactions.

In the preferred embodiment, the system assigns unique identifiers to each user that interacts with the dimensional concept taxonomy 210e through the presentation layer. These identifiers may be considered as morphemes. Every user is assigned a globally unique identifier (GUID), preferably a 128-bit integer (16 bytes) that can be used across all computers and networks. The user GUID exists as a morpheme in the system.

Like any other morpheme in the system, the user identifiers may be registered in the morpheme hierarchy (explicit morphemes) or unknown to the system (implicit morphemes).

The distinction between the two types of identifiers is akin to the distinction between registered and anonymous visitors, in terms that are well known in the art. The various ways that may be used to generate and associate identifiers (or "trackers") with users are also well known in the art, and will not be discussed herein.

When a user interacts with the system (for example, by editing a content container), the system adds that user's identifier to the set of morphemes that describe the concept definition. The system may also add one or more morphemes that are associated with the various types of interactivity the system supports. For example, the user "Bob" may wish to edit the container with the concept definition, "recording, studio" to include a geographic reference. The system may thus create the following concept definition record for that container, specific to Bob: {Bob, Washington, (recording, studio)}.

With this dimensional concept taxonomy information, the system could present the container in a manner specific to the user, Bob, by applying the same rules of explicit and implicit relationship calculations in the enhanced method of faceted classification described above. The container may appear on the personal Web page for Bob. In his personal concept taxonomy, the page would be related to resources in Washington.

The dimensional concept taxonomy information would also be available globally to other users, as well, subject to the statistical analyses and hurdle rates established by the administrators as a negative feedback mechanism. For example, if enough users identified the location of Washington with the recording studio, it would eventually be presented to all users as a valid relationship.

This type of modification to the concept definitions associated with the content container essentially adds new layers of dimensionality to the dimensional concept taxonomy information representing the various layers of user interactivity. It provides a versatile mechanism for personalization using the existing constructive processes applied to other forms of information and content.

As is well known in the art, there are many technologies and architectures available for adding personalization and customized presentation layers. The method discussed herein makes use of the system's core structural logic to organize collaborators. It essentially treats user interactions as just another type of informational element, illustrating the flexibility and extensibility of the system. It does not, however, limit the scope of the invention in the various methods for adding customization and personalization to the system.

1.1.4.5 Machine-based Complex-Adaptive System

Figure 31:
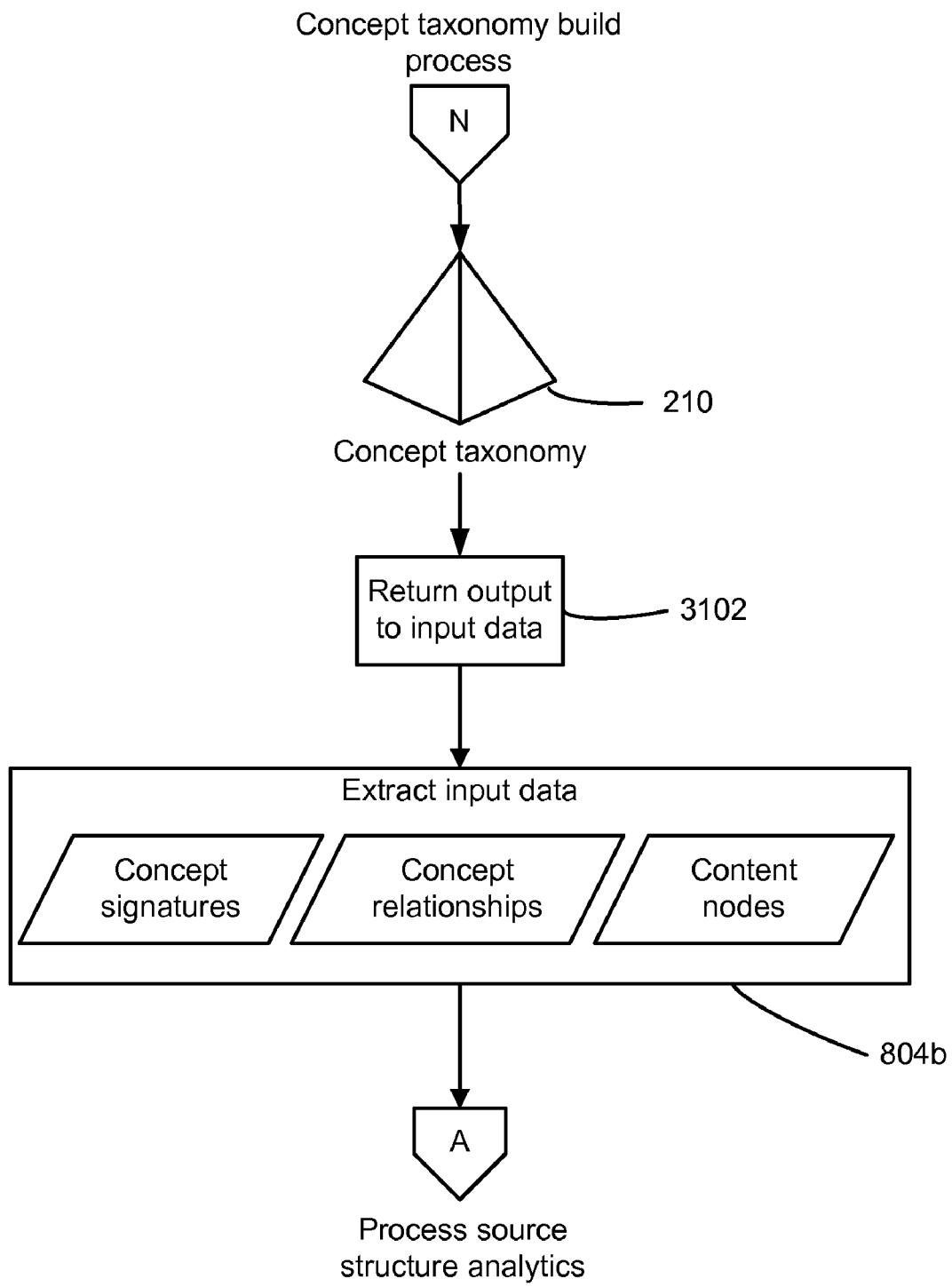
FIG. 31 illustrates operations of a machine-based complex-adaptive system.

FIG. 31 illustrates an alternate embodiment that provides a machine-based means for providing a complex-adaptive system, wherein the dimensional concept relationships that comprise the dimensional concept taxonomy 210 are returned directly back into the transformation engine processes 3102 as system input data 804b.

Note that there is an important distinction between the original concept relationships derived from the source data structure and the dimensional concept relationships that emerge from the processes of the system build engine. The former are explicit in the source data structure; the latter are derived from (or emerge through) the constructive methods applied against elemental constructs within the morpheme lexicon. Thus, the machine-based approach, like the complex-adaptive system based on user interactions, provides a means for introducing variation in the system operations 800 through the synthesis of (complex) dimensional concept relationships from elemental constructs, and then selecting from that variation in the source structure analytics component.

Under this machine-based mode of operation, the selection requirement for the complex-adaptive system is borne by the source structure analytics component (described above and illustrated in FIG. 10). Specifically, dimensional concept relationships are selected based on the identification of circular relationships 1002 and the various modes and parameters that may be used to resolve these circular relationships. As is well known in the art, there are many alternate means, selection criteria, and analytical tools to provide for a machine-based complex-adaptive system.

Dimensional concept relationships that contravene the assumptions of hierarchy, identified in the aggregate through the presence of circular relationships, may be pruned from the data set 1004. This pruned data set is reassembled 1006 into an input concept taxonomy 1008, from which the operations 800 may derive a new set of elemental constructs through the remaining operations of the analysis engine.

This type of machine-based complex-adaptive system may be used in conjunction with other complex-adaptive systems, such as the system 212 based on user interactions, described above with reference to FIGS. 8 and 29. For example, the machine-based complex-adaptive system of FIG. 31 may be used to refine the dimensional concept taxonomy through several iterations of the process. Thereafter, the resultant dimensional concept taxonomy may be introduced to users in the user-based complex-adaptive system for further refinement and evolution.

1.2 System Architecture

As emphasized throughout this description of the system architecture, there is much variability in the methods and technologies for engineering the many embodiments of this invention, including data stores. The many applications of the invention may be exposed and varied through the many forms of architectural engineering that are well known in the art.

1.2.1 Architecture Components

Figure 32:
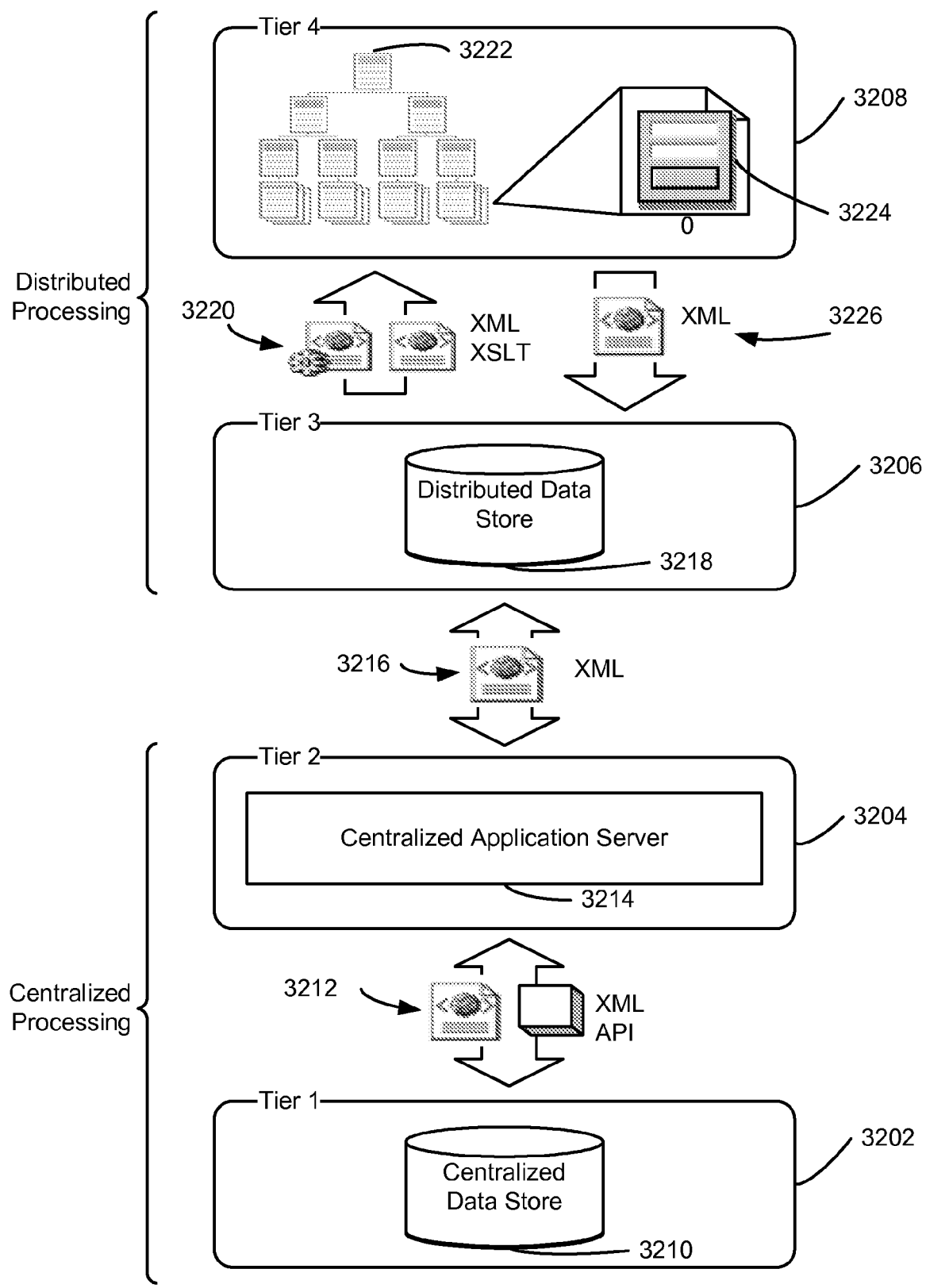
FIG. 32 illustrates a computing environment and architecture components for a system for executing the operations in accordance with an embodiment.

FIG. 32 illustrates the preferred embodiment of the computing environment for the invention.

In the preferred embodiment, the present invention is implemented as a computer software program operating under a four-tier architecture. Server application software and databases execute on both centralized computers and distributed, decentralized systems. The Internet is used to as the network to communicate between the centralized servers and the various computing devices and distributed systems that interact with it.

The variability and methods for establishing this type of computing environment are well known in the art. As such, no further discussion of the computing environment is contained herein. What is common to all applicable environments is that the user accesses a public or private network, such as the Internet or a company's intranet, through his or her computer or computing device, thereby accessing the computer software that embodies the invention.

Each tier is responsible for providing a service. Tiers one 3202 and two 3204 operate under a model of centralized processing. Tiers three 3206 and four 3208 operate under a model of distributed processing.

This four-tier model realizes the decentralization of private domain data from the shared centralized data that the system uses to analyze domains. This delineation between shared and private data is discussed above, illustrated in FIG. 7.

At the first tier, a centralized data store represents the various data and content sources that are managed by the system. In the preferred embodiment, a database server 3210 provides data services, and the means of accessing and maintaining the data.

Although the distributed content is described here as being contained within a "database", data can be stored in a plurality of linked physical locations or data sources.

Metadata may also be decentralized and stored externally from the system database. For example, HTML code fragments that contain metadata that may be acted upon by the system. Elements from the external schema may be mapped to the elements used in the schema of the present system. Other formats for presenting metadata are well known in the art. The informational landscape may thus provide a wealth of distributed content sources and a means for end-users to manage the information in a decentralized way.

The techniques and methods for managing data across a plurality of linked physical locations or data sources is well known in the art, and will not be further exhaustively discussed herein.

XML data feeds and application programming interfaces (API) 3212 are used to connect the data store 3210 to the application server 3214.

Again, those skilled in the art understand that the XML may conform to a broad range of proprietary and open schema. A range of data interchange technologies provide the infrastructure to incorporate a variety of distributed content formats into the system. This and all following discussion of the connectors used in the preferred embodiment do not limit the scope of the present invention.

At the second tier 3204, an application that resides on a centralized server 3214 contains the core programming logic for the invention. The application server provides the core programming logic and processing rules of the invention, along with connectivity to the database server. This programming logic is described in detail above, illustrated in FIGS. 8-25.

In the preferred embodiment, the structural information processed by the application server is output as XML 3216. XML is used to connect external data stores and Web sites with the application server.

Again, XML 3216 is used to communicate this interactivity back to the application server for further processing in an ongoing process of optimization and refinement.

At the third tier, a distributed data store 3218 is used to store domain data. In the preferred embodiment, this data is stored in the form of XML files on a web server. There are many alternate modes of storing the domain data such as external databases. The distributed data store is used to distribute the output data to presentation devices of end users.

In the preferred embodiment, the output data is distributed as XML data feeds, rendered using XSL transformation files (XSLT) 3220. These technologies render the output data through a presentation layer at the fourth tier.

The presentation layer may be any decentralized web sites, client software, or other media that presents the taxonomies in a form that may be utilized by humans or machines. The presentation layer represents the outward manifestation of the taxonomies and the environments through which end-users interact with the taxonomies. In the preferred embodiment, the data is rendered as a web site and displayed in a browser.

This structured information provides the platform for user collaboration and input. Those skilled in the art will appreciate that XML and XSLT may be used to render information across a diverse range of computing platforms and media. This flexibility allows the system to be used as a process within a broad range of information processing tasks.

For example, morphemes are expressed using the keywords in the data feed. By including the morpheme references in the data feed, the system provides for additional processing on the presentation layer in response to specific morphemic identifiers. An application of this flexibility is described above in the discussion of personalization (FIG. 30).

Using web-based forms and controls 3224, users may add and modify information in the system. This input is then returned to the centralized processing systems via the distributed data store as XML data feeds 3226 and 3216.

Additionally, open XML formats such as RSS may also be incorporated from the Internet as inputs to the system.

Modifications to the structural information are processed by the application server 3214. Shared morpheme data from this processing is returned via XML and API connectors 3212 and stored in the centralized data store 3210.

Within the broad field of system architecture, there are many possible designs, modes, and products, which are well known. These include centralized, decentralized, and open access models of system architecture. The technical workings of these implementations and the various alternatives that are covered by this invention will not be further discussed herein.

1.2.2 Database Schema

Figure 33:
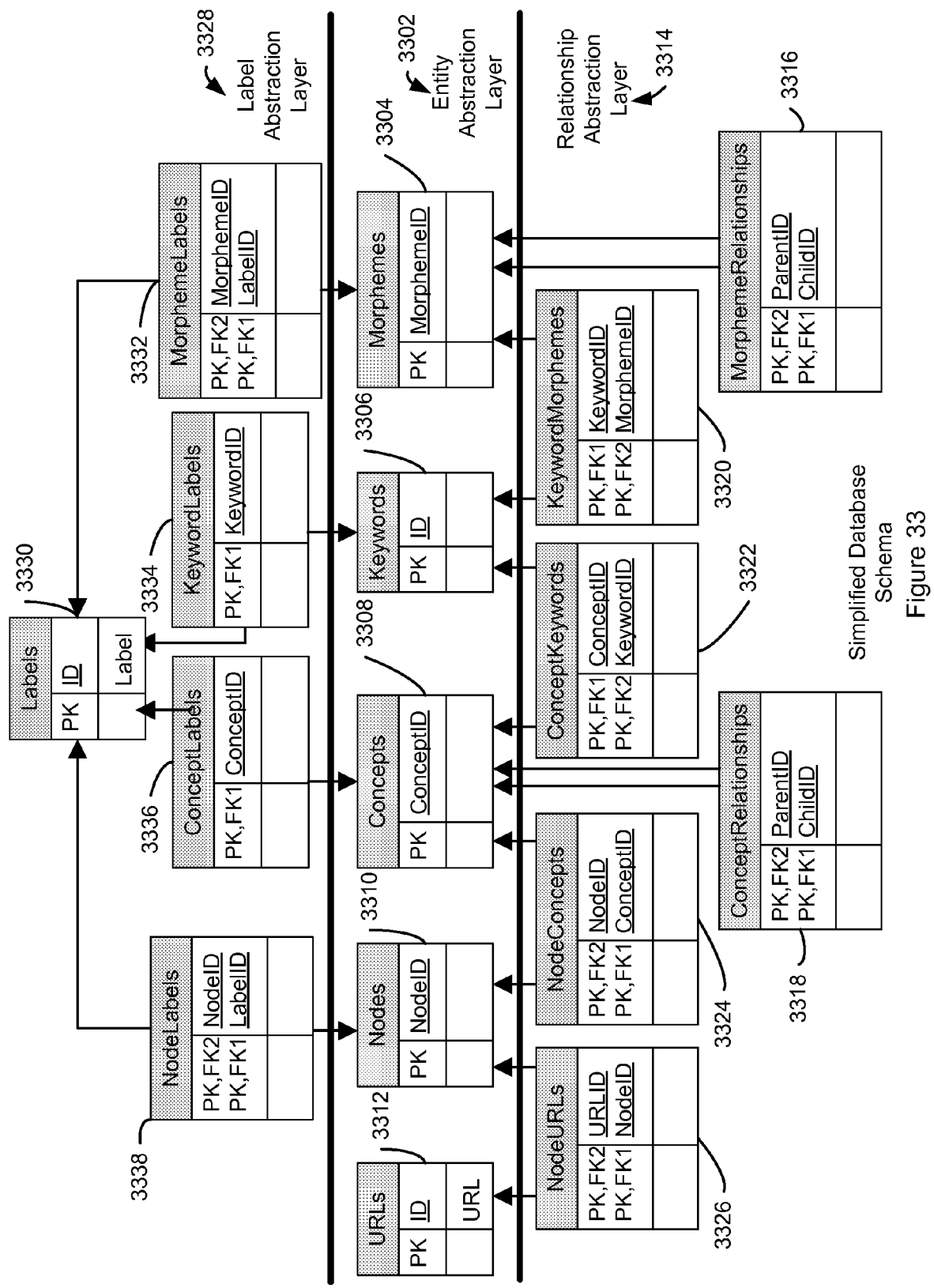
FIG. 33 illustrates a simplified data schema in the preferred embodiment.

FIG. 33 provides a simplified overview of the core data structures within the system in the preferred embodiment of the invention. This simplified schema illustrates the manner in which data is transformed through the system's application programming logic. It also illustrates how the morpheme data is deconstructed and stored.

The data architecture of the system was designed to centralize the morpheme lexicon, while providing temporary data stores for processing domain-specific entities.

Note that domain data flows through the system; preferably, it is not stored in the system. The tables that map to the domain entities are temporary data stores, which are then transformed to the output data and the data store for the domain. The domain data store may be stored along with the other centralized assets or (preferably) distributed to storage resources maintained by the domain owner.

In the preferred embodiment, the application and database servers (described above and illustrated in FIG. 32) primarily manipulate data. The data is organized within three broad areas of data abstraction in the system:

The entity abstraction layer 3302, where entities are the main building blocks of knowledge representation in the system. Entities are comprised of: morphemes 3304, keywords 3306, concepts 3308, content nodes 3310, and content containers 3312 (represented by URLs).

The relationship layer of abstraction 3314, where entity definitions are represented by the relationships between the various entities used in the system. Entity relationships are comprised of morpheme relationships 3316, concept relationships 3318, keyword-morpheme relationships 3320, concept-keyword relationships 3322, node-concept relationships 3324, and node-content container (URL) relationships 3326.

The label abstraction layer 3328 is where the terms used to describe entities are separated from the structural definitions of the entities themselves. Labels 3330 are comprised of morpheme labels 3332, keyword labels 3334, concept labels 3336, and node labels 3338. Labels may be shared across the various entities. Alternatively, labels may be segmented by entity type.

Note that this simplified schema in no way limits the database schema used in the preferred embodiment. Issues of system performance, storage, and optimization figure prominently. Those skilled in the art know that there are many ways to design a database system that reflects the design elements described herein. As such, the various methods, technologies, and designs that may be used as embodiments in the present will not be discussed further herein.

1.2.3 XML Schema and Client-Side Transformations

Faceted output data is encoded as XML and rendered by XSLT. The faceted output can be reorganized and represented in many different ways (for example, refer to the published XFML schema). Alternate outputs for representing hierarchies are available.

XSL transformation code (XSLT) is used in the preferred embodiment to present the presentation layer (in this case, a Web site). All information elements managed by the system (including distributed content if it is channeled through the system) may be rendered by XSLT.

Client-side processing is the process of the preferred embodiment to connect data feeds to the presentation layer of the system. These types of connectors are used to output information from the application server to the various media that use the structural information. XML data from the application server may be processed through XSLT for presentation on a web page.

Those skilled in the art will appreciate the current and future functionality that XML technologies and similar presentation technologies will provide in the service of this invention. In addition to basic publishing and data presentation, XSLT and similar technologies provide a range of programmatic opportunities. Complex information structures such as those created by the system provide actionable information, much like data models. Software programs and agents can act upon the information on the presentation layer, to provide sophistication interactivity and automation. As such, the scope of invention provided by the core structural advantages of the system will extend far beyond the simple publishing.

Those skilled in the art will appreciate the variability that is possible for architecting these XML and XSLT locations. For example, the files may be stored locally on the computers of end-users or generated using web services. ASP code (or similar technology) may be used to insert the information managed by our system on distributed presentation layers (such as the web pages of third-party publishers or software clients).

As another example, an XML data feed containing the core structural information from the system may be combined with the distributed content that the system organizes. Those skilled in the art will appreciate the opportunities to decouple these two types of data into separate data feeds.

These and other architectural opportunities for storing and distributing these presentation files and data feeds are well known in the art, and will therefore not be discussed further herein.

Any element in a claim that does not explicitly state "means for" performing a specified function, or "step for" performing a specific function, is not to be interpreted as a "means" or "step" clause as specified in 35 USC §112, paragraph 6.

It will be appreciated by those skilled in the art that the invention can take many forms, and that such forms are within the scope of the invention as claimed. Therefore, the spirit and scope of the appended claims should not be limited to the descriptions of the preferred versions contained herein.

I claim:

1. A method for performing synthesis of relationships between a plurality of concept definitions using a domain of information, wherein the domain of information is a faceted domain that comprises a plurality of facets each having a plurality of facet attributes, wherein each of the concept definitions comprises at least one of the plurality of facet attributes, and wherein the method comprises:

determining whether any explicit relationships exist between the plurality of concept definitions, wherein an explicit relationship is determined to exist between any two of the plurality concept definitions if the two of the plurality of concept definitions share at least one common facet attribute or each has a facet attribute of the same lineage in at least one facet attribute hierarchy of the plurality of facet attributes;

determining whether any implicit relationships exist between the plurality of concept definitions, wherein an implicit relationship between two of the plurality of concept definitions is determined to exist based on a statistical identification of a relationship between a facet attribute in a first of the two of the plurality of concept definitions and a facet attribute in a second of the two of the plurality of concept definitions; and when it is determined that at least one explicit relationship and/or at least one implicit relationship exists between two of the plurality of concept definitions, synthesizing a relationship between the two of the plurality of concept definitions.

2. The method of claim 1, further comprising: creating a dimensional concept hierarchy, based on the synthesized relationships between concept definitions.

3. The method of claim 2, wherein the act of synthesizing the relationship between the two concept definitions further comprises: determining a dimensional axis between the two concept definitions.

4. The method of claim 3, further comprising:
creating at least one dimensional concept hierarchy, based, at least in part, on the dimensional axis.

5. The method of claim 3, further comprising selecting one or more facet attributes for defining said dimensional axis, said selecting in accordance with at least one of:
the respective priorities of the facet attributes in the at least one facet attribute hierarchy; and
a particular concept definition comprising the one or more facet attributes to ascribe a particular meaning to said dimensional axis.

6. The method of claim 2, further comprising:
evaluating sets of concept relationships for the presence of indirect relationships and assembling the dimensional concept hierarchy without the indirect relationships.

7. The method of claim 2, further comprising:
determining a priority for the concept definitions in the dimensional concept hierarchy based, at least in part, on at least one of priorities of facet attributes in the at least one facet attribute hierarchy and a count of the number of facet attributes in the respective concept definitions.

8. The method of claim 2, wherein the domain of information comprises a plurality content nodes, and wherein the act of creating a dimensional concept taxonomy further comprises:
assigning facet attributes to the plurality of content nodes of the domain of information.

9. The method of claim 1, wherein an explicit or implicit relationship is determined to exist between any two of the plurality of concept definitions if all of the facet attributes of a one of the two concept definitions are related to all or a subset of the facet attributes of the other of the two concept definitions.

10. The method of claim 1 wherein the plurality of concept definitions are preliminary concept definitions, wherein relationships between the preliminary concept definitions are represented in an input concept hierarchy and wherein the method comprises:
revising the preliminary concept definitions by extending the preliminary concept definitions with additional facet attributes in response to whether any two relationships in the input concept hierarchy may be related, directly or indirectly, in a dimensional concept relationship by at least one of explicit relationships and implicit relationships.

11. The method of claim 1, further comprising: for the domain of information creating a keyword hierarchy comprising unique keywords as representative of facet attributes in the domain.

12. The method of claim 11, further comprising:
defining a dimensional concept taxonomy for the domain of information, wherein the domain of information comprises a plurality of content nodes, wherein each of the plurality of content nodes is associated with one or more concepts represented by the concept definitions, said taxonomy comprising a hierarchy of dimensional concept relationships generated from the concept definitions and the keyword hierarchy, wherein each concept definition is mapped to one or more representative keywords of the keyword hierarchy.

13. The method of claim 1, further comprising:
examining content nodes for their respective one or more concept definitions.

14. The method of claim 13, wherein the act of examining content nodes further comprises:
processing a localized region of the domain using content nodes proximal to a selected content node.

15. A computer system comprising:
at least one memory that stores processor-executable instructions for performing faceted classification synthesis of relationships between a plurality of concept definitions using a domain of information comprising a plurality of facets each having a plurality of facet attributes, wherein each of the concept definitions comprises at least one of the plurality of facet attributes; and
at least one hardware processor, coupled to the at least one memory that executes the instructions to:
determine whether any explicit relationships exist between the plurality of concept definitions, wherein an explicit relationship is determined to exist between any two of the plurality concept definitions if the two of the plurality of concept definitions share at least one common facet attribute or each has a facet attribute of the same lineage in at least one facet attribute hierarchy of the plurality of facet attributes;
determine whether any implicit relationships exist between the plurality of concept definitions, wherein an implicit relationship between two of the plurality of concept definitions is determined to exist based on a statistical identification of a relationship between a facet attribute in a first of the two of the plurality of concept definitions and a facet attribute in a second of the two of the plurality of concept definitions; and
when it is determined that at least one explicit relationship and/or at least one implicit relationship exists between two of the plurality of concept definitions, synthesize a relationship between the two of the plurality of concept definitions.

16. The computer system of claim 15, wherein the at least one processor executes the instructions to:
create a dimensional concept hierarchy, based on the synthesized relationships between concept definitions.

17. The computer system of claim 16, wherein the at least one processor is configured to:
in response to determining that two concept definitions are related, determine a dimensional axis between the two concept definitions.

18. The computer system of claim 17, wherein the at least one processor executes the instructions to: create at least one dimensional concept hierarchy, based on the dimensional axis.

19. The computer system of claim 17, wherein the at least one processor executes the instructions to: select one or more facet attributes for defining said dimensional axis, said selecting in accordance with at least one of:
the respective priorities of the facet attributes in the at least one facet attribute hierarchy; and
a particular concept definition comprising the one or more facet attributes to ascribe a particular meaning to said dimensional axis.

20. The computer system of claim 16, wherein the at least one processor executes instructions to evaluate sets of dimensional concept relationships for the presence of indirect relationships and assembling the dimensional concept hierarchy without the indirect relationships.

21. The computer system of claim 16, wherein the at least one processor executes the instructions to:

determine a priority for the concept definitions in the dimensional concept hierarchy based on at least one of priorities of facet attributes in the at least one facet attribute hierarchy and a count of the number of facet attributes in the respective concept definitions.

22. The computer system of claim 16, wherein the domain of information comprises a plurality of content nodes and wherein the at least one processor creates the dimensional concept taxonomy by: assigning facet attributes to the plurality of content nodes of the domain of information.

23. The computer system of claim 15, wherein an explicit or implicit relationship is determined to exist between any two of the plurality of concept definitions if all of the facet attributes of a one of the two concept definitions are related to all or a subset of the facet attributes of the other of the two concept definitions.

24. The computer system of claim 15, wherein the plurality of concept definitions are preliminary concept definitions, wherein relationships between the preliminary concept definitions are represented in an input concept hierarchy and wherein the at least one processor executes the instructions to:
revise said preliminary concept definitions by extending the preliminary concept definitions with additional facet attributes in response to whether any two relationships in the input concept hierarchy may be related, directly or indirectly, in a dimensional concept relationship by at least one of explicit relationships and implicit relationships.

25. The computer system of claim 15, wherein the at least one processor executes the instructions to create a keyword hierarchy comprising unique keywords as representative of facet attributes in the domain.

26. The computer system of claim 25 wherein the at least one processor executes the instructions to:
define a dimensional concept taxonomy for a the domain of information, wherein the domain of information comprises a plurality of content nodes, wherein each of the plurality of content nodes is associated with one or more concepts represented by the concept definitions, said taxonomy comprising a hierarchy of dimensional concept relationships generated from the concept definitions and the keyword hierarchy, wherein each concept definition is mapped to one or more representative keywords of the keyword hierarchy.

27. The computer system of claim 15, wherein the at least one processor executes the instructions to:
examine content nodes for their respective one or more concept definitions.

28. The computer system of claim 27, wherein at least one processor examines content nodes by processing a localized region of the domain using content nodes proximal to a selected content node.

29. A computer program storage product storing instructions that when executed on a computer system, perform a method for performing synthesis of relationships between a plurality of concept definitions using a domain of information, wherein the domain of information comprises a plurality of facets each having a plurality of facet attributes, wherein each of the plurality of concept definitions comprises at least one the plurality of facet attributes, and wherein the method comprises:
determining whether any explicit relationships exist between the plurality of concept definitions, wherein an explicit relationship is determined to exist between any two of the plurality concept definitions if the two of the plurality of concept definitions share at least one common facet attribute or each has a facet attribute of the same lineage in at least one facet attribute hierarchy of the plurality of facet attributes;
determining whether any implicit relationships exist between the plurality of concept definitions, wherein an implicit relationship between two of the plurality of concept definitions is determined to exist based on a statistical identification of a relationship between a facet attribute in a first of the two of the plurality of concept definitions and a facet attribute in a second of the two of the plurality of concept definitions; and
when it is determined that at least one explicit relationship and/or at least one implicit relationship exists between two of the plurality of concept definitions, synthesizing a relationship between the two of the plurality of concept definitions.

30. The computer program storage product of claim 29, wherein the method further comprises creating a dimensional concept hierarchy, based on the synthesized relationships between concept definitions.

31. The computer program storage product of claim 30, wherein the act of synthesizing the relationship between the two concept definitions further comprises: determining a dimensional axis between the two concept definitions.

32. The computer program storage product of claim 31, wherein the method further comprises:
creating at least one dimensional concept hierarchy, based, at least in part, on the dimensional axis.

33. The computer program storage product of claim 29, wherein an explicit or implicit relationship is determined to exist between any two of the plurality of concept definitions if:
all of the facet attributes of a one of the two concept definitions are related to all or a subset of the facet attributes of the other of the two concept definitions.

34. The computer program storage product of claim 31 wherein the method further comprises selecting one or more facet attributes for defining said dimensional axis, said selecting in accordance with at least one of:
the respective priorities of the facet attributes in the morpheme at least one facet attribute hierarchy; and
a particular concept definition comprising the one or more facet attributes to ascribe a particular meaning to said dimensional axis.

35. The computer program storage product of claim 30, wherein the method further comprises evaluating sets of dimensional concept relationships for the presence of indirect relationships and assembling the dimensional concept hierarchy without the indirect relationships.

36. The computer program storage product of claim 30, wherein the method further comprises:
determining a priority for the concept definitions in the dimensional concept hierarchy based, at least in part, on at least one of priorities of facet attributes in the at least one facet attribute hierarchy and a count of the number of facet attributes in the respective concept definitions.

37. The computer program storage product of claim 30, wherein the domain of information comprises a plurality content nodes, and wherein the act of creating a dimensional concept taxonomy further comprises:
assigning facet attributes to the plurality of content nodes of the domain of information.

38. The computer program storage product of claim 29, wherein the plurality of concept definitions are preliminary concept definitions, wherein relationships between the preliminary concept definitions are represented in an input concept hierarchy and wherein the method comprises:

revising the preliminary concept definitions by extending the preliminary concept definitions with additional facet attributes in response to whether any two relationships in the input concept hierarchy may be related, directly or indirectly, in a dimensional concept relationship by at least one of explicit relationships and implicit relationships.

39. The computer program storage product of claim 29, wherein the method further comprises, for the domain of information creating a keyword hierarchy comprising unique keywords as representative of facet attributes in the domain.

40. The computer program storage product of claim 39, wherein the method further comprises:

defining a dimensional concept taxonomy for the domain of information, wherein the domain of information comprises a plurality of content nodes, wherein each of the plurality of content nodes is associated with one or more concepts represented by the concept definitions, said taxonomy comprising a hierarchy of dimensional concept relationships generated from the concept definitions and the keyword hierarchy, wherein each concept definition is mapped to one or more representative keywords of the keyword hierarchy.

41. The computer program storage product of claim 29, wherein the method further comprises:

examining content nodes for their respective one or more concept definitions.

42. The computer program storage product of claim 41, wherein the act of examining content nodes further comprises: processing a localized region of the domain using content nodes proximal to a selected content node.

* * * * *